United States Patent [19]
Baxter et al.

[11] Patent Number: 5,887,146
[45] Date of Patent: Mar. 23, 1999

[54] SYMMETRIC MULTIPROCESSING COMPUTER WITH NON-UNIFORM MEMORY ACCESS ARCHITECTURE

[75] Inventors: William F. Baxter, Holliston; Robert G. Gelinas, Westboro; James M. Guyer, Northboro; Dan R. Huck, Shrewsbury; Michael F. Hunt, Ashland; David L. Keating, Holliston, all of Mass.; Jeff S. Kimmell, Chapel Hill, N.C.; Phil J. Roux, Holliston, Mass.; Liz M. Truebenbach, Sudbury, Mass.; Rob P. Valentine, Auburn, Mass.; Pat J. Weiler, Northboro, Mass.; Joseph Cox, Middleboro, Mass.; Barry E. Gillott, Fairport, N.Y.; Andrea Heyda, Acton, Mass.; Rob J. Pike, Northboro, Mass.; Tom V. Radogna, Westboro, Mass.; Art A. Sherman, Maynard, Mass.; Michael Sporer, Wellesley, Mass.; Doug J. Tucker, Northboro, Mass.; Simon N. Yeung, Waltham, Mass.

[73] Assignee: Data General Corporation, Westboro, Mass.

[21] Appl. No.: 695,556

[22] Filed: Aug. 12, 1996

Related U.S. Application Data

[60] Provisional application No. 60/002,320 Aug. 14, 1995.
[51] Int. Cl.[6] .............................. G06F 13/00; G06F 1/12
[52] U.S. Cl. ......................... 395/284; 395/312; 395/403; 395/553
[58] Field of Search ................................... 395/284, 306, 395/312, 403, 445, 473, 553

[56] References Cited

U.S. PATENT DOCUMENTS

| | | | |
|---|---|---|---|
| 5,269,013 | 12/1993 | Arbramson et al. | 395/425 |
| 5,434,993 | 7/1995 | Liencres et al. | 395/425 |
| 5,577,204 | 11/1996 | Brewer et al. | 395/200.01 |
| 5,603,005 | 2/1997 | Bauman et al. | 395/451 |
| 5,613,153 | 3/1997 | Arimilli et al. | 395/821 |
| 5,644,753 | 7/1997 | Ebrahim et al. | 395/458 |

OTHER PUBLICATIONS

Oswell, John, Computing Canada, *Looking ahead to ccNUMA*, May 9, 1996, vol. 22, No. 10, pp. 42 (1).

(List continued on next page.)

*Primary Examiner*—Meng-Ai T. An
*Attorney, Agent, or Firm*—Brian L. Michaelis; David D. Lowry; Sewell P. Bronstein

[57] ABSTRACT

A very fast, memory efficient, highly expandable, highly efficient CCNUMA processing system based on a hardware architecture that minimizes system bus contention, maximizes processing forward progress by maintaining strong ordering and avoiding retries, and implements a full-map directory structure cache coherency protocol. A Cache Coherent Non-Uniform Memory Access (CCNUMA) architecture is implemented in a system comprising a plurality of integrated modules each consisting of a motherboard and two daughterboards. The daughterboards, which plug into the motherboard, each contain two Job Processors (JPs), cache memory, and input/output (I/O) capabilities. Located directly on the motherboard are additional integrated I/O capabilities in the form of two Small Computer System Interfaces (SCSI) and one Local Area Network (LAN) interface. The motherboard includes main memory, a memory controller (MC) and directory DRAMs for cache coherency. The motherboard also includes GTL backpanel interface logic, system clock generation and distribution logic, and local resources including a micro-controller for system initialization. A crossbar switch connects the various logic blocks together. A fully loaded motherboard contains 2 JP daughterboards, two PCI expansion boards, and up to 512 MB of main memory. Each daughterboard contains two 50 MHz Motorola 88110 JP complexes, having an associated 88410 cache controller and 1 MB Level 2 Cache. A single 16 MB third level write-through cache is also provided and is controlled by a third level cache controller.

18 Claims, 38 Drawing Sheets

OTHER PUBLICATIONS

Lenoski, D. et al., *The Directory–Based Cache Coherence Protocol for the Dash Multiprocessor*, Chap. 2887, pp. 148–159, Aug. 1990.

Kontothanassis, L., et al., University of Rochester, *Software Cache Coherence for Large Scale Multiprocessors*, Mar. 1994.

Stenström, P., et al., Computer Systems Laboratory, *Comparative Performance Evaluation of Cache Numa and Coma Architectures*, vol. 20, No. 2, May 1992.

Singh, J., et al., Computer Systems Laboratory, Stanford University, *An Empirical Comparison of the Kendall Square Research KSR–1 and Stanford Dash Multiprocessors*, AMC, pp. 214–225, 1993.

Chapin, J., et al., Computer Systems Laboratory, *Memory System Performance of UNIX on CC–NUMA Multipurposes*, vol. 23, No. 1, May 1995.

Bolosky, W., et al., *Numa Policies and Their Relation to Memory Architecture*, ACM, pp. 212–221, Sep. 1991.

Lovett, T., et al., Sequent Computer Systems, Inc., *Sting. A CC–NUMA Computer System for the Commercial Marketplace*, ISCA, pp. 308–317, Mar. 1996.

Lenoski, D., et al., Computer Systems Laboratory, *The Stanford Dash Multiprocessor*, pp. 63–79, Mar. 1992.

Lenoski, D., et al., IEEE Transactions on Parallel and Distributed Systems, *The Dash Prototype: Logic Overhead and Performance*, vol. 4, No. 1, Jan. 1993.

Lenoski, D., et al., Computer Systems Laboratory, *The Directory–Based Cache Coherence Protocol for the Dash Multiprocessor*, Chap. 2887, pp. 148–159, Aug. 1990.

Senthil, K., Journal of Parallel and Distributed Computing, *A Scalable Distributed Shared Memory Architecture*, vol. 23, pp. 547–554, 1994.

Kontothanassis, L., Journal of Parallel and Distributed Computing, *High Performance Software Coherence for Current and Future Architectures*, vol. 29, pp. 179–195, 1995.

Hitoshi, O., Transactions of Information Processing Society of Japan, *Performance Analysis of a Data Diffusion Machine with High Fanout and Split Directories*, vol. 36, No. 7, pp. 1662–1668, Jul. 1995.

Nowatzk, A., et al., Parallel Computing: Trends and Applications, *Exploiting Parallelism in Cache Coherency Protocol Engines*, Grenoble France, pp. 269–286, Sep. 1993.

Haridi, S., et al., Euro–Par '95 Parallel Processing, *Experimental Performance Evaluation on Network–based Shared–memory Architectures*, pp. 461–468, 1994.

Sevcik, et al., Computer Systems Research Institute, *Performance benefits and limitations of large Numa multiprocessors*, pp. 185–205, 1994.

Dewan, et al., Southern Methodist University, *A Case for Uniform Memory Access Multiprocessors*, pp. 20–26.

Li, et al., Cornell University, *Access Normalization: Loop Restructuring for Numa Computers*, vol. 11, No. 4, pp. 353–375, Nov. 1993.

Agarwal, et al., Massachusetts Institute of Technology, *The MIT Alewife Machine: Architecture and Performance*, pp. 2–13, 1995.

Chan, Tony, Ninth Annual International Conference, *Application of the Scalable Coherent Interface in Multistage Networks*, pp. 370–377, 1994.

Cukic, et al., Uiversity of Houston, *The Performance Impact of False Subpage Sharing in KSR1*, pp. 64–71, 1995.

Al–Mouhamed, Transaction of Parallel and Dsitributed Systems, *Analysis of Macro–Dataflow Dynamic Scheduling on Nonuniform Memory Access Architectures*, vol. 4, No. 8, pp. 875–888, Aug. 1993.

Wolski, et al., Journal of Parallel and Distributed Computing, *Program Partition for Numa Multiprocessor Computer Systems*, vol. 19, pp. 203–218, 1993.

Choe, et al., Seoul National University, *Delayed Consistency and Its Effects on the Interconnection Network of Shared Memory Multiprocessors*, pp. 436–439.

Sivasubramaniam, et al., *Abstracting Network Characteristics and Locality Properties of Parallel Systems*, pp. 54–63, 1995.

Abdelrahman, et al., University of Toronto, *Distributed Array Data Management on Numa Multiprocessors*, pp. 551–559, 1994.

LaRowe, et al., Transactions on Parallel and Distributed Systems, *Evaluatin of Numa Memory Management Through Modeling and Measurements*, vol. 3 No. 6, Nov. 1992.

LaRowe, et al., ACM, *The Robustness of Numa Memory Management*, pp. 137–151, 1991.

Wilson, A., Jr., ACM, Encore Computer Corporation, *Hierarchical Cache/Bus Architecture for Shared Memory Multiprocessors*, pp. 244–252, 1987.

Kuskin, et al., Computer Systems Laboratory, *The Stanford Flash Multiprocessor*, pp. 302–313, 1994.

Chandra, R., et al., Computer Systems Laboratory, *Scheduling and Page Migration for Multiprocessor Compute Servers*, pp. 12–24, 1994.

Chaiken, D., et al., Massachusetts Institute of Technology., *Limitless Directories: A Scalable Cache Coherence Scheme*, pp. 224–234, 1991.

Brown, D., *Convex Delivers Beta Appetizers*, pp. 1–15, 1994.

Shreekant, et al., New Directions, *Scalable Shared–Memeory Multiprocessor Arachitectures*, pp. 71–74, Jun. 1990.

Singh, et al., Computer, *Scaling Parallel Programs for Multiprocessors: Methodology and Examples*, pp. 42–50, 1993.

Singh, et al., Computer Systems Laboratory Stanford University, *Load Balancing and Data Locality in Hierarchial N–body Methods*, pp. 1–21.

Brown, D.H., *KSR: Addressing The MPP Software Hurdle*, pp. 1–18, Dec. 1993.

3.1.6 PIBUS Operation Decode & Queue Priority Assignment

| Operation | Type | Priority | Format | Wait on RCVR_ACK | Decode Looks for: |
|---|---|---|---|---|---|
| NOP | id | n/a | a | no | n/a |
| RD_S | addr | low | a | no | our_addr |
| WR_THRU | addr | low | ad | no | our_addr |
| CI_WR | addr | low | ad | no | our_addr |
| CI_RD | addr | low | a | no | our_addr |
| IM | addr | low | a | no | our_addr |
| RD_IM | addr | low | a | no | our_addr |
| CI_RD_LOCK | addr | low | a | no | our_addr |
| CI_WR_UNLK | addr | low | ad | no | our_addr |
| INV_CMD | node | med | na | yes | our_node |
| CB_CMD | node | med | na | no | our_node |
| CB_INV_CMD | node | med | na | no | our_node |
| RD_INV_RPLY | node | med | nad(ddddddd) | yes | our_node |
| RD_S_RPLY | id | med | ad(ddddddd) | no | our_id |
| ACK | id | med | a | no | our_id |
| NACK | id | med | a | no | our_id |
| RETRY | id | med | a | no | our_id |
| CB_INV_RPLY | addr | high | adddddddd | no | our_addr |
| CB_RPLY | addr | high | adddddddd | no | our_addr |
| WB | addr | high | adddddddd | no | our_addr |
| UNDO_MOD | addr | high | a | no | our_addr |
| UNDO_LK | addr | high | a | no | our_addr |

*FIG. 6*

SQ_DONE_STATE Machine

IQC_VALID goes to zero when the Input Queue is advanced.

START_REQUEST is asserted by MC_SQ_CURRENT_STATE machine when MC is ready to start requesting the bus.

DRAMs are ready when they know they will have enough data to supply the read reply packet by the time we get a bus grant.

SQ_DO_OP_STATE Machine

0 = ~DO_NEW_OP & ~MA_REG_GNT
1 = ~DO_NEW_OP & MA_REG_GNT
2 = DO_NEW_OP & ~MA_REG_GNT
3 = DO_NEW_OP & MA_REG_GNT

MC_ARB_SM[3:0] - Pix Bus Request Arbitration

RMS_REQ_INH_N-DRAM control requires RFIFO
DUMP_DATA-RFIFOs need to dump data
RMP_DUMP_N-RFIFOs need to dump data
DO_MED_OP-new op ready to request
R_GNT-registered bus grant

Main Memory DRAM Control (RMS) BYTE MERGE

Data Bus/EDAC Write State Machine (MC_RMP_WR)

Data Bus/EDAC EDAC mode State Machine (MC_RMP_MD)

FIG. 26A    CACHED REQUEST TRANSITION TABLE

| OPERATION | INITIAL DIRECTORY STATE | | | | | |
|---|---|---|---|---|---|---|
| | UNUSED | SHARED | MODIFIED | BUSY | LOCKED |
| RD_S | RD_S_RPLY<br>SHARED<br>SHARED | RD_S_RPLY<br>SHARED<br>SHARED | CB_CMD<br>BUSY<br>NO CHANGE<br>(INVALID)<br>SHARED OR INVALID | RETRY<br>NO CHANGE<br>NO CHANGE | RETRY<br>NO CHANGE<br>NO CHANGE |
| | NO CHANGE<br>(INVALID) | NO CHANGE<br>(INVALID OR SHARED) | | | |
| RD_IM | RD_INV_RPLY<br>MODIFIED<br>MODIFIED | RD_INV_RPLY<br>MODIFIED<br>MODIFIED | CB_INV_CMD<br>BUSY<br>NO CHANGE<br>(INVALID) | RETRY<br>NO CHANGE<br>NO CHANGE | RETRY<br>NO CHANGE<br>NO CHANGE |
| | NO CHANGE<br>(INVALID) | INVALID | INVALID | | |
| IM<br>(FROM REMOTE REQUESTOR) | NO RESPONE | INV_CMD<br>MODIFIED<br>MODIFIED<br>INVALID | NO RESPONSE | NO RESPONSE | NO RESPONSE |
| IM<br>(FROM REMOTE REQUESTOR) | NOT POSSIBLE | INV_CMD<br>MODIFIED<br>MODIFIED<br>MODIFIED | RETRY<br>NO CHANGE<br>NO CHANGE<br>NO CHANGE | RETRY<br>NO CHANGE<br>NO CHANGE<br>NO CHANGE | NOT POSSIBLE |
| CB_RPLY | NOT POSSIBLE | NOT POSSIBLE | NO RESPONSE<br>SHARED<br>SHARED<br>SHARED OR INVALID | SEE<br>SPECIFICATION | NOT POSSIBLE |

FIG. 26B

CACHED REQUEST TRANSITION TABLE

| OPERATION | INITIAL DIRECTORY STATE | | | | |
|---|---|---|---|---|---|
| | UNUSED | SHARED | MODIFIED | BUSY | LOCKED |
| CB_INV_RPLY | NOT POSSIBLE | NOT POSSIBLE | NO RESPONSE<br>INVALID<br>INVALID<br>NO CHANGE<br>(INVALID) | SEE SPECIFICATION | NOT POSSIBLE |
| WB | NOT POSSIBLE | NOT POSSIBLE | NO RESPONSE<br>SHARED<br>INVALID<br>SHARED OR INVALID | SEE SPECIFICATION | NOT POSSIBLE |
| UNDO_MOD | NOT POSSIBLE | NOT POSSIBLE | NO RESPONSE<br>SHARED<br>INVALID<br>NO CHANGE<br>(INVALID) | RETRY<br>SHARED<br>INVALID<br>NO CHANGE<br>(INVALID) | NOT POSSIBLE |
| UNDO_LK | NOT POSSIBLE | NOT POSSIBLE | NOT POSSIBLE | NOT POSSIBLE | NO RESPONSE<br>SHARED<br>INVALID<br>NO CHANGE<br>(INVALID) |

CACHE INHIBITED REQUEST TRANSITION TABLE

| OPERATION | INITIAL DIRECTORY STATE | | | |
|---|---|---|---|---|
| | UNUSED | SHARED | MODIFIED | BUSY |
| CI_RD | RD_S_RPLY<br>UNUSED<br>INVALID<br>INVALID | RD_S_RPLY<br>SHARED<br>INVALID<br>NO CHANGE | CB_CMD<br>BUSY<br>INVALID<br>NO CHANGE | RETRY<br>NO CHANGE<br>NO CHANGE<br>NO CHANGE |
| CI_WR | ACK<br>UNUSED<br>INVALID<br>INVALID | INV_CMD<br>UNUSED<br>INVALID<br>INVALID | CB_INV_CMD<br>BUSY<br>INVALID<br>INVALID | RETRY<br>NO CHANGE<br>NO CHANGE<br>NO CHANGE |
| CI_RD_LK | RD_INV_RPLY<br>LOCKED/UNUSED<br>INVALID<br>INVALID | RD_INV_RPLY<br>LOCKED/UNUSED<br>INVALID<br>INVALID | CB_INV_CMD<br>BUSY<br>INVALID<br>INVALID | RETRY<br>NO CHANGE<br>NO CHANGE<br>NO CHANGE |
| CI_WR_UNLK | NOT POSSIBLE | NOT POSSIBLE | NOT POSSIBLE | ACK<br>UNUSED<br>INVALID<br>INVALID |

*FIG. 27*

CROSSBAR SELECTION

| DR_PORT[2:0] | C_TOGGLE[1:0] | SOURCE OF CROSSBAR |
|---|---|---|
| 000 | XX | PORT A |
| 001 | 00 | PORT CM |
| 001 | 01 | PORT C0 |
| 001 | 10 | PORT C1 |
| 001 | 11 | PORT CM |
| 010 | XX | PORT C0 |
| 011 | XX | PORT C1 |
| 100 | XX | PORT B |
| 101 | XX | PORT DM |
| 110 | XX | PORT D0 |
| 111 | XX | PORT D1 |

*FIG. 31A*

PORT TO BUS MAPPING

| BAXBAR PORT | SIERRA MADRE BUS |
|---|---|
| A | PIX BUS |
| CM | MC BUS |
| C0 | MUD0 BUS |
| C1 | MUD1 BUS |
| B | GG BUS |
| DM | RI BUS |
| D0 | CI0 BUS |
| D1 | CI1 BUS |

*FIG. 31C*

PORT_OE[7:0] ASSIGNMENTS

| PORT_OE | DRIVEN PORT |
|---|---|
| <7> | PORT D1 |
| <6> | PORT D0 |
| <5> | PORT DM |
| <4> | PORT B |
| <3> | PORT C1 |
| <2> | PORT C0 |
| <1> | PORT CM |
| <0> | PORT A |

*FIG. 31B*

SYMMETRIC MULTIPROCESSING COMPUTER WITH NON-UNIFORM MEMORY ACCESS ARCHITECTURE

RELATED APPLICATION

The present application claims the benefit of U.S. Provisional Application No. 60/002,320, filed Aug. 14, 1995, which is hereby incorporated herein by reference.

FIELD OF THE INVENTION

The present invention relates to multiprocessing computer systems, and more particularly to a flexible, highly scalable multiprocessing computer system incorporating a non-uniform memory access architecture.

BACKGROUND OF THE INVENTION

Symmetric multiprocessing (SMP) computer architectures are known in the art as overcoming the limitations of single or uniprocessors in terms of processing speed and transaction throughput, among other things. Typical, commercially available SMP systems are generally "shared memory" systems, characterized in that multiple processors on a bus, or a plurality of busses, share a single global memory. In shared memory multiprocessors, all memory is uniformly accessible to each processor, which simplifies the task of dynamic load distribution. Processing of complex tasks can be distributed among various processors in the multiprocessor system while data used in the processing is substantially equally available to each of the processors undertaking any portion of the complex task. Similarly, programmers writing code for typical shared memory SMP systems do not need to be concerned with issues of data partitioning, as each of the processors has access to and shares the same, consistent global memory.

However, SMP systems suffer disadvantages in that system bandwidth and scalability are limited. Although multiprocessor systems may be capable of executing many millions of instructions per second, the shared memory resources and the system bus connecting the multiprocessors to the memory presents a bottleneck as complex processing loads are spread among more processors, each needing access to the global memory. As the complexity of software running on SMP's increases, resulting in a need for more processors in a system to perform complex tasks or portions thereof, the demand for memory access increases accordingly. Thus more processors does not necessarily translate into faster processing, i.e. typical SMP systems are not scalable. That is, processing performance actually decreases at some point as more processors are added to the system to process more complex tasks. The decrease in performance is due to the bottleneck created by the increased number of processors needing access to the memory and the transport mechanism, e.g. bus, to and from memory.

Alternative architectures are known which seek to relieve the bandwidth bottleneck. Computer architectures based on Cache Coherent Non-Uniform Memory Access (CCNUMA) are known in the art as an extension of SMP that supplants SMP's "shared memory architecture." CCNUMA architectures are typically characterized as having distributed global memory. Generally, CCNUMA machines consist of a number of processing nodes connected through a high bandwidth, low latency interconnection network. The processing nodes are each comprised of one or more high-performance processors, associated cache, and a portion of a global shared memory. Each node or group of processors has near and far memory, near memory being resident on the same physical circuit board, directly accessible to the node's processors through a local bus, and far memory being resident on other nodes and being accessible over a main system interconnect or backbone. Cache coherence, i.e. the consistency and integrity of shared data stored in multiple caches, is typically maintained by a directory-based, write-invalidate cache coherency protocol, as known in the art. To determine the status of caches, each processing node typically has a directory memory corresponding to its respective portion of the shared physical memory. For each line or discrete addressable block of memory, the directory memory stores an indication of remote nodes that are caching that same line.

One known implementation of the CCNUMA architecture is in a scalable, shared memory multiprocessor system known as "DASH" (Directory Architecture for SHared memory), developed at the Computer Systems Laboratory at Stanford University. The DASH architecture, described in *The Directory-Based Cache Coherence Protocol for the DASH Multiprocessor*, Lenoski et al., Proceedings of the 14th Int'l Symp. Computer Architecture, IEEE CS Press, 1990, pp 148–159, which is incorporated herein by reference, consists of a number of processing nodes connected through a high-bandwidth, low-latency interconnection network. As is typical in CCNUMA machines, the physical memory is distributed among the nodes of the multiprocessor, with all memory accessible to each node. Each processing node consists of: a small number of high-performance processors; their respective individual caches; a portion of the shared-memory; a common cache for pending remote accesses; and a directory controller interfacing the node to the network.

A weakly ordered memory consistency model is implemented in DASH, which puts a significant burden relating to memory consistency on software developed for the DASH system. In effecting memory consistency in the DASH implementation of CCNUMA architecture, a "release consistency" model is implemented, which is characterized in that memory operations issued by a given processor are allowed to be observed and completed out of order with respect to other processors. ordering of memory operations is only effected under limited circumstances. Protection of variables in memory is left to the programmer developing software for the DASH multiprocessor, as under the DASH release consistency model the hardware only ensures that memory operations are completed prior to releasing a lock on the pertinent memory. Accordingly, the release consistency model for memory consistency in DASH is a weakly ordered model. It is generally accepted that the DASH model for implementing memory correctness significantly complicates programming and cache coherency.

A bus-based snoopy scheme, as known in the art, is used to keep caches coherent within a node on the DASH system, while inter-node cache consistency is maintained using directory memories to effect a distributed directory-based coherence protocol. In DASH, each processing node has a directory memory corresponding to its portion of the shared physical memory. For each memory block, the directory memory stores the identities of all remote nodes caching that block. Using the directory memory, a node writing a location can send point-to-point invalidation or update messages to those processors that are actually caching that block. This is in contrast to the invalidating broadcast required by the snoopy protocol. The scalability of DASH depends on this ability to avoid broadcasts on an inter-node basis.

The DASH architecture relies on the point-to-point invalidation or update mechanism to send messages to processors that are caching data that needs to be updated. All coherence operations, e.g. invalidates and updates, are issued point-to-point, sequentially, and must be positively acknowledged in a sequential manner by each of the remote processors before the issuing processor can proceed with an operation. This DASH implementation significantly negatively affects performance and commercial applicability. As acknowledged in the above-referenced publication describing DASH, serialization in the invalidate mechanism negatively affects performance by increasing queuing delays and thus the latency of memory requests.

DASH provides "fences" which can be placed by software to stall processors until pending memory operations have been completed, or which can be implemented to delay write operations until the completion of a pending write. The DASH CCNUMA architecture generally presents an environment wherein a significant burden is placed on software developers to ensure the protection and consistency of data available to the multiple processors in the system.

The DASH architecture, and more specifically the memory consistency and cache coherency mechanisms also disadvantageously introduce opportunities for livelock and deadlock situations which may, respectively, significantly delay or terminally lock processor computational progress. The multiple processors in DASH are interconnected at the hardware level by two mesh networks, one to handle incoming messages, and the other to handle outgoing communications. However, the consumption of an incoming message may require the generation of an outgoing message, which can result in circular dependencies between limited buffers in two or more nodes, which can cause deadlock.

DASH further dedicates the meshes for particular service: the first mesh to handle communications classified as request messages, e.g. read and read-exclusive requests and invalidation requests, and the second mesh to handle reply messages, e.g. read and read-exclusive replies and invalidation acknowledges, in an effort to eliminate request-reply circular dependencies. However, request-request circular dependencies still present a potential problem, which is provided for in the DASH implementation by increasing the size of input and output FIFOs, which does not necessarily solve the problem but may make it occur less frequently. The DASH architecture also includes a time-out mechanism that does not work to avoid deadlocks, but merely accommodates deadlocks by breaking them after a selected time period. Although the DASH implementation includes some hardware and protocol features aimed at eliminating processor deadlocks, heavy reliance on software for memory consistency, and hardware implementations that require express acknowledgements and incorporate various retry mechanisms, presents an environment wherein circular dependencies can easily develop. Accordingly, forward progress is not optimized for in the DASH CCNUMA architecture.

The CCNUMA architecture is implemented in a commercial multiprocessor in a Sequent Computer Systems, Inc. machine referred to as "Sting" which is described in *STING: A CCNUMA Computer System for the Commercial Marketplace*, L. Lovett and R. Clapp, ISCA '96, May 1996 incorporated herein by reference. The Sting architecture is based on a collection of nodes consisting of complete Standardized High Volume (SHV), four processor SMP machines, each containing processors, caches, memories and I/O busses. Intra-processor cache coherency is maintained by a standard snoopy cache protocol, as known in the art. The SHVs are configured with a "bridge board" that interconnects the local busses of plural nodes and provides a remote cache which maintains copies of blocks fetched from remote memories. The bridge board interfaces the caches and memories on the local node with caches and memories on remote nodes. Inter-node cache coherency is managed via a directory based cache protocol, based on the Scalable Coherent Interface (SCI) specification, IEEE 1396. The SCI protocol, as known in the art, is implemented via a commercially available device that provides a linked list and packet level protocol for an SCI network. The chip includes FIFO buffers and Send and Receive queues. Incoming packets are routed onto appropriate Receive queues, while the Send queues hold request and response packets waiting to be inserted on an output link. Packets remain on the Send queues awaiting a positive acknowledgement or "positive" echo from the destination as an indication that the destination has room to accept the packet. If the destination does not have queue space to accept a packet, a negative echo is returned and subsequent attempts are made to send the packet using an SCI retry protocol.

The linked list implementation of the SCI based coherency mechanism presents a disadvantage in that the links must be traversed in a sequential or serial manner, which negatively impacts the speed at which packets are sent and received. The retry mechanism has the potential to create circular redundancies that can result in livelock or deadlock situations. The linked list implementation also disadvantageously requires significant amounts of memory, in this remote cache memory, to store forward and backpointers necessary to effect the list.

Machines based on CCNUMA architecture presently known in the art do not take into consideration to any great extent respective workloads of each of the multiple processors as the machines are scaled up, i.e. as more processors or nodes are added. Disadvantageously, as more processors are added in known CCNUMA multiprocessors, limited, if any, efforts are made to ensure that processing is balanced among the job processors sharing processing tasks. Moreover, in such systems, when related tasks are distributed across multiple nodes for processing, related data needed for processing tends to be spread across the system as well, resulting in an undesirably high level of data swapping in and out of system caches.

Methods and operating systems are known for improving efficiency of operation in multiprocessor systems by improving affinity of related tasks and data with a group of processors for processing with reduced overhead, such as described in commonly assigned U.S. patent application Ser. No. 08/187,665, filed Jan. 26, 1994, which is hereby incorporated herein by reference. Further, as described in commonly assigned U.S. patent application Ser. No. 08/494,357, filed Jun. 23, 1995, which is incorporated herein by reference, mechanisms are known for supporting memory migration and seamless integration of various memory resources of a NUMA multiprocessing system. However, known CCNUMA machines generally do not incorporate mechanisms in their architectures for such improvements in load balancing and scheduling.

SUMMARY OF THE INVENTION

The present invention provides a highly expandable, highly efficient CCNUMA processing system based on a hardware architecture that minimizes system bus contention, maximizes processing forward progress by maintaining strong ordering and avoiding retries, and implements a full-map directory structure cache coherency protocol.

According to the invention, a Cache Coherent Non-Uniform Memory Access (CCNUMA) architecture is implemented in a system comprising a plurality of integrated modules each consisting of a motherboard and two daughterboards. The daughterboards, which plug into the motherboard, each contain two Job Processors (JPs), cache memory, and input/output (I/O) capabilities. Located directly on the motherboard are additional integrated I/O capabilities in the form of two Small Computer System Interfaces (SCSI) and one Local Area Network (LAN) interface. The motherboard (sometimes referred to as the "Madre" or "Sierra Madre") includes thereon main memory, a memory controller (MC) and directory Dynamic Random Access Memories (DRAMs) for cache coherency. The motherboard also includes GTL backpanel interface logic, system clock generation and distribution logic, and local resources including a micro-controller for system initialization. A crossbar switch (BAXBAR) is implemented on the motherboard to connect the various logic blocks together. A fully loaded motherboard contains 2 JP daughterboards, two Peripheral Component Interface (PCI) expansion boards, and eight 64 MB SIMMs, for a total of 512 MB of main memory.

Each daughterboard contains two 50 MHz Motorola 88110 JP complexes. Each 88110 complex includes an associated 88410 cache controller and 1 MB Level 2 Cache. A single 16 MB third level write-through cache is also provided and is controlled by a third level cache controller (TLCC) in the form of a TLCC application specific integrated circuit (ASIC). The third level cache is shared by both JPs, and is built using DRAMs. The DRAMs are protected by error correction code (ECC) which is generated and checked by two error detection "EDiiAC" ASICs under the control of the TLCC. Static Random Access Memories (SRAMs) are used to store cache tags for the third level cache. A Cache Interface (CI) ASIC is used as an interface to translate between a packet-switched local (PIX) bus protocol on the motherboard and the 88410 cache controller bus protocol on the JP Daughter Board.

The architecture according to the invention minimizes system bus contention by implementing four backplane or system busses referred to as "PIBus". Each of the four PIBus interconnects is a 64 bit wide, multiplexed control/address/data wire. Multiple system busses may be implemented to provide one, two or four backplane or system busses, depending upon the particular implementation and the related coherency protocol(s). The PIBus, in an illustrative embodiment described hereinafter is used in implementing a directed-broadcast system bus transfer protocol that limits system wide resource overhead to modules or nodes targeted to service a request.

Throughput on the PIBus is maximized, and transfer latencies minimized, by a memory based, full-map directory structure cache coherency protocol, that minimizes snooping. The full-map directory structure is maintained in the memory modules that are accessible over the PIBus. Each directory contains one entry per cache line in the corresponding memory. The directory entries contain coherency information for their respective cache lines. The directory entry fields include: valid bits; modified bit; lock bit; unordered bit and an ordered bit. All memory addresses on the PIBus are routed to the appropriate memory module. Each address is put in a queue for service by the memory. Each address is looked up in the directory and the memory will generate a response based on the directory contents and the type of access requested. The memory will send a response which will be picked up only by those nodes that have a valid copy of the accessed cache line, i.e. a directed broadcast. The responses from memory issued in the directed broadcast transfer protocol include invalidates, copyback and read data. The directed broadcast transfer protocol implementation according to the invention avoids unnecessary processor stalls in processors whose caches do not have a copy of the line being addressed, by forwarding "snoop" traffic in a manner that it will only affect those nodes that have a valid copy of the line being addressed. The memory uses the valid bit field in the directory as an indicator as to which nodes have a copy of an accessed cache line.

Ordering of events occurring with respect to the backbone or backplane PIBus is effected so as to maximize processing forward progress by maintaining strong ordering and avoiding retries. All of the operations initiated by one requester must appear to complete in the same order to all other requesters, i.e. cache, processor(s), I/O, in the system. Events are ordered by adhering to a three level priority scheme wherein events are ordered low, medium or high. Strict rules are implemented to ensure event ordering and to effect coherent ordering on the PIBus between packets of different priorities.

The three level priority scheme according to the invention, works in conjunction with arbitration services, provided by an "ORB" ASIC, to effectively guarantee forward progress and substantially avoid livelock/deadlock scenarios. The arbitration mechanism is a function of the type of bus involved, and accordingly there is arbitration associated with the local PIX bus, i.e. local to the motherboard, and arbitration associated with access to the system wide or PIBus.

The motherboard level PIX busses each use a centralized arbitration scheme wherein each bus requester sends the ORB ASIC information about the requested packet type and about the state of its input queues. The ORB ASIC implements a fairness algorithm and grants bus requests based on such information received from requesters, and based on other information sampled from requesters. The ORB samples a mix of windowed and unwindowed requesters every bus clock cycle. Windowed requests have associated therewith particular time periods during which the request signal must be sampled and a grant issued and prioritized in accordance with predetermined parameters. At the same time that PIX bus requesters are being sampled, the ORB samples the busy signals of the potential bus targets. During the cycle after sampling, the ORB chooses one low priority requester, one medium priority requester and one high priority requester as potential bus grant candidates, based on: ordering information from a low and a medium request tracking FIFO; the state of the Busy signals sampled; and a "shuffle code" which ensures fairness of bus grants. Further selection for a single candidate for the PIXbus grant involves a prioritization algorithm in which high priority requests have priority over medium requests which have priority over low, and in which medium level requests are subjected to a "deli-counter-ticket" style prioritization scheme that maintains time ordering of transactions. High and low priority requests are not strictly granted based on time ordering.

The system wide backpanel, or PIBus arbitration mechanism is handled separately for each of the four PIBusses. The arbitration/grant logic is distributed across respective "PI" ASICs, which facilitates traffic between the PIX bus and the PIBus in both directions. PIBus arbitration is based on a "windowed-priority" distributed arbitration with fairness, in which there are specific times, i.e. windows, during which request signals are sampled and then grants associated with each request are prioritized. The requests are prioritized based on a shuffle code that ensures fairness. Since the arbitration logic is distributed each PIBus requester knows the request status of all the other requesters on the bus, and all the local requester only needs to know if a particular grant is for itself or another requester.

The "BAXBAR" crossbar switch is implemented on the motherboard to connect the various logic blocks of the CCNUMA architecture according to the invention together, and to propagate transfers between the busses on the motherboard and the daughterboard. The crossbar switch supports six 19 bit bidirectional ports and two 18 bit bidirectional ports, and is controlled by a three bit port select and an eight bit enable control. The port select bits control selection of eight potential sources for outputs, and also enable selected output ports.

Features of the invention include a highly efficient, high performance multiprocessor distributed memory system implemented with a high speed, high bandwidth, extensible system interconnect that has up to four busses available for multiprocessor communication. The architecture provides a highly scalable open-ended architecture. In contrast to the typical bus-snooping protocols known in the art, in which each cache must look up all addresses on the bus, the directed broadcast protocol according to the invention increases system performance by not interfering with nodes that do not have a copy of an accessed cache line. Accordingly, unnecessary processor stalls are avoided. The CCNUMA system implementation according to the invention maximizes forward progress by avoiding retries and maintaining strong ordering and coherency, avoiding deadly embraces. Strong ordering, i.e. completion of any two consecutive operations initiated by a single requester being observable by any other entity, i.e. cache, processor, I/O, only in their original order, takes much of the burden and complexity relating to memory consistency out of the hands of software implementations and rest it with hardware in a manner that makes for greater consistency and predictability. The system wide or backplane bus distributed arbitration mechanism ensures fairness in bus accesses while maintaining ordering to a high degree. Node-local centralized local bus arbitration effects highly efficient and fair access to local resources.

BRIEF DESCRIPTION OF THE DRAWING

These and other features and advantages of the present invention will become more apparent from the following detailed description taken in conjunction with the accompanying drawing in which:

FIG. 6 is a Table representing PIXBUS Operation Decode and Queue Priority Assignment;

FIGS. 26A and 26B are Tables of Cache Request Transitions;

FIG. 27 is a Table of Cache Inhibited Request Transitions;

FIGS. 31A, 31B and 31C illustrate crossbar source selection, PORT_OE assignments, and port to bus mapping of the BaxBar crossbar switch, respectively;

DETAILED DESCRIPTION

Figure 1:
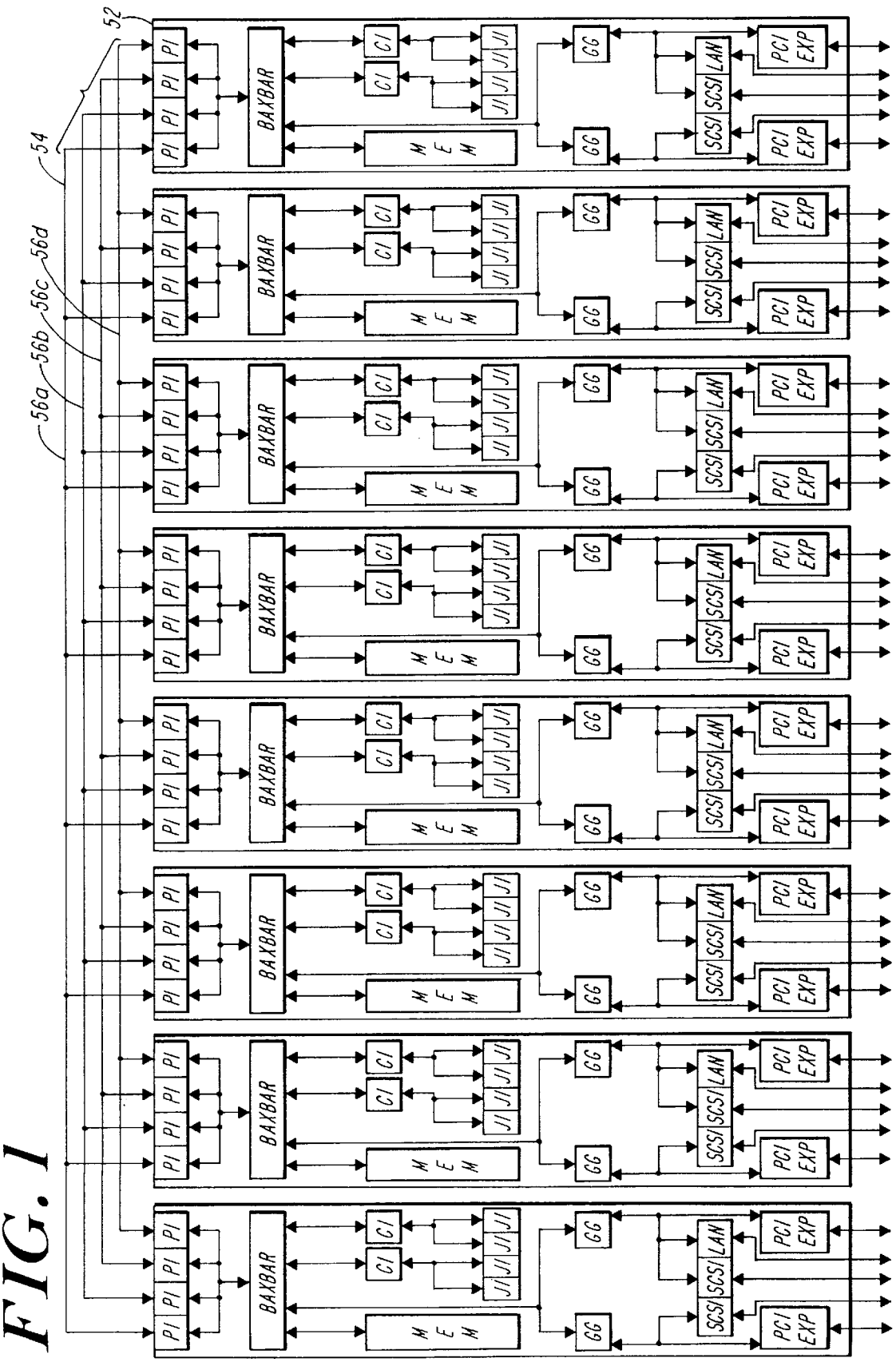
FIG. 1 is a high level block diagram of a multiprocessor system implementing a CCNUMA architecture according to the invention.

As illustrated in FIG. 1, a CCNUMA processing system according to the present invention includes a plurality of motherboards (52) interconnected by a backplane (54). The backplane includes 4 PI buses (56), which provide communication between the motherboards (52). The PI busses (56) are all identical, allowing up to four sets of motherboards (52) to transfer data simultaneously. Each motherboard (52) is a standard module, allowing the processing system (50) to contain virtually any number of motherboards required for the processing load. Motherboards (52) are easily added to increase the processing power.

Figure 2:
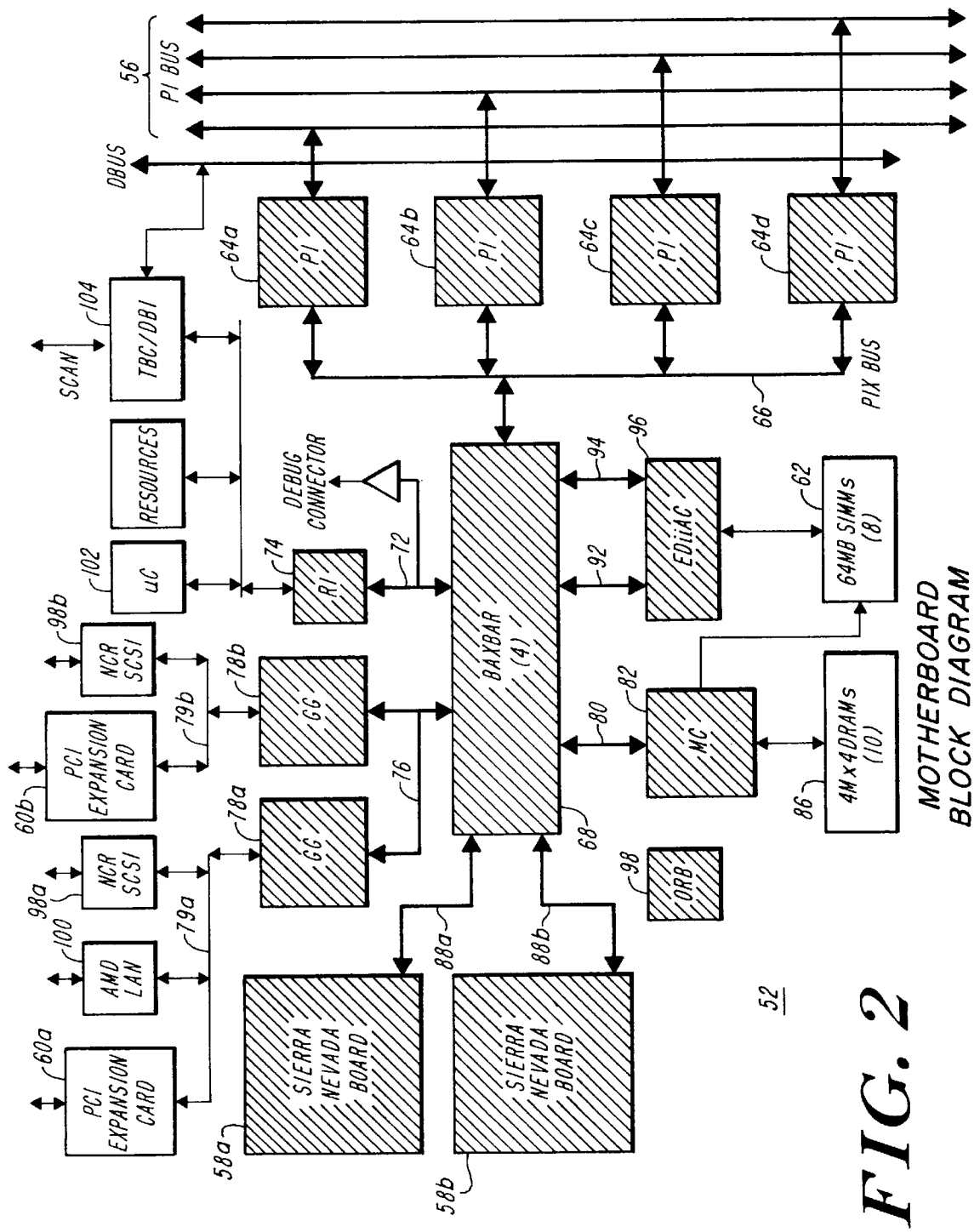
FIG. 2 is a block diagram of a motherboard of the multiprocessor system of FIG. 1.

A single motherboard (52), as illustrated in FIG. 2, is an integrated module containing processors, memory, and I/O. The processors, memory, and I/O expansion facilities are all contained on separate daughter boards or SIMMs (Single Inline Memory Modules) which plug into the motherboard. Located directly on the motherboard there are additional integrated I/O facilities, including 2 SCSI (Small Computer System Interface) and 1 LAN (Local Area Network). The motherboard also includes a memory controller and directory DRAMs (for cache coherency), Local Resources including a micro-controller for system initialization, GTL backpanel interface logic, System Clock generation and distribution logic, and a Crossbar switch to connect the various logic blocks together.

A fully loaded motherboard (52) contains 2 processor Daughter Boards (58a), (58b), two PCI expansion boards (60a), (60b), and 512 MB of main memory (62) comprised of eight 64 MB SIMMs. Many of the functional modules are implemented using ASICs (Application Specific Integrated Circuits).

Functional Overview

PIBus

The primary communication between processors across the backpanel is accomplished using the PIBus Interface. A single PIBus (56) consists of a multiplexed 72-bit Address CTRL/Data bus and associated arbitration and control signals. Each motherboard (52) implements 4 identical PIBus Interfaces using respective PI ASICs (64a–c), as will be described hereinafter. System traffic is partitioned across the 4 PI Busses (56) by address, so that each bus (56) is approximately equally utilized. The PIBus (56) is implemented using GTL logic. This is a logic level/switching standard that allows for very high speed communication across a heavily loaded backpanel. The logic signals switch between 0.4 and 1.2 V.

PIXBus

The PIXbus (66) is the name given to the bus protocol that is used to connect the functional elements of the motherboard (52) together. This is a packetized 72 bit wide multiplexed address/data bus using a similar protocol to that which the PIBus (56) uses across the backpanel (54). This bus (66) is actually implemented as a series of busses that connect into/out of a central crossbar switch (68), referred to in some places herein as the "BaxBar". The PIXbus is implemented, using LVTTL technology, via 4 BaxBar ASICs (70). A major portion of the PIX Bus (66) is an interconnection between the BaxBar ASICs (70) and the four PI (PIBus Interface) ASICs (64a–d). This bus (66) uses AC Termination for signal integrity and timing. Arbitration for the PIXBus is provided by an ORB ASIC (98), as described in detail hereinafter. The complete PIXBus is actually comprised of a plurality of individual busses interconnecting the functional components on the motherboard of the system according to the invention, including:

- an RI bus (72) portion of the PIXBus which connects the BaxBar ASICs (70) to an RI (Resources Interface) ASIC (74) and to debug buffers and a debug connector;
- a GG bus (76) portion of the PIXBus which connects the BaxBar ASICs (70) to two GG (Golden Gate, I/O Interface) ASICs (78a–b). This bus uses series resistors near to the GG for Signal Integrity/timing improvement;
- an MC Bus (80) portion of the PIXBus connects the BaxBar ASICs (70) to a MC (Memory Controller) ASIC (82);
- a CIO Bus (88a) portion of the PIXBus connects the BaxBar ASICs (70) to a first daughterboard (58a);
- a CI1 Bus (88b) portion of the PIXBus connects the BaxBar ASICs (70) to a second daughterboard (58b); and
- MUD_L (92) and MUD_H Bus (94) portions of the PIXBus which are two busses used to connect the BaxBar ASICs (70) to two EDiiAC ASICs (96) facilitating data integrity of data from the memory system which is generally comprised of memory (62) and directory tag memory (86).

Memory Subsystem

The Memory subsystem on the motherboard (52) is capable of providing up to 512 MB of system memory for the processing system (50). Actual DRAM storage is provided by up to eight 16M (36) standard SIMMs (62). One motherboard (52) can be populated with 0, 4 or 8 SIMMs. Data is typically accessed in full 64 Byte Cache blocks, but may also be read and written in double word or 64 bit quantities. The memory data is protected using ECC (Error Correction Code) which is generated for data correction using two of the EDiiAC ASICs (96a–b). Each EDiiAC (96) provides a 64 bit data path and the two are used to interleave within a cache block to maximize performance.

In addition to the main memory data store, the memory subsystem also contains storage for a full map directory (86) which is used to maintain cache coherency, as described in detail hereinafter. The directory (86) is implemented using 4M×4 DRAMs attached directly to the motherboard (52). The directory is organized as a 8M×17 storage using 11 data bits and 6 ECC bits. The ECC codes for both the directory and the main data store are capable of correcting all single bit errors and detecting all double-bit errors.

I/O Subsystem

The I/O subsystem of the motherboard (52) is comprised of two independent PCI channels (79a–b) operating at 25 MHz. Each PCI channel (79) is interfaced to the PIX bus (66) using a single GG ASIC (78) which also contains an integrated cache for I/O transfers. The GG ASIC (78) contains all necessary logic to provide the interface between the 50 MHz PIX bus (66) and the 25 MHz PCI bus (78), including PCI arbitration. The GG ASIC (78) also serves as a gatherer of interrupts from system wide areas and combines these interrupts and directs them to the appropriate processor.

Each of the two PCI busses (79) is connected to an integrated SCSI interface (98), and to a single expansion slot (60). One of the two PCI busses (79a) also contains an integrated 10 Mb LAN interface (100). The two SCSI interfaces (98a–b) are implemented using the NCR825 Integrated PCI-SCSI controller as a pair of Wide Differential SCSI-2 interfaces. Each controller is connected through a set of differential transceivers to a 68 pin High Density SCSI connector (not shown). The single LAN connection (100) is made using the DECchip 21040 PCI-Ethernet controller. This provides a single chip integrated LAN which is connected to an RJ-45 connector (not shown).

The two expansion PCI slots are provided for by attaching a PCI Daughterpanel to the motherboard. This small board provides a connection between high-density AMP connectors and a standard PCI card connector. The board also allows the two PCI cards to be plugged in parallel to the motherboard. The motherboard design has space to allow two half size PCI cards to be plugged into each motherboard. Further PCI expansion is achieved by using a PCI expansion chassis, and plugging a host-side adapter cable into one of the motherboard expansion slots.

Resources

Each motherboard (52) contains all the local resources that are required of a system (50), with the exception of the System ID PROM (not shown) which is contained on the backpanel (54). The resource logic on the motherboard (52) includes a Microcontroller (102), state-recording EEPROMs (Electrically Erasable Programmable Read Only Memory, not shown), NOVRAM (Non-Volatile RAM), and SCAN interface logic (104) which is described in detail in copending commonly owned PCT Application Ser. No. PCT/US96/13742 (Atty Docket No. 158/46,642), HIGH AVAILABILITY COMPUTER SYSTEM AND METHODS RELATED THERETO, which is incorporated herein by reference. The resource logic is duplicated on each motherboard (52), but a working system (50) only ever uses the resources section of the board in either slot0 or slot1 of the backplane system (54) as system wide Global Resources. An RI (Resources Interface) ASIC (74) provides the interface between the PIXbus (72) and the devices within the Resources section on the motherboard (52).

The Microcontroller (102) in the resources section is used to perform low-level early power-up diagnostics of the system (50) prior to de-asserting RESET to the processors. It is also the controller/engine used for all scan operations, as described in the referenced application. Generally, scan is used to configure the ASICs during power up, communicate with the power supplies and blowers, communicate with the various ID PROMs within the system, and to dump failure information after a hardware fatal error. If a processor needs to do a scan operation, it makes a request to the microcontroller (102) which can then perform the required operation.

The Resources sections also provides a DUART (Dual Asynchronous Universal Receiver and Transmitter, not shown) for implementing 3 UART ports for the system (50). A fourth UART port is also used as part of a loopback circuit to allow a processor to monitor what is being driven on the main system console (not shown).

The resources section also provides the logic to do JTAG based scan of all the ASICs in the system (50), power supplies, blowers, SEEPROM and SYSID PROM, in accordance with the IEEE 1149.1 standard. The logic is in place to allow the system to be scanned either during Manufacturing Test using an external tester (e.g. ASSET) or during normal operation/power-up using the microcontroller on any motherboard in the system. This logic allows simple boundary scan testing to be used as part of the power-up system testing to detect and isolate possible faulty components.

Additionally, Macro Array CMOS High Density devices (MACHs) which are high density electrically erasable CMOS programmable logic, on the resource bus can be programmed using JTAG from an external connector. Also, the microcontroller can be used with an external connector to program the EEPROMs on the resource bus. This allows manufacturing to assemble the boards with blank MACHs and EEPROMs and then "burn" them as part of the test procedure, rather than stocking "burned" versions of the parts to be installed during assembly. This "in circuit programmability" feature also makes updates for ECO activity as simple as plugging in the programming connector and re-programming the parts, rather than removing the old part and installing a new part in its place.

Clocks Each motherboard (52) contains the necessary logic to generate and distribute both 50 MHz and 12.5 MHz clocks to the other boards in the system (not shown). It also contains the logic to distribute the received clocks from the backpanel to all appropriate clock loads with a minimum of added skew. The clocks for a system (50) will always be sourced by either the motherboard (52) in slot 0 or the motherboard (52) in slot 1. Each slot receives clocks from both slots and selects clocks from the appropriate slot (slot 0 unless the clocks from slot 0 have failed).

Each motherboard contains two PECL crystals used for generation of all system clocks. These two crystals are a 100 MHz nominal clock crystal and a 105 MHz margin clock crystal. Both of these crystals are passed through a divide by two circuit to produce 50 and 52.5 MHz system clocks with 50% duty cycle. These two clocks are muxed together to produce the system clock for the system (50). The multiplexing is controlled from the resources section and allows either nominal or margin clocks to be used by the system. The chosen clock is buffered and 8 differential copies (one for each slot in a system) are driven out to the backpanel (PECL_CLK_OUT). A ninth copy of the system clock is further divided to produce a nominally 12.5 MHz signal which is used to generate the 12.5 MHz scan/resources clock on each motherboard. Eight differential copies of this signal are also distributed to the backpanel.

Each motherboard receives two 50 MHz system clocks from the backpanel. All first level differential pairs are routed to the same length, and all second level differential pairs are routed to the same length to reduce clock skew.

50 MHz TTL clocks are produced using a translator/distribution device, such as a Synergy Copyclock as known in the art. This device receives a differential PECL clock and translates it to TTL. An external feedback loop is used with the translator to add phase delay to the output clocks until the input of the feedback clock is in phase with the input clock. This has the net effect of eliminating skew between the differential PECL clock distributed to the ASICs and the TTL clock distributed to the EDiiACs (96) and synchronizing buffers.

The PECL clock lines are thevenin terminated to VDD (3.3 V) using 62 ohm over 620 ohm resistors. The TTL clocks are source series terminated inside the translator chip.

Each motherboard (52) generates a 25 MHz clock that is used for the PCI devices. This clock is derived from the 50 MHz system clock divided by two, and is then PECL to TTL translated by the translator. The length of the feedback loop for the translator was calculated to provide the desired skew correction to make the 25 MHz clock have the minimum skew in relation to the 50 MHz clock.

All the clock lines are thevenin terminated the same way as the 50 MHz clocks with the exception of the expansion clocks which are series terminated using 51 ohm resistors.

Each motherboard (52) contains logic that allows it to detect and signal that there is a problem with the clock distribution logic. In slots 0 and 1 this logic also forms a means to have the clock distribution automatically failover from clocks in slot 0 to clocks in slot 1, as described in the referenced PCT application.

Daughter Boards

Figure 3:
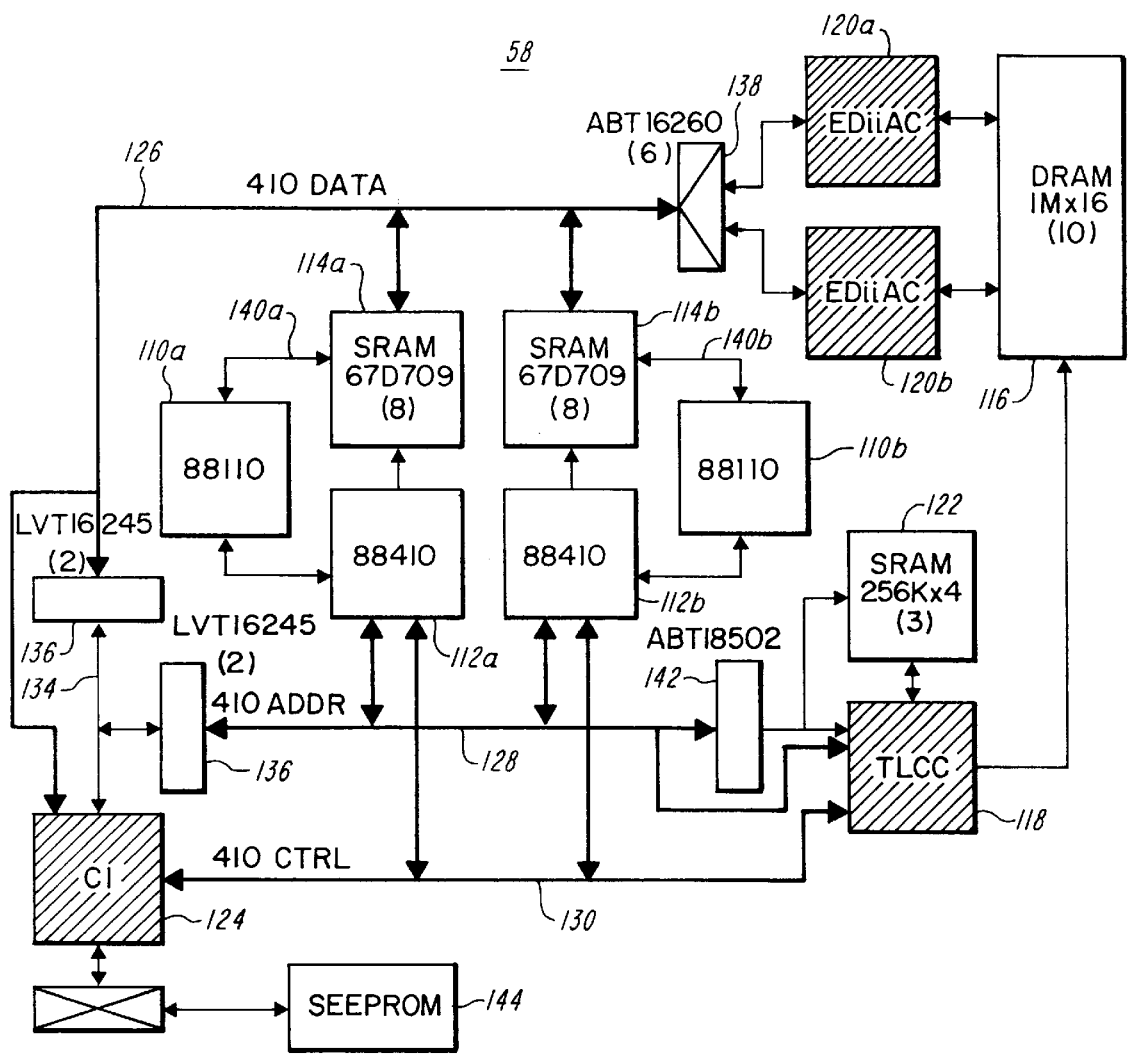
FIG. 3 is a block diagram of one daughter board for connection to the motherboard of FIG. 2.

The system Daughter Boards (58), as illustrated in FIG. 3., each contain two 50 MHz Motorola 88110 processor complexes. Each 88110 processor (110) has an associated 88410 cache controller (112) and 1 MB Level 2 Cache (114) built using eight MCM67D709 SRAMs. A single 16 MB third level write-through cache (116) is also provided and is controlled by a TLCC (Third Level Cache Controller) ASIC (118). The third level cache (116) is shared by both processors (110), and is built using ten 60 ns 1M×16 DRAMs. The DRAMs are protected by ECC (Error Correction Code), which is generated and checked by two EDiiAC ASICs (120) under the control of the TLCC ASIC (118). Tag memory (122) built with three 12 ns 256K×4 SRAMs is used to store the cache tags for the Third Level Cache. A CI ASIC (124) is used to translate between the packet-switched PIX bus protocol on the motherboard (52) and the 88410 cache controller data bus (126) protocol on the Daughter Board (58).

System Functional Description

PIX Bus Interface

The system according to the invention uses a packetized split response bus protocol to communicate between the processors and memory or I/O. The system also uses a Directory based cache coherency mechanism to eliminate snoop cycles on the main system busses. The CI ASIC's (124) main function is to serve as a translation/sequencer between the PIX bus protocol that is used on the motherboard (52) and the 88410 bus protocol on the daughterboard (58). All off board communication with the exception of Clocks and Reset are part of the PIX bus and is connected directly to the CI. The PIX bus (88) consists of a 64 bit address/data bus with 8 bits of parity, 2 additional "bussed" control signals that indicate the length of the current packet and an error indication. There are an additional 11 signals that are used to provide arbitration control. The PIX bus categorizes different bus operations into three different priorities, LOW, MED, and HIGH, and each PIX bus entity implements queues as appropriate to allow it to receive multiple packets of each priority, as described hereinafter. The CI ASIC (124) only receives Low or Med packets and generates only Low and High packets.

Cache Bus Interface

The two CPU complexes, CI, and TLC, all on the daughterboard, are connected together by the S_D bus (126), consisting of 64 bits of data and 8 parity bits, and the S_A bus (128) which consists of 32 bits of address and additional control lines (130). Arbitration for access to the cache bus is performed by the CI ASIC (124). There are three possible bus masters; each of the two processors (110) for read and write operations (data transfers to or from cache) and the CI (124) for snoop operations (no data transfer). The TLC (118) is always a bus slave. Due to pin limitations, the CI ASIC (124) multiplexes the 32 bit S_A (128) and 32 bits of the S_D bus (126) into a 32 bit S_AD bus (134). This multiplexing is done using four LVT162245 devices (134).

When an 88110 processor (110) detects a parity error during a read operation it asserts a P_BPE_N signal for a single cycle. This signal is monitored by the CI ASIC (124) and will cause a Fatal Error to be asserted when detected.

Because the system coherency is maintained by the MC (82, FIG. 2) and the directory, the CPU complexes must be prevented from modifying a line of data that was previously read in. This is done by causing all read requests to be marked as SHARED in the 88410 (112, FIG. 3), and 88110 (110). In hardware, this is accomplished by pulling down S_SHRD_N and S_TSHRD_N pins on the 88410 (112) and the P_SHD_N signal on the 88110 (110).

Third Level Cache

The Third Level Cache (TLC) on the daughterboard (58) is a 16 MB direct mapped cache implemented using 1M×16 DRAMs. The cache is implemented using a write-through policy. This means that the cache never contains the only modified copy of a cache line in the system, and as such only ever sources data to either of the two processors (110) on the daughterboard (58) as the result of a read request.

The data store for the cache is constructed from 10 1M×16 60 ns DRAMs (116). These DRAMs are organized as two banks of 5 DRAMs which contain 64 bits of data plus 8 bits of ECC. Each bank of DRAMs is associated with an EDiiAC ASIC (120a–b) which is used to buffer the data and to perform error detection and correction of data read from the cache. The system outputs of the two EDiiACs are multiplexed down to the 64 bit S_D bus (126) using six ABT16260 2:1 latching multiplexers (138). The tag store for the cache is implemented using three 256K×4 12 ns SRAMs (122). Control for the whole TLC is provided by the TLCC ASIC (118), as described in detail hereinafter. Due to timing constraints on the S_D bus (126) the output enable and mux select for the ABT16260 muxes (138) are driven by an FCT374 octal register (not shown). The inputs to the register are driven out one cycle early by the TLCC ASIC (118). The latch enables used to latch data from the S_D bus (126) also use external logic. They are derived from the 50 Mhz clock, described in the clock distribution section.

The data bits into the low EDiiAC (120b), accessed when a signal S_A[3] is a 0, are logically connected in reverse order, i.e. SD_L[0] is connected to pin SD63, SD_L[1] to pin SD62, SD_L[63] to pin SD0. The parity bits are also reversed to keep the parity bits with their corresponding byte of data. This reversal of bits MUST be taken into account by any software that does diagnostic reads and writes of the EDiiACs (120).

The TLCC (118) is designed to operate correctly with several different types of DRAMs. It is capable of supporting both the 1K and 4K refresh versions of 16 MBit DRAMs. The 4K refresh DRAMs use 12 row address bits and 8 column bits to address the DRAM cell. The 1K refresh parts use 10 row and 10 column bits. To allow the use of either DRAM, row address lines A10 and A11 are driven out on A8 and A9 during the column address phase. These bits are ignored by the 4K refresh components in the column address phase, and the A10 and A11 lines are No Connects on the 1K refresh DRAMS. The TLCC (118) also supports DRAMs that use either 1 or 2 Write Enables (WE). This can be done because the minimum access size for the DRAMs is a 64 bit double word. Therefore, the two WE lines for each DRAM can be tied together. On DRAMs that use a single WE, the extra WE is a No Connect.

CPU Complex

The daughterboard (58) contains two CPU complexes. Each complex consists of an 88110 CPU (110), 88410 Level 2 Cache Controller (112) and 8 67D709 128K×9 SRAMs (114). The 88110 and 88410 are implemented using 299 and 279 PGA's (Pin Grid Arrays) respectively. The SRAMs are 32 pin PLCC's and are mounted on both sides (top and bottom) of the daughterboard (58).

The SRAMs (114) are 67D709 SRAMs that have two bidirectional data ports which simplifies the net topology for data flow from the memory system to the processor. One data port is used to transfer data to/from the 88110 on the P_D bus (140a–b), the other data port connects the two SRAM complexes together and also connects to the TLC muxes and either the CI or the CI transceivers on the S_D bus (126). The board (58) is laid out so that the S_D bus (126) is less than 8.5" in length. This length restriction allows the bus (126) to be operated without any termination and still transfer data in a single 20 ns cycle. The P_D bus (140) is a point-to-point bus between the SRAMs (114) and a single 88110 (110). This bus is approximately 6" long.

The control signals for the SRAMs (114) are driven by the 88410 (112) for all accesses. To provide the best timing and signal integrity for all of these nets, they are routed using a "tree" topology. This topology places each of the 8 loads at an equal distance from the 88410 (112a–b), which helps to prevent undershoot and edge rate problems. The exception to this topology is R_WE_N[7:0] lines which are point-to-point from the 88410 (112) to the SRAMs (114). These use 22 ohm Series Resistors to control the edge rate and undershoot (not shown).

To prevent Write-through operations from occurring on the System bus a P_WT_N pin on the 88110 (110) is left disconnected, and the corresponding pin on the 88410 (112) is pulled up. To help alleviate some hold time issues between the CI ASIC (124) and the Cache RAMs, the Cache RAM clocks are skewed to be nominally 0.2 ns earlier than the other 50 MHz clocks on the board (58).

Clocks

The daughterboard (58) receives two PECL differential pairs from the motherboard (52) as its source clocks (not shown). One of the pairs is the 50 MHz System Clock and the other is the 12.5 MHz, test/scan clock. Each of the two clocks is buffered and distributed as required to the devices on the daughterboard (58). The clock distribution scheme on the daughterboard (58) matches that used on the motherboard (52) to minimize overall skew between motherboard (52) and daughterboard (58) components. Differential PECL is also used to minimize the skew introduced by the distribution nets and logic.

All etch lengths for each stage of clock signal distribution tree are matched to eliminate skew. There are a couple of exceptions to this. The clocks that are driven to the 2nd Level Cache RAMs (114) are purposely skewed to be 500 ps earlier than the other 50 MHz clocks. This is done to alleviate a Hold time problem between the CI ASIC (124)

and the SRAMs (114) when the CI ASIC is writing to the SRAMs (line fill).

JTAG

The daughterboard (58) has a single IEEE 1149.1 (JTAG) scan chain that can be used both for Manufacturing and Power-Up testing, and scan initialization of the CI (124) and TLCC (118) ASICs. The EDiiACs (120), 88110's (110) and 88410's (112) all implement the five wire version of the JTAG specification, but will be operated in the 4-wire mode by pulling the TRSTN pin high. The CI (124), TLCC (118), and board level JTAG logic all implement the four wire version. A TCK signal is generated and received by the clock distribution logic. The devices in the chain are connected in the following order: CI (124)→Lo EDiiAC (120a)→Hi EDiiAC (120b)→TLCC (118)→TLC Address Latch (142) →88110 A (110a)→88410 A (112a)→88110 B (110b) →88410 B (112b)→SEEPROM (144).

SEEPROM

A Serial EEPROM (144) is used on the daughterboard (58) to provide a non-volatile place to store important board information, such as Board Number, Serial Number and revision history. The SEEPROM chosen does not have a true JTAG interface, therefore it cannot be connected directly into the scan chain. Instead, a JTAG buffer 74BCT8373 (not shown) is used to provide the interface between the two serial protocols.

System ASICs

Much of the functionality effected in the CCNUMA system according to the invention is implemented in ASICs, as generally described hereinbefore, and more particularly described hereinafter.

PI ASIC

In monitoring PIBUS-to-PIXBUS traffic, the PI ASIC determines when some node starts a tenure on the PIBUS by observing the request lines of all the nodes, and calculating when the bus is available for the next requester. The PI ASIC(s) (of which there are four, 64a–d, and which may be referred to interchangeably as "PI") have responsibility for examining all traffic on the PIBUS (56), and responding to specific operations that it is involved in. The PI determines when a transfer is started by monitoring the PIBUS request information. There are three different ways that an operation can be decoded as targeted to a particular PI's node. These are: Node-field Bit Compare, ID Originator Node Parsing, and Address Decode.

The first beat (i.e. data transfer during one system clock cycle) of a transaction packet (also known as a Header beat) is always either a node type or an address type. If the first beat is a node type then the second beat is always an address type. Information in the operation field determines which combination of decode mechanisms to use.

If the first beat is a node type, then this transfer has come from a memory controller's (82) directory control logic. Transfers require snooping local to all nodes which have their respective bit set in the 16-bit node field. If the bit is set, the PI (64) is responsible for requesting the PIXBUS (56) and forwarding the transfer inward.

If the first beat is address type, then the operation field is parsed to determine whether to look at the requester ID or the address. If the first beat operation field implies the requester ID match the PI's node ID register, then the PI is responsible for requesting the PIXBUS and forwarding the transfer inward.

If the first beat is address type, and the command field does not imply the requester ID compare, then the address is parsed to determine if the PI's node is the target of the transfer. If the physical address range compare results in a match, then the PIXBUS (66) is requested, and the transfer is forwarded inward.

If the address range compare results in a match for the control, internal devices, or I/O channel mappings, the PIXBUS is requested and the transfer is forwarded inward.

Figure 4:
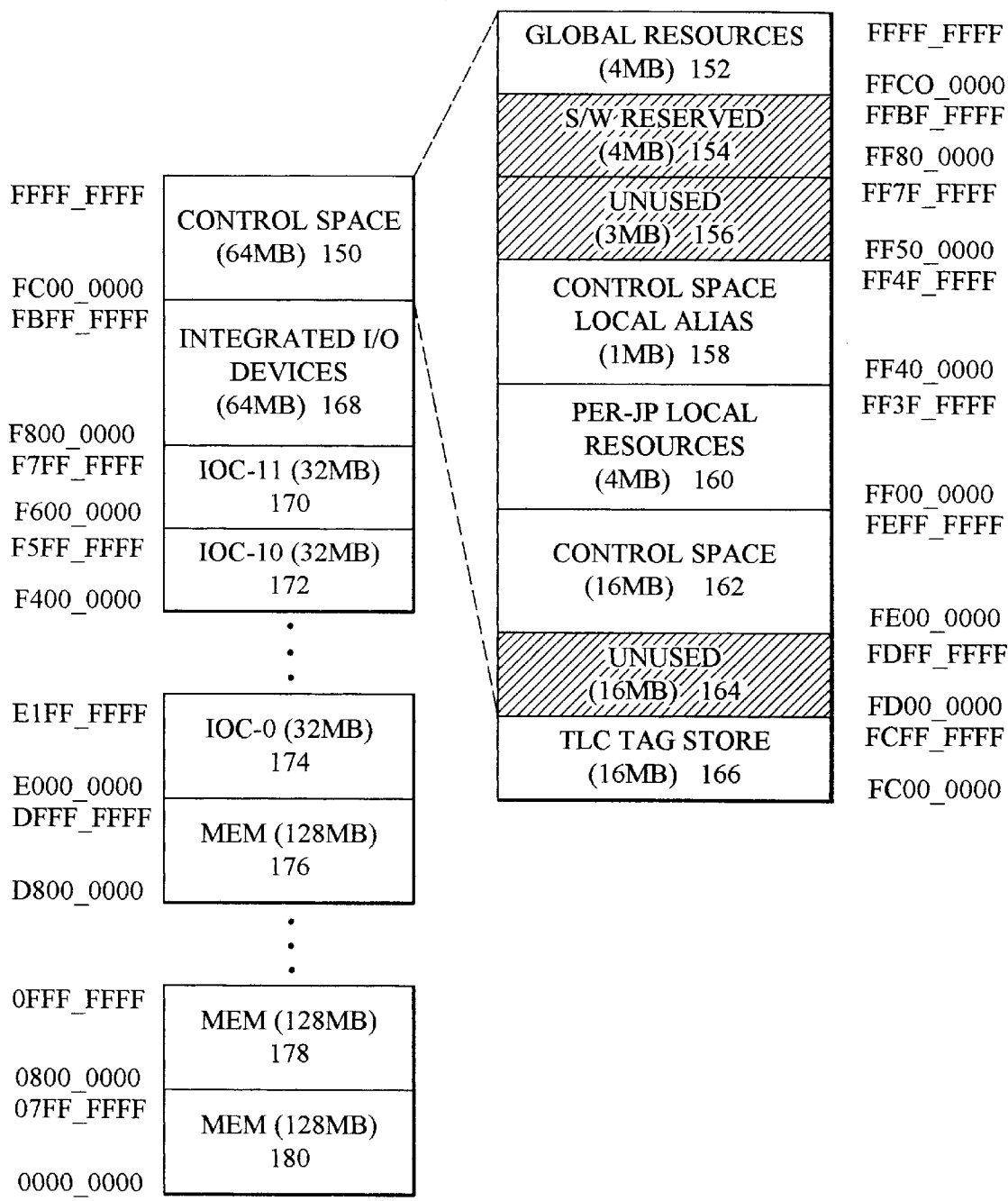
FIG. 4 is a memory map of distributed system memory distributed among the motherboards of the multiprocessor system of FIG. 1.
Figure 5:
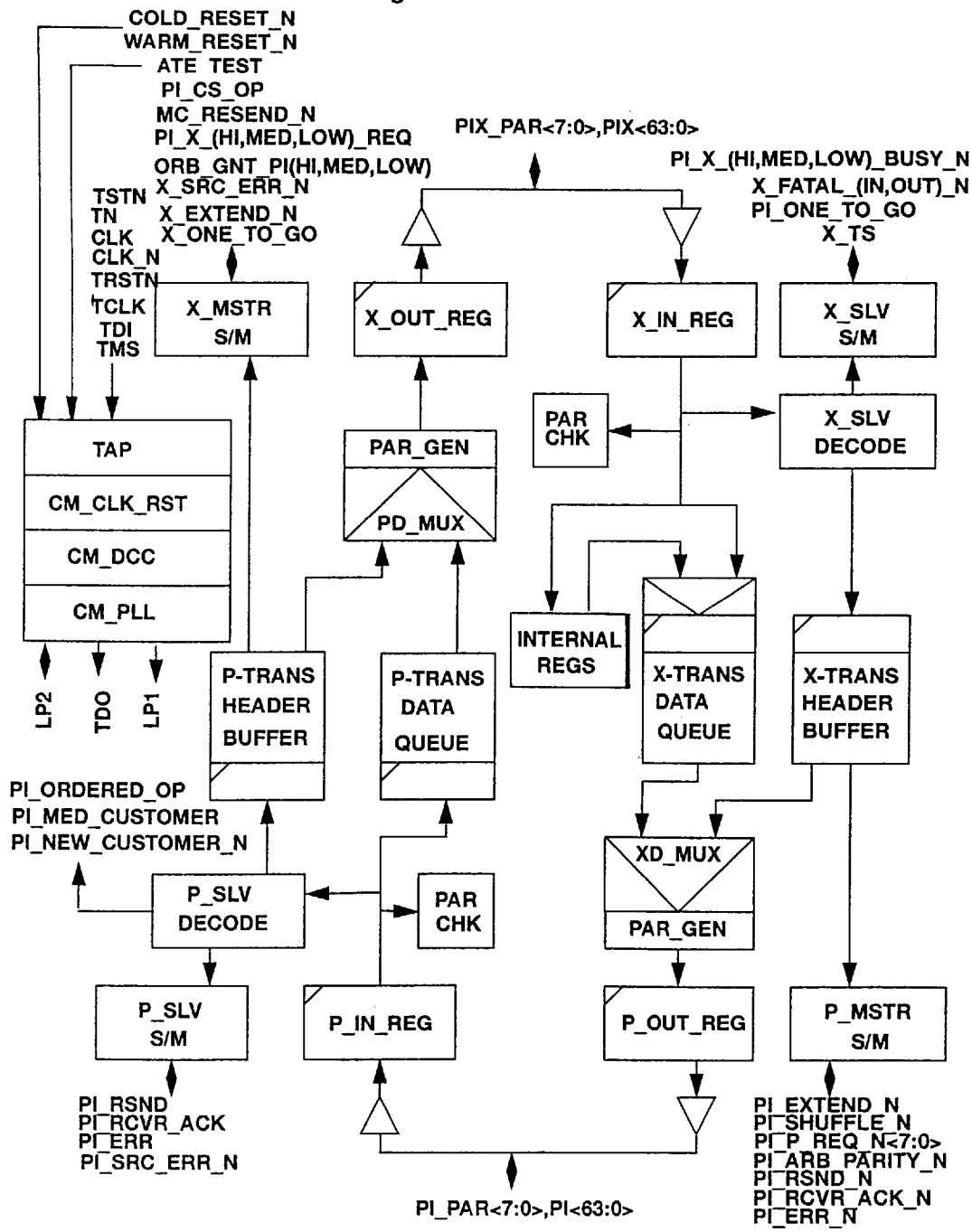
FIG. 5 is a block diagrammatic overview of a PI asic controlling access to and from a system backplane or PIBus.
Figure 7:
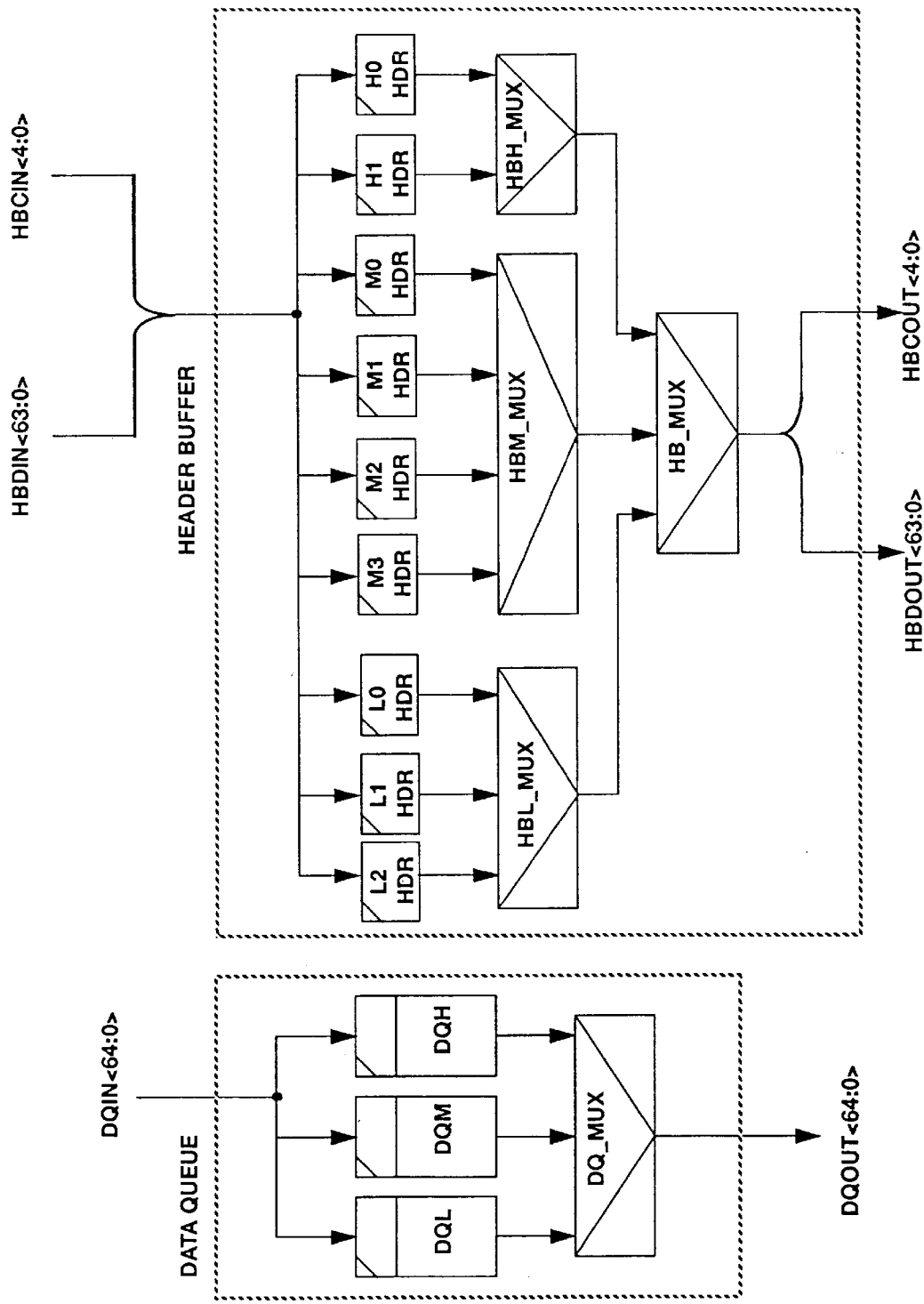
FIG. 7 is a block diagram of a PI Header Buffer and Data Queue.

Address decode consists of five range compares. These range compares are based on boundaries which are initialized at powerup. The memory map for the illustrative embodiment of the multiprocessor system according to the invention is shown in FIG. 4.

The global resource space (150) resides in the top 4 MB of the 32-bit address range. It is contiguous. Only one node (i.e. motherboard) in the system is allowed to respond to Global Space access. Global Space (150) contains resources such as PROM, DUARTs, boot clock, and a real time clock (RTC, not shown). A Valid bit in an address decoder will be used to determine which node currently owns the Global Space.

Directly below the global resource space is 4 MB of Software Reserved area (154) and 3 MB of unused memory space (156). Below the Software Reserved Space is 1 MB of Local Control Space Alias (158). It is used to access node local control space without having to know specifically which node it is accessing. This function is implemented in the CI ASIC (124), which converts any address issued by a processor (110) in the local control space alias (158) into an address in that node's control space.

The Per-JP Local Resources (160) follow the Local Control Space Alias segment. Per-JP Local Resources include 88410 (112) flush registers, a WHOAMI register used to identify a respective node, per-JP programmable interval timer (PIT), per-JP Interrupt registers, and cross interrupt send registers.

The next segment is the 16 MB Control space (162). Control Space is evenly partitioned over 16 nodes, so the minimum granularity for decoding of incoming addresses is 1 MB.

The next segment used is the 16 MB of Third Level Cache (TLC) Tag Store (166). The TLC maps addresses into this space to allow simple access for prom initialization and diagnostics. JP generated addresses in this range will not appear beyond the bus which the TLC resides (i.e. CI (124) will not pass these addresses to the CI_BUS (130),(126)). Therefore, the PI ASIC (64) will not have to do any special address decode for this address range.

Directly below Control Space (150) is the 64 MB dedicated to the integrated devices (168). The PI ASICs (64) will have a 2 MB granularity while the GG ASICs (78) will have a 1 MB granularity. Integrated Device space must be contiguous on each node. Holes are allowed between node assignments.

I/O channel space (172–174) exists between the highest physical memory address and the lower limit of the integrated devices space in the address range E000_0000 to F7FF_FFFF. It must be contiguous on each node. Holes are allowed between node assignments. It has a 32 MB granularity. It is typically used for VME (Versa Module Eurobus) I/O.

Physical memory (176–180) must be contiguous on each node. Holes are allowed between node assignments. However, some software may not allow such holes. Physical memory has a granularity of 128 MB. The architecture of the present system is set up to require that one node in the system contain modulo 128 MB of memory starting at address 0 (bottom of memory).

Incoming PIBus Transfer (PIBus to PIXbus)

The third cycle of a PIBUS transfer is the reply phase. This allows one cycle for decoding of the address/node information presented in the first beat. The interpretation of these pins differs between node and addr type first beats.

If the first beat is a node type, then this operation is snoopable. Under that condition, all PIs (64) whose Node ID match their respective node field bit found in the node beat and is able to accept the transfer (P-TRANS queue not full) must assert PI_RCVR_ACk_N. If a PI's Node ID matches it's respective node field bit and the PI's P-TRANS queue is full, the PI must assert PI_RSND_N. If no PI_RCVR_ACK_N or PI_RSND_N is asserted during the reply cycle, this is a system fatal error, and must be reported as such.

To ensure that none of the target PI ASICs (64) forwards the transfer inward (onto the PIXBUS (66)) until all targets receive a complete transfer, the target PI ASICs (64) will wait one cycle after the reply to either request the PIXBUS (66) or to discard the transfer. All target PI ASICS (64) must discard the transfer if there was a PI_RSND_N in the reply phase.

If the first beat was address type, then this operation is not snoopable. Therefore, there is only one intended target, and only the intended target is to assert either PI_RCVR_ACK_N or PI_RSND_N. If no PI_RCVR_ACK_N or PI_RSND_N is asserted during the reply cycle, Low priority operation types will be transformed into a NACK type operation while other types will result in a fatal error, since it implies there was no target node responding. In addition, if intended target observes PI_RSND_N asserted without it being the source of PI_RSND_N this is a fatal system error since only one node can respond to an address type beat.

Since the node field of a command-node beat is only used to parse operations incoming from a PIBUS (56), it is not necessary to forward that beat to the node's PIXBUS (66). All incoming node type beats will be dropped when placing the transfer in the P-Transaction Queues.

Note that all of the command information of the address type beat is identical to the command of the node type beat, and an address type is sent with every packet.

PIBUS-to-PIXBUS Queue & Buffer Selection

There are three PIBUS incoming queues in the PI (HI, MED, LOW). Header beat operation fields are parsed to determine which queue they should be sent to. The reason that there are three queues with different priorities is to order incoming requests and to promote forward progress. This is accomplished by ordering the completion of in-progress operations within the system ahead of new operations that will inject additional traffic into the system.

The HI priority queue is dedicated to operations that have made the furthest progress, and can potentially bottleneck the memory system and prevent forward progress of the operations that have already referenced memory on some module. Examples are CB_INV_RPLY, CB_RPLY and WB (e.g. copyback-invalidate-reply, copy-back reply and write-back operations, respectively).

The MED priority queue is dedicated to operations that have made the furthest progress, and will result in completion or forward progress of the operations that have already referenced memory on some module. Examples are INV_CMD and RD_S_REPLY (e.g. invalidate and read-shared-reply).

The lower priority queue is dedicated to those operations that when serviced will cause the injection of more, higher priority traffic into the system. These are operations which have not yet been acted upon by memory such as RD_S and CI_WR (e.g. read_shared and cache inhibited_write). Since the ORB (98) determines which queue gets granted a transfer on the PIXBUS there may be cases where the ORB allows some lower priority transfers to go ahead of higher priority transfers.

Requests are indicated when the PI asserts the signals PI_X_HI_REQ_N, PI_X_MED_REQ_N or PI_X_LOW_REQ_N for a high, medium or low request respectively. A PI (64) will initiate a request only if there is a valid entry in one of the queues.

Once a particular high, medium or low request has been made it remains asserted until the ORB (98) grants the PI (68) a bus tenure of that priority. Other ungranted requests will remain asserted. For high and low requests, de-assertion occurs in the cycle after receiving the grant even if there are more entries of that priority in the queue. The medium request will remain asserted if there are more mediums in the queue.

A new high or low request can only be made if the previous high or low transfer did not have a MC_RESEND_N signal asserted in the fourth cycle of the transfer. This signal represents a limitation that prevents the PI from streaming transfers of HI or LOW priority through the PI. However, full PIXBUS bandwidth can be utilized by the PI if there are two transfers of different priority ready to be transmitted to the PIXBUS. Also, the other PIs on the PIXBUS may request independently of each other so one of the four PIs (64) dropping it's request will have little impact on the PIXBUS bandwidth utilization.

A PI (64) will change the amount of time it takes to re-request the PIXBUS (66) on a resend. A backoff algorithm is used to progressively keep it from re-requesting the bus for longer periods of time. This helps prevent a PI (64) from wasting PIXBUS cycles resending operations to ASICS that recently have had full input queues. The progression of backoff time is as follows: 0,1,3,7,15,16,18,22, 30,31,1,5,13, . . . . This is done by using a 5-bit decrementor and a starting value for each subsequent backoff is increased from the previous value by 1,2,4,8,1,2,4,8, . . . . The decrementor gets cleared if no resend is seen for the priority being backed-off or if a resend is seen for another priority. There is only one decrementor, and it always keeps track of the backoff needed for the last priority to get a resend.

PIXBUS Grant

Granting of PIXBUS (66) tenure is determined by the ORB (98) through assertion of the ORB_GNT_PI_HI, ORB_GNT_PI_MED, and ORB_GNT_PI_LOW input signals. The ORB (98) will only grant tenure if the PI asserts PI_X_HI_REQ_N, PI_MED_REQ_N, or PI_X_LOW_REQ_N signals for indicating, respectively, a high, medium or low priority request. Once granted the PI will select the HI, MED or LOW queue that corresponds to the grant. The PI will then transfer the oldest operation of that priority which the queue holds.

The ORB (98) may grant any PI (64) tenure without regard to any PI, PIXBUS, queue status, except when a PI (64) is making a low priority request while asserting PI_CS_REQ. In this case, the ORB (98) must respect the requesting PI's assertion of busy, via a PI_X_MED_BUSY_N queue status and not grant the requesting PI (64). PI_CS_REQ will be asserted anytime the PI (64) holds a low priority PI control space access operation in the queue. Low priority PI requests that are granted when PI_CS_REQ is asserted will result in a low priority queue transfer to the medium priority queue for control space access processing.

To ensure system coherency, it is necessary that the PI ASICs (64) prevent any IM type of operation who's cache block address matches any INV_CMD or RD_INV_RPLY (i.e. invalidate or read_invalidate_reply), to be forwarded to a memory system. This prevention is called squashing. Squashing in the PI ASIC (64) is achieved by transforming such operation types to be a NOP type (i.e. no operation), where it will be treated as a NOP on the PIXBUS.

Any operations currently existing in the PI queues that are Intent to Modify (IM) type operations are squashed if the current incoming INV_CMD or RD_INV_RPLY address matches any of the three possible low priority header buffer entries with any such operations. Any such operations which are currently being decoded are squashed if the associated cache block address matches any INV_CMD or RD_INV_RPLY address within the other header buffer or those which are currently being decoded.

Nodes (motherboards) that just received IM operations that resulted in a squash must assert a PI_RSND_N signal on the PIBUS to force potential receivers of such operations to squash any possible IM operations just received.

There are two different modes of operation for PIBUS transfers involving PI_RSND_N (or PI_RCVR_ACK_N), i.e. resend or receiver acknowledge, responses.

If the operation is targeted at only one PIBUS resident (i.e. the first beat of transfer is an address transfer), then only the targeted PIbus interface is allowed to issue a PI_RSND_N (or PI_RCVR_ACk_N) response. Therefore, when the PIBUS interface receives an address, and that address is resolved to reside on the node, it can be forwarded immediately. This is a non-broadcast type operation.

If the operation is potentially a multi-target (i.e. the first beat of transfer is a node bit field), then any targeted PIBUS interface is allowed to issue a PI_RSND_N (or PI_RCVR_ACK_N) response. However, since the operation cannot be operated on until all parties involved are able to accept the operation (no one asserts PI_RSND_N), it cannot be forwarded immediately. This is a broadcast type operation.

PIXBUS Arbitration

PIXBUS (66, 68, 72, 76, 80, 88, 92, 94 of FIG. 2) arbitration takes three different forms, one for each of the incoming queue types. HI (high) priority arbitration takes precedence over MED (medium) priority arbitration. MED priority arbitration takes precedence over LOW (low) priority arbitration. MED priority arbitration uses a delicounter ticket style mechanism to support the time ordering of transactions. HI and LOW priority arbitration are not confined to granting based on time ordering.

Requests are indicated when the PI (64) asserts any of the signals PI_X_HI_REQ_N, PI_X_MED_REQ_N or PI_X_LOW_REQ_N for a HI, MED or LOW request respectively. The ORB (98) array is responsible for servicing requests from the PI with a fairness algorithm. The ORB (98) array bestows bus tenure, i.e. issues a grant, to the PI (64) by driving a ORB GNT_PI_HI, ORB_GNT_PI_MED and/or ORB_GNT_PI_LOW signal.

For the MED priority input queue, the ORB (98) array maintains a Deli Count or "ticket" assigned upon the arrival of a remote MED priority type access targeted to the node. This arrival is indicated to the ORB (98) by the receiving PI (64) asserting a PI_MED_CUSTOMER signal. This indicates to the ORB (98) array that the PI (64) is utilized this ticket. The ORB array will then increment the ticket value, wrapping if necessary, for the next cycle. The actual ticket values are maintained in the ORB. The PI's PI_ORDERED_OP output is asserted upon the enqueing of a CI_RD, CI_WR or CI_WR_UNLK (i.e. cache-inhibited-read, write or write unlock) low priority operation type or INV_CMD, or RD_INV_RPLY (i.e. invalidate or read_invalidate_reply) medium priority operation type into the PI queue(s). The PI_ORDERED_OP signal is used by the ORB (98) to give special priority to these types of operations when one of the PIs (64) has a MED priority operation that needs special ordering.

A PI_NEW_CUSTOMER_N output is asserted by the PI on any enqueing of a MED priority or LOW operation into the queue.

A ONE_TO_GO signal is asserted by the PI (64) when it knows that the next beat is the last beat of the packet for which it was granted. The ORB (98) can use this signal to determine when the tenure is about to end.

An X_XTEND signal is asserted by the PI (64) in all cycles it expects to have bus tenure after the first beat transferred. The PIXBUS receiver can use this signal to determine when the tenure has ended.

The PI (64) removes Medium priority operations from its queue in the cycle after its operation transfer was granted since there is no MC_RESEND_N possible for medium priority transfers. That is, the memory controller, as described in detail hereinafter, will not resend medium priority data transfers. Any data associated with the Medium operation transfer is removed as it is transferred. High and Low priority operations cannot be removed until after the MC_RESEND_N signal is checked in the reply cycle. If there is a resend, the transfer completes as it would without the resend. The only difference is that the operation information and associated data is retained in the PI (64) for re-transmitting when re-granted.

PIXBUS-to-PIBUS Traffic

The PI (64) determines when a transfer starts on the PIBUS by observing an X_TS signal which accompanies the first beat of a packet transfer.

The PI (64) is responsible for examining all traffic on the PIXBUS, and responding to specific operations that it is involved in. There are three different ways that an operation can be decoded as targeted to a particular PI. These are: RMT_SNP Bit Compare, Requester ID Node Compare and Address Decode.

The first beat of a transaction packet (also known as a Header beat) is always either a node type or an address type. If the first beat is a node type and an RMT_SNP bit is set, then the second beat is always an address type. Otherwise, it is just an address type. Information in an operation field determines which combination of decode mechanisms to use. These are summarized in the Table of PIXBUS Operation Decode and Queue Assignment, FIG. 6. PIXBUS operations are the same format as those of the PI BUS (56). The only exception is that inbound node type operations have their node headers stripped. Inbound node type operations will not have the RMT_SNP bit set.

If the first beat is a node type, then this transfer has come from a memory controller's directory control logic. Transfers require snooping local to all nodes which have their respective bit set in a 16-bit node field. To distinguish between a snoop which was generated on this node and one which as already been forwarded to the PIBUS, the RMT_SNP bit is used. If the bit is set, and this beat is a node type, then the PI (64) is responsible for requesting the PIBUS and forwarding the transfer inward. If the RMT_SNP bit is not set, and this beat is a node type, then the PI (64) will only check the packet's parity.

If the first beat is an address type, then the operation field is parsed to determine whether to look at the requester ID or the address fields. This determination is summarized in the Table of FIG. 6.

If the first beat is an address type, and the operation field implies the requester ID match the PI's node ID register, then the PI (64) is responsible for requesting the PIBUS and forwarding the transfer outward. If the first beat is a address type, and the command field does not imply the requester ID compare, then the address is parsed to determine if the PI's node is the target of the transfer. If the physical address range compare DOES NOT result in a match, then the PIBUS is requested, and the transfer is forwarded outward. If the address range compare DOES NOT result in a match for the control, internal devices, or I/O channel mappings, the PIBUS is requested and the transfer is forwarded outward. If the address range compare DOES result in a match for the PI control space mappings and an ASIC ID matches, the PIBUS is requested and the transfer is forwarded outward. This match is indicated with a PI_OUR_ASIC signal. Address decode for the PIXBUS is the same as the PIBUS address decode.

PI BUS Selection

If a PIXBUS operation needs to be forwarded to the PIBUS the four PIs must determine which PI (64) will accept the operation. This filtering process is done using information from the address beat of a transaction header. For non-PI control space operations an address bit 19 is XORed with an address bit 7 and address bit 18 is XORed with address bit 6. The resulting two bit code is used to be compared with what codes will be allowed by ADDR_76_EN configuration bits. If that code is allowed by the PI (64) the operation will be accepted by the PI. For PI control space operations only address certain bits, i.e. 7,6, which are used as the two bit code.

There are three PIXBUS incoming queues in the PI (HI, MED, LOW). Header beat Operation fields are parsed to determine which queue they should be sent to. The three queues have different priorities. Anything residing in the HI priority queue has priority over everything in the MED & LOW priority queue. Anything residing in the MED priority queue has priority over everything in the LOW priority queue. The reason that there are three queues with different priorities is to order incoming requests and to promote forward progress. This is accomplished by ordering the completion of in-progress operations within the system ahead of new operations that will inject additional traffic into the system.

The HI priority queue is dedicated to operations that have made the furthest progress, and can potentially bottleneck the memory system and prevent forward progress of the operations that have already referenced memory on some module. Examples are CB_INV_RPLY, CB_RPLY, and WB, as discussed hereinbefore.

The MED priority queue is dedicated to operations that have made the furthest progress, and will result in completion or forward progress of the operations that have already referenced memory on some module. Examples are INV_CMD and RD_S_REPLY.

The lower priority queue is dedicated to those operations that when serviced will cause the injections of more higher priority traffic into the system. These are operations which have not yet been acted upon by memory such as RD_S & Cl_WR.

All incoming packet transfers are put in their respective priority queues. The only exception is that for Cl_RDs and Cl_WRs which are targeted to the PI's control space and received from the PI (64) itself. This is the case of remote PI control space access. In this case the low priority operation is put into the Medium queue instead of the Low queue. This is done to prevent deadlocking situations involving remote PI control space access.

PIBUS requests are asserted with the PI_P_REQ_N<7:0> signals. Once granted the PI (64) must drop it's request. New requests are only asserted when PIBUS arbitration logic allows a new window (See PIBUS Arbitration). There must be a valid queue entry in either the high, medium or low queue before the PI (64) will request the PIBUS. A request may be delayed if there is a resend reply on the PIBUS bus.

Selection of which of the high, medium or low queue for output depends on the setting of a P_OUT_SHUF_ARB state, and which queues contain valid entries. If P_OUT_SHUF_ARB=0 then all valid high queue entries will get sent before all medium and low entries and all medium entries will get sent before all low entries. Priority will be ordered HI, MED, LOW.

If there is a resend reply on the PIBUS for an operation of a given priority then the PI (64) will shift its priority scheme to MED, LOW, HI) and select the next valid priority operation for output next time. If there is also a resend reply for this operation then the PI (64) will shift again to LOW, HI, MED. If there is yet another resend reply the PI (64) will shift again to HI, MED, LOW and so forth until an operation is sent without a resend reply. Once sent the priority goes back to the original HI, MED, LOW priority scheme.

If the P_OUT_SHUF_ARB=1, then a shuffling of the queue priority occurs like that of the shuffling done for PIBUS arbitration. For one operation the priority will be HI, MED, LOW, then the next will be MED, LOW, HI, then LOW, HI, MED, and back to HI, MED, LOW.

To ensure system coherency, it is necessary that the PI (64) ASICs prevent any intent to modify (IM) type of operation who's address matches any INV_CMD or RD_INV_RPLY to be forwarded to a memory system. As discussed hereinbefore, this prevention is called squashing. Squashing in the PI ASIC will be achieved by transforming the IM operation to a NOP type operation where it will be treated as a NOP on the PIXBUS.

Any IMs currently existing in the PI (64) queues are squashed if the current incoming INV_CMD or RD_INV_RPLY address matches any of the three possible low priority header buffer entries with IMs. Any IMs which are currently being decoded are squashed if the IM address matches any INV_CMD or RD_INV_RPLY address within the other Header buffer or those which are currently being decoded.

Unlike the PIBUS-to-PIXBUS transfer, there is no required latency in requesting the PIBUS. This is because there are no PI (64) targeted PIX transactions which can be signalled to be resent. The ORB (98) will guarantee that there is always enough PIXBUS input queue space to accept a transaction which it grants onto the PIXBUS. The only exception to this rule is the memory controller (MC) input queue which can cause a MC_RESEND. However, the transaction which is resent by the MC will never be a PI (64) targeted transaction and so it can be assumed that if a PI (64) detects a PIBUS bound transaction it will complete without a resend response.

PIBUS arbitration is based on a "Windowed-Priority" distributed arbitration with fairness. What this means is that there are specific times (windows) where the PI_REQ_P_N (request) signals are sampled and then grants associated with each request are prioritized based on a predetermined code known as the shuffle code.

Since this arbitration logic is distributed, each PIBUS requester knows the request status of all the other requesters on the bus. The local requester only needs to know if a particular grant is for itself or another requester.

The shuffle code used in the PI (64) is simply a 3-bit counter. It is initialized on reset with the lower three bits of a NODE ID value which is unique for each NODE. The NODE ID counter is also initialized at reset with the NODE ID. Shuffles are allowed if configured to do so, or after the first PIBUS transfer window and then both counters count up by one anytime all requests in a given window have been granted.

Figure 8:
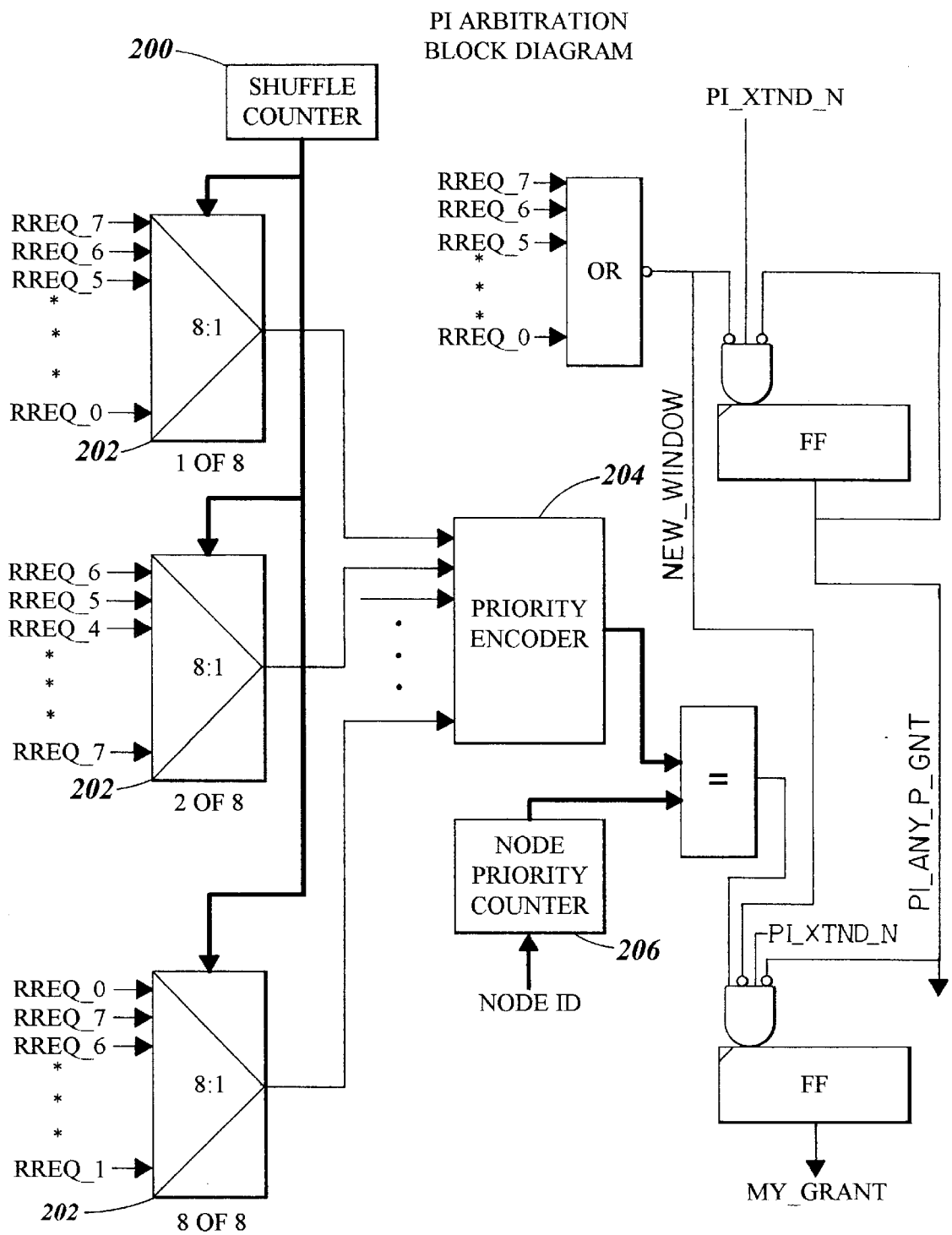
FIG. 8 is a block diagram of PI arbitration.

The PIs (64) will only assert new requests on these window boundaries. As PIs are granted within a window, the PI (64) must deassert the request that was made in that window. A simplified block diagram of the PI Arbitration Logic is shown in FIG. 8.

The shuffle code/counter (200) is used as a MUX select for each of the eight 8:1 multiplexers (202). Each 8:1 MUX has a specific permutation of request signals. The output of the multiplexers is connected to a 8-bit priority encoder (204). The 3-bit output of the priority encoder is compared against the NODE ID counter 206 output. If the shuffled prioritized encoded request matches the NODE ID count then the PI (64) is granted the PIBUS tenure.

The PI_ANY_P_GNT signal is used by the P_SLV_SM to know that a new PI (64) BUS transfer will begin next cycle.

The PI (64) ASIC will only enable one PI_P_REQ_N<7:0> corresponding to the node number at which the PI (64) resides. All others will be configured as input only in normal mode operation.

The PI (64) expects an acknowledge (Pl_RCVR_ACK_N) in the third cycle of the transfer it originates. If there is no acknowledge for a low priority operation, then the PI (64) will create a NACK type packet back to the requester. For all other operation priorities a fatal error will result.

The PI (64) also expects a PI_RSND_N (if any) in the third cycle of the transfer it originates. Note that the PI (64) always sends the entire transfer to the PIBUS even if there is a PI_RSND_N.

The PI (64) removes an operation from its queue in the cycle after its operation transfer was acknowledged with no resend (Pl_RCVR_ACK_N=0, PI_RSND_N=1). If there is a resend, the transfer completes as it would without the resend. The only difference is that the operation info and associated data is retained (or converted to NACK type) in the PI (64) for re-transmitting when re-granted. If a PIBUS is deconfigured then all the PIs on that PIBUS must be deconfigured even if they are fully functional.

MEMORY CONTROLLER/MC ASIC

Figure 9:
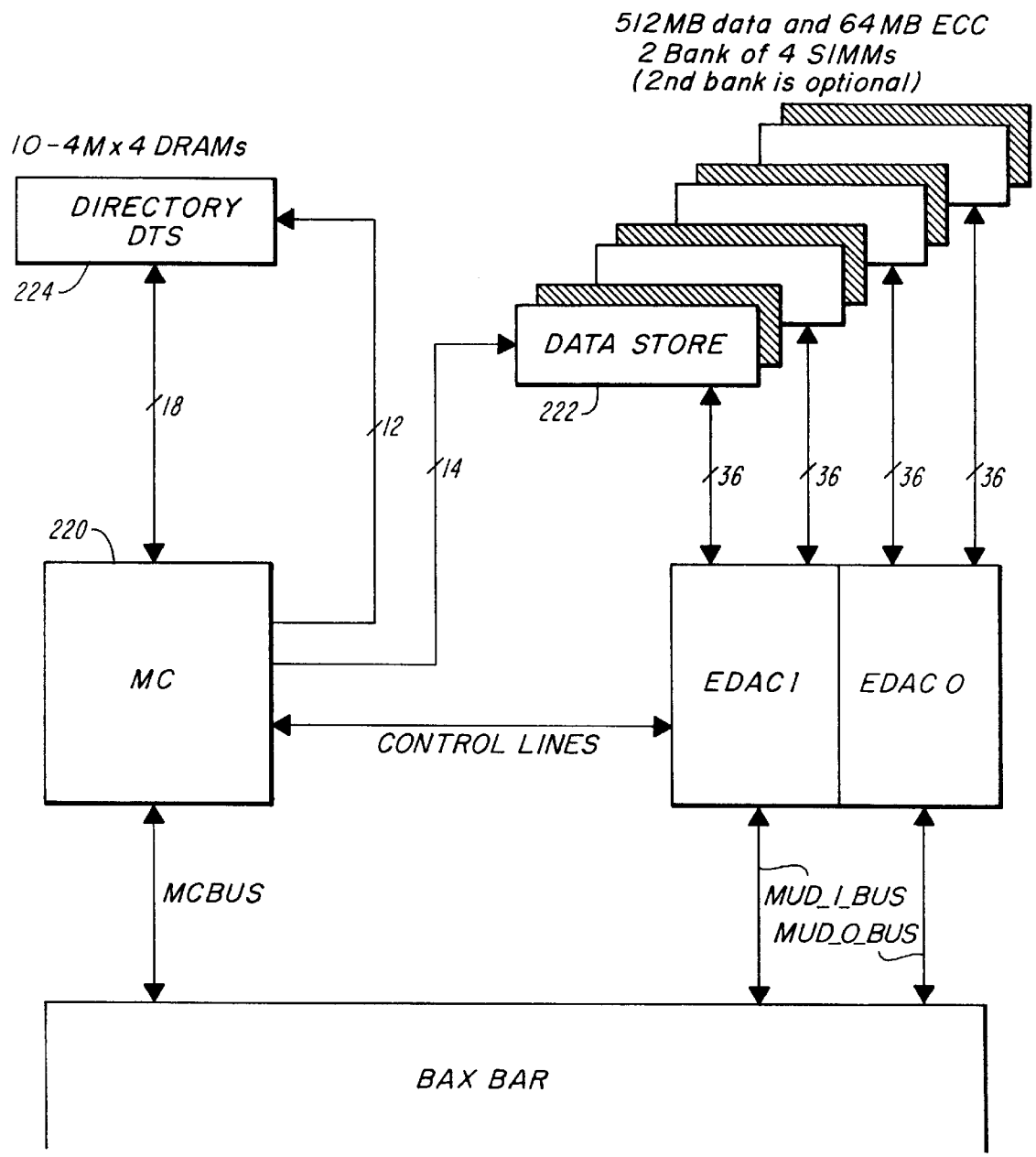
FIG. 9 is a high level block diagram of the memory complex of the multiprocessor system of FIG. 1.

The memory system in the CCNUMA architecture according to the invention, illustrated in FIG. 9, is also implemented via an ASIC, referred to as a memory controller (MC) (220). Generally, the MC provides the interface to physical memory (222) for the multiprocessor system, and maintains memory system coherency by implementing a coherency directory (224) for memory. The MC comprises a plurality of functional elements that are described hereinafter.

The Memory Controller chip (MC) (82, FIG. 2) controls the execution of physical memory operations. This involves managing both the Directory which maintains system coherency and the memory data store DRAMs. The MC operates at 50 MHz, the standard system clock speed. It is capable of receiving a new packet every 20 ns until its queues are full. The MC is designed to operate on a split transaction, packetized bus based on the architecture defined herein. It is estimated that the MC needs to deliver 115 MB/sec of memory bandwidth for the system according to the invention. This includes a 30% overhead budget.

There is one MC ASIC per motherboard board (52), controlling from 0 to 512 MegaBytes, or ½ a GigaByte of local memory. The MC, illustrated in FIG. 10, processes memory transaction packets that are driven onto the MCBUS by the BAXBAR. The packets may have originated on any of the local busses or on the PIBUS. To ensure packet ordering needed for coherency, all packets affecting the same block address will always use the same PIBUS. The MC checks packet addresses to decode if they address near or far memory. The MC will accept only near memory packets. The MC accepts high and low priority packets and issues only medium priority packets. Packets issued by the MC can never be retried.

The MC has a four packet input queue (230) and four packet output queue (232). only the packet header beats are enqueued in the MC. The data beats are enqueued in EDiiACs (described in detail hereinafter), which include the data queues (FIFOs) for the memory DRAM data store. The one exception to this are Local Register writes, which are entirely enqueued in the MC. Memory responses (both data and coherency commands) are driven onto the MCBUS as a packet. The MC (with the help of the EDiiACs) performs ECC error detection and correction on DRAM data and checks parity on MCBUS packets. There are two EDiiACs per MC. Each of the EDiiACs has a 64-bit data path and an 8-bit ECC path. When the DRAMs are read or written, the EDiiACs act in parallel to provide a 128-bit data path for the DRAMs. When the EDiiACs drive or receive data from the MUD_BUS (i.e. MUD_1, MUD_S, used to connect the BaxBar ASICs (70) to two EDiiAC ASICs (96)), they operate in series, each being active every other cycle. This provides a 64 bit data path to the MUD_BUS and allows a data beat every cycle, even though each EDiiAC by itself can only drive one data beat every other cycle.

The MC provides all the control for the EDiiACs and also provides the data store addresses, row address select (RAS), column address select (CAS) and other DRAM control signals.

MC Directory Manager

The MC includes a Directory Manager functional element that maintains coherency information on each block of physical memory. The information is stored in the directory which is implemented in DRAM. The directory indicates which system nodes (a motherboard is equivalent to a node) hold valid cached copies of memory blocks. It also indicates if a node has a modified version of a memory block and if a memory block is currently locked for the use of a single processor. For each packet that requests memory access, the Directory Manager will examine the corresponding directory information before allowing memory to be altered. When necessary to maintain coherency, the Directory Manager will issue invalidates and copyback commands. The Directory Manager will update the directory information before servicing the next memory request.

MC Directory

The directory that the directory manager manages maintains system coherency. It stores 11 bits of coherency information for every block of data. Each directory entry describes the state of one memory block (also called a cache line). The coherency information stored in the directory is at a node level. Coherency issues below the node level are the responsibility of the node itself. The directory state is stored in a combination of a Directory Store (DTS) and Copyback Contents Addressable Memory (Copyback CAM or CAM), which are described hereinafter.

For each memory access that the MC performs, it must look up the memory address in both the DTS and the CAM to determine the coherency state of the block. The state determines what response the MC will make to the memory request. A memory block can be in any of the five following states:

UNUSED. This state means that the block is not resident in any caches in the system. The only valid copy of the block is in memory. All valid bits and the modify bit are zero in this state.

SHARED. This state means that there may cache line are the same as the copy held by the memory. One or more valid bits in the directory are set and the modified is zero.

MODIFIED. This state means that one and only one cache in the system has a copy of the cache line. This cache's copy is assumed to be different than the copy held by the memory. One valid bit is set along with the modified bit in this state.

LOCKED. This state means that this cache line has been locked by a system requestor. The cache line is unavailable to other requestors until it is unlocked. This state is a cache inhibited state so no shared copies exist. The lock bit is set in this state and all vbits are zero.

BUSY This state means that this cache line has an outstanding copyback command. The directory entry bits are unchanged when a copyback command is issued, so the modified bit and the vbit of the node which currently holds the data will still be set to one. The busy state is set by loading the address, opcode and requestor ID of the request in to the Copyback CAM.

These five states are qualified with the UNORDERED bit which indicates whether the cache line is subject to packet ordering constraints. This affects whether local replies need to travel via the PIBus, but does not affect the type of reply packet or the coherent directory state.

MC Directory Store

The memory's directory information is stored in DRAMs controlled by the MC ASIC. Each entry in the Directory Store (DTS, 224, FIG. 9) corresponds to a block in the main DRAM data store. Each DTS entry is protected with 6 bits of ECC, used to provide single and double bit error detection and single bit error correction. The DTS is addressed with a 12-bit address bus that is separate from the address bus for the data store. These separate busses are needed to allow multiple accesses to the directory (read and write) while a single multiple-beat block is being accessed in the data store. The DTS will may be implemented with 32 MB DRAM SIMMs, which would be incompletely used, since only 24 MBs are needed.

For each DTS entry, bit assignments are as follows:

Bit[10]—Unordered

Bit[9]—Lock

Bit[8]—Mod

Bit[7:0]—Vbits (Node 0=Bit 0)

Vbits—8 bits—one valid bit for each possible node. Vbit=1 indicates that the corresponding node has a valid copy of this block.

Mod—1 bit—the modified bit. Mod=1 indicates that one node has a modified copy of this block and the data in memory is stale. When Mod=1, there must be one and only one Vbit set.

Lock—1 bit—the lock bit. Lock=1 indicates that a node has locked the block for its exclusive use. When the lock bit is set, there can not be any Vbits set.

Unordered—1 bit—the unordered bit. Unordered=1 indicates that any local read replies from this block must be sent via the backplane to insure ordering with any outstanding invalidates.

Busy—A Copyback CAM hit. A directory entry is busy if its block address matches the tag stored in a valid Copyback CAM entry. Such a CAM hit indicates that there is an outstanding copyback request for this block. The memory DRAMs hold stale data for this block so this block is unusable until copyback data is received.

Basic Memory Read Access

The following is a detailed description of how a read request is processed by the MC. A Read request packet is present on the MCBUS. The MC registers the first word, which is the header, into an Input Register portion of local registers (226). The packet address and command are inspected and since the packet is of interest to the memory it is passed through the Input Queue (230) to the DRAM Controller (232). The address is passed through the RAS/CAS address logic of the DRAM Controller (232), where it is converted into a two part 12-bit DRAM address. The RAS and CAS strobes are also created there, as are the WRITE and CHIP_SELECT signals. The address is then clocked into the both Address Registers (234) in the address logic (232), one of which addresses the Data Store DRAMS and the other addresses the DTS DRAMS. At this point the two registers hold the same address and the Data Store and the DTS will be read simultaneously.

The Directory bits for that address are read from the DTS and registered into the Directory data path (RDP) input register (236). They are then passed through the ECC checking logic (238) and corrected if necessary. The directory bits are then pass to the Header and Directory Decode Module (240) where it is determined what actions must be taken to maintain coherency. New directory bits are generated and passed through ECC generation and into the RDP (236) output register. From there the new directory bits and ECC are written into the DTS. The DTS reads and writes are only one beat each, while the read of the Data Store are 4 beats. Therefore the DTS write can be started while the Data Store read is still in progress. Thus the need for separate address registers for the DTS and Data Store.

Once the directory bits are decoded, the Header Encode Module (242) generates a 64-bit header for either a coherency command packet or for a Read Reply packet that will supply the requested read data to the requesting node. The completed header is registered into the Output Queue (246). When the header is at the top of the Output Queue (246), it will be registered into the Output Register. Simultaneously with the Directory being read, the corresponding data is read from the Data Store DRAMS.

Figure 10:
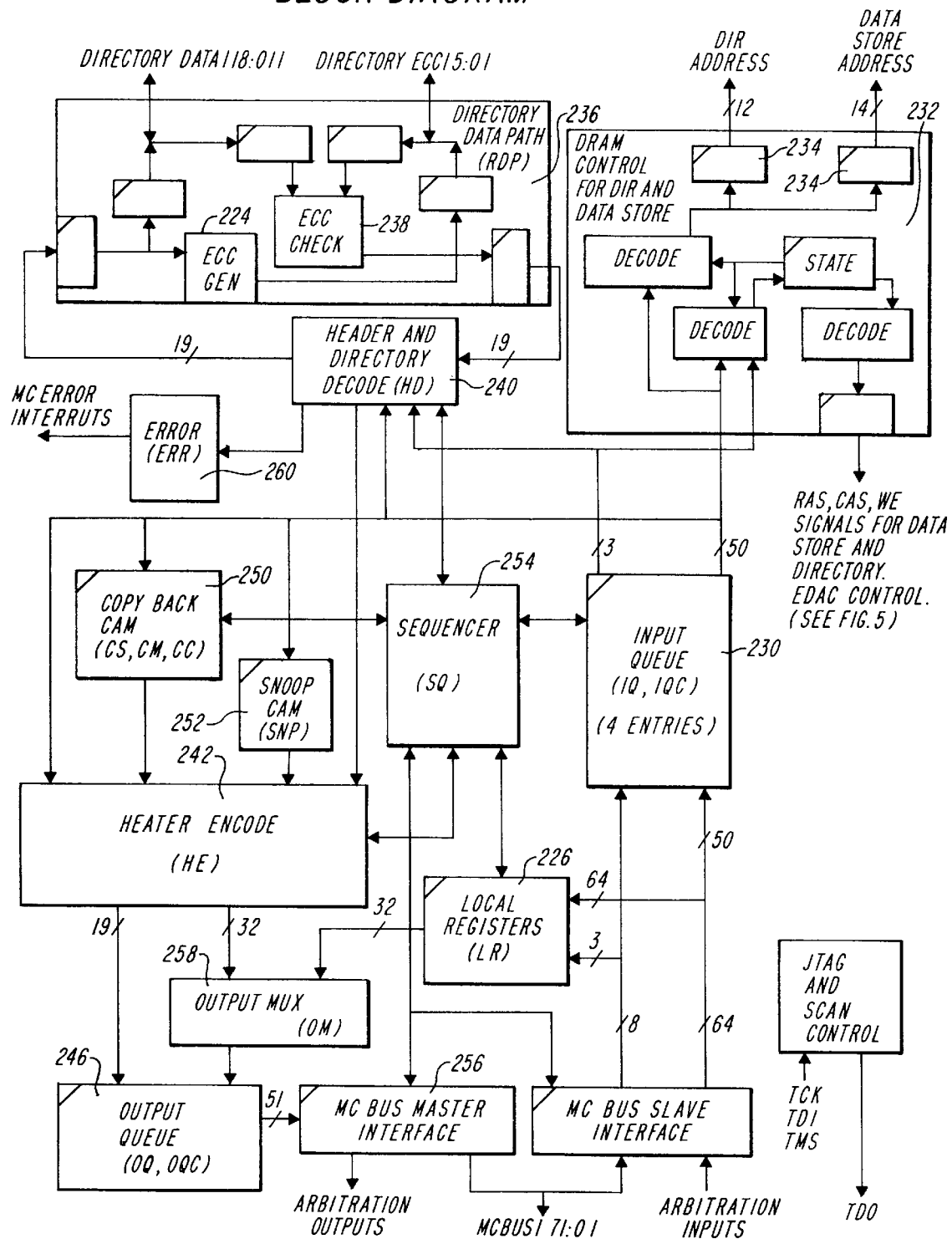
FIG. 10 is a block diagram of a memory controller ASIC.

As the data is read, it is passed through ECC checking and corrected if necessary. 128 bits are read at one time and loaded into a Read FIFO in the EDiiACs (not shown in FIG. 10). Cache line reads are burst reads of 64 bytes. This will require four DRAM reads. Partial reads will read only 128 bits and only one 64 bit beat will be sent with the reply packet. If a Command packet is required for coherency, then the data read from the DRAMs is stale and will not be used. When the command packet gets to the top of the output queue, the stale data will be removed from the EDiiAC read FIFOs.

Once the MC has arbitrated for and been granted the MCBUS, an Output Register portion of the local registers (226) drives the new packet header to the BAXBAR. The EDiiACs will drive the data, if any, onto the MUD_BUS the cycle immediately following the header on the MCBUS. If there is an uncorrectable error in the data read from the DRAMs, the MC and EDiiACs will finish putting the packet onto the MCBUS and the MC will also raise MCBUS_SCR_ERR (Source Error).

Basic Memory Write Access

Write requests are processed by the MC. Each of the memory operations that the MC will support are handled in a very similar manner, as described hereinafter.

A write request packet is present on the MCBUS. The MC registers the first word, which is the header, into the Input Register portion of the local registers 226. The packet address and command are inspected and since the packet is of interest to the memory it is passed through the Input Queue (230) to the DRAM Controller (232). Address bit 3 and the HI_WR_RAM signal are passed to Data Path Control logic which must begin to write data from the MUD_BUS into the EDiiAC FIFOs in the following cycle. Any data words following the header are driven onto the MUD_BUS by the BAXBAR and registered into a Write FIFO in the EDiiACs.

The address is passed through the RAS/CAS address logic of the DRAM Controller (232) in the MC, where it is converted into a two part 12-bit DRAM address. The RAS and CAS strobes are also created there, as are the WRITE_ENABLE signals. The address is then clocked into both Address Registers, one of which addresses the Data Store DRAMS and the other addresses the DTS DRAMS. At this point the two registers hold the same address but only the DTS will be read.

If the write is a block write (WB, CB_INV_RPLY or CB_RPLY), the DRAMs begin writing the data. This means that any coherency errors discovered by the directory can not stop the data from being written into the memory. These errors will be fatal. If the write is a partial write (CI_WR, CI_WR_LK or WR_THRU), the write of the data store DRAMs can not begin until the directory has been read and decoded.

The Directory bits for the referenced address are read from the DTS and registered into the Directory Data Path (RDP, 236) input register. They are then passed through the ECC checking logic (238) and corrected if necessary. The directory bits are then passed to the Header and Directory Decode Module (240) where it is determined what actions must be taken to maintain coherency. New directory bits are generated and passed through ECC generation (244) and into the RDP output register. From there the new directory bits and ECC are written into the DTS.

Once the directory bits are decoded, the Header Encode logic (242) generates a 64-bit header for an ACK packet, if necessary. The complete header is registered into the Output Queue (246). When the header is at the top of the Output Queue, it will be registered into the Output Register portion of the Local Registers (226).

The write data is written into the Data Store DRAMS as soon as the directory bits are decoded. The burst write will take four 128-bit writes to complete. Partial writes will require reading the block out of the DRAMS, merging in the new data and then writing the modified block into the DRAMS. This occurs in the EDiiACs.

If a Command packet is required for coherency, then the data in the EDiiAC write FIFO can not be written to the DRAMs and is removed from the FIFO before the MC begins decoding the next request packet.

The directory location that corresponds to the main memory location being accessed must be initialized either explicitly or by a "stuff" operation before that main memory location can be accessed.

The state of a directory entry is determined by the highest priority directory bit set in that entry. There are five potential directory states. The priority of the bits is listed below. There is no busy bit stored in the directory. A hit in an MC Copyback CAM (250), when checking for a directory entry, indicates that the directory block is busy.

Busy (CAM hit)—highest priority
Lock—second highest priority
Mod—third highest priority
VBits—lowest priority The five states are as follows:

| Directory State | Busy | Lock | Mod | VBits |
|---|---|---|---|---|
| Busy (Copyback CAM HIT) | 1 | X | X | X |
| Locked | 0 | 1 | X | X |
| Modified | 0 | 0 | 1 | X |
| Shared | 0 | 0 | 0 | non-zero |
| Unused | 0 | 0 | 0 | 0 |

The system according to the invention implements a mechanism referred to as Queue squashing. Queue squashing is a mechanism to remove from the packet stream as many stale Intent to Modify (IM) packets as possible. A squashed packet is either removed from the stream or is turned into a NOP. Squashing mechanisms are implemented in the MC, PI and CI ASICs.

If all stale IMs were allowed to reach the Directory, some might look like valid operations by the time they arrived. Squashing as many stale IMs as possible limits how much the directory state has change since the invalidate that made the IM stale. This increases the chances of detecting that the IM is stale. A stale IM needs no reply packet and should not change any directory state.

If the MC receives a stale IM that it can not tell is stale, it will allow the directory to mark that block as modified by that requestor. However that requestor does not have a copy of the block. When that requestor receives the INV_CMD that was intended to give it ownership of the block, the requester will respond with an UNDO_MOD packet which restores the directory's state to shared for that block.

Queue squashing is implemented by checking any IM in an ASIC queue against any invalidates (RDJNV_RPLY or INV_CMD) that are in queues passing in the other direction. The MC checks for IMs in its Input Queue and for invalidates in its Output Queue. If an IM and an invalidate have the same address, the IM is squashed.

If the IM is already in the Input Queue when the invalidate enters the Output Queue, the IM is turned into a NOP. When it reaches the top of the Input Queue, it is immediately dequeued. If the invalidate is already in the Output Queue when the IM arrives at the MC, the IM is enqueued in the Input Queue as a NOP. The enqueue can not be aborted, so only the opcode is altered. When the NOP reaches the top of the Input Queue, it is immediately dequeued.

If a stale IM reaches the directory, it will be recognized as stale if the directory state read is illegal for an IM. In that case a NOP reply packet is generated. The reply packet is necessary because the MC may already be requesting the bus before it realizes that the IM is stale.

A stale IM can reach the directory when the invalidate command is sent to a PI in order to go to the backplane for snooping, and the IM arrives at the MC from a requestor on the same board as the MC. In that case the IM and the invalidate will never pass each other in any pair of queues.

In addition to the functionality described hereinbefore, the MC communicates with the control and status registers inside the EDiiAC ASICs. A more detailed description of the registers and how they are used is set forth in a discussion of the EDiiAC ASIC hereinafter.

The main memory DRAMs are accessed through a pair of EDiiAC ASICs (also referred to as the EDACs). The EDACs contain the read and write FIFOs for the memory data. When a read reply packet is sourced by the memory, the header beat is driven by the MC ASIC, the first data beat is driven by one EDAC, the second databeat is driven by the other EDAC, and the two EDACs continue to alternate for the rest of the data beats. The EDACs are selected between by bit 3 of the address. The EDACs just alternate driving data beats because they operate at half the speed of the PIX Bus.

The EDACs contain one control register and two status registers. These EDAC registers are not PIX Bus compatible, so software access must access the registers by sending control space requests to the MC ASIC. The MC reformats the requests and forwards them to the EDACs. These forwarded operations are referred to as EDAC Diagnostic Mode operations.

When the MC receives a request to read or write an EDAC diagnostic mode register, the request is enqueued in the MC input queue (230) and a flag indicating that this is an EDAC diagnostic mode operation is set in the queue entry. This flag, IQ_EDAC_MODE, remains set until it is dequeued from the Input Queue. This flag is used by the decode tables in the MC Header and Directory Decode module (240) to give high priority packets special treatment, as explained below.

An additional state bit, HI_EDAC_MODE, is also set when the operation is enqueued. HI_EDAC_MODE stays set until the MC is granted the bus to issue a NOP packet to the specified EDAC. As long as HI_EDAC_MODE is set, the MC will assert MC_BUSY_LO_N. This keeps the MC from receiving any more low priority packets. The MC does not assert MC_BUSY_HI_N. If the MC receives a high priority write, the write is performed, but a RETRY packet is generated if the high priority packet hits a read request in the Copyback CAM. This avoids enqueueing a read reply with data beats. This use of MC_BUSY_LO_N and RETRY responses guarantees two things: that the MC will not receive any more EDAC diagnostic mode operations until this one is complete; and that the MC will not enqueue any more read data into the EDAC FIFOs until this diagnostic mode operation is complete. This guarantees that the EDAC Read FIFOs will be empty when the NOP diagnostic mode packet gets to the top of the MC output queue.

When the EDAC diagnostic mode packet gets to the top of the input queue, the MC enqueues two packets in the output queue. This is the only time that the MC generates two reply packets for one input packet. The first packet enqueued is a NOP with eight data beats. The first data beat contains an instruction to the EDAC control register that specifies the desired diagnostic operation. The second data beat returns the EDAC control register to its normal value. The other data beats are ignored.

The second packet enqueued is the reply to the requestor who initiated the diagnostic operation. If the operation was a read, the reply will be a single beat RD_S. If the operation was a write or clear, the reply will be an ACK.

MC/System Bus Arbitration

The arbitration of the MCBUS and MUD_BUS is included in the local bus arbitration. When one local bus on a motherboard is granted, all the busses are granted.

The MC receives high and low priority packets, and sources only medium priority packets. The MC has high and low priority busy signals to tell the arbiter which priority packets it can currently receive. This differentiation between high and low busy signals ensures that the MC will never allow a low priority packet to keep a high priority packet from executing.

A signal MC_BUSY_HI_N tells the system arbiter that the MC can not accept any more packets of any priority. It is asserted when the Input Queue (230) is full. MC_BUSY_LO_N tells the system arbiter that the MC can not accept any more low priority packets. However high priority packets can be accepted. It is asserted when the MC contains its maximum of two low priority packets.

The Output Queue (246) also has entries that are reserved for responses generated by Copyback CAM (250) hits. The MC does not send the arbiter a busy signal when these reserved entries are full. The only effect is that the MC can not load any new entries in the Copyback CAM (250) until a reserved space opens in the Output Queue (246). Until then, the MC will retry any packet that needs to use the CAM. This is also what the MC does when the CAM itself is full.

Packets issued by the MC can never be retried. This would cause coherency violations. Likewise, the MC can not retry any writebacks or copybacks.

The MC attempts to drive either MC_NEAR_N or MC_FAR_N with each medium bus request that is asserts. These signals tell the bus arbiter whether the MC's packet is destined for a local CI or GG, or for the PIBus via a PI. Once MC_MED_REQ_N is asserted, MC_NEAR_N (near) and MC_FAR_N (far) stay deasserted until the MC can be sure that it has calculated the correct value for them. If neither of the signals is asserted when the arbiter evaluates the MC's bus request, then the arbiter must consider all medium busy signals. If one of the signals is asserted then the arbiter can consider only a select group of the medium busy signals, increasing the MC's chance of getting a grant. Once the MC asserts NEAR or FAR signals, the signal stays asserted until the MC receives a bus grant. The NEAR and FAR signals must deassert the cycle after the grant as the MC may immediately start requesting a new bus tenure.

Packet Enqueueing

Each time a signal ORB_TS_MC is asserted, the MC decodes the address of the packet on the MC_BUS to determine if the packet is for it. The decode occurs in the MC Header Inspection module. If address [31:24]=FE, address [23:20]=MC_LR_NODE_ID (three bits that indicate the Node ID for this MC) and address [9:6]=MC_LR_ASIC_ID (ASIC ID for this MC), the packet is for this MC's control space.

The address is also decoded against the MC_LR_MEM_BIT_MAP, 32 bits that indicate the physical memory bit map for this MC, each bit of which represents 128 MB of physical memory space. The MC_LR_MEM_BIT_MAP will have a bit set for each 128 MB of DRAM installed for this MC. Each MC may have up to 512 MB.

If the packet is addressed to either the MC's physical or control space, the packet header is enqueued in the Input Queue (230). If the packet is a control space write, the data beat will also be enqueued in the Input Queue (230) the cycle after the header. The Input Queue contains two parallel 4-entry queues, the Header Queue and the Data Queue. The Data Queue entries are only used for control space writes. When a signal HI_ENQUEUE_IN is asserted it is an indication to enqueue an MCBUS header beat into the MC Input Queue (Header queue).

If the packet is a physical address write, the data beats are enqueued in the EDAC Write FIFOs.

Header Decode

Figure 11:
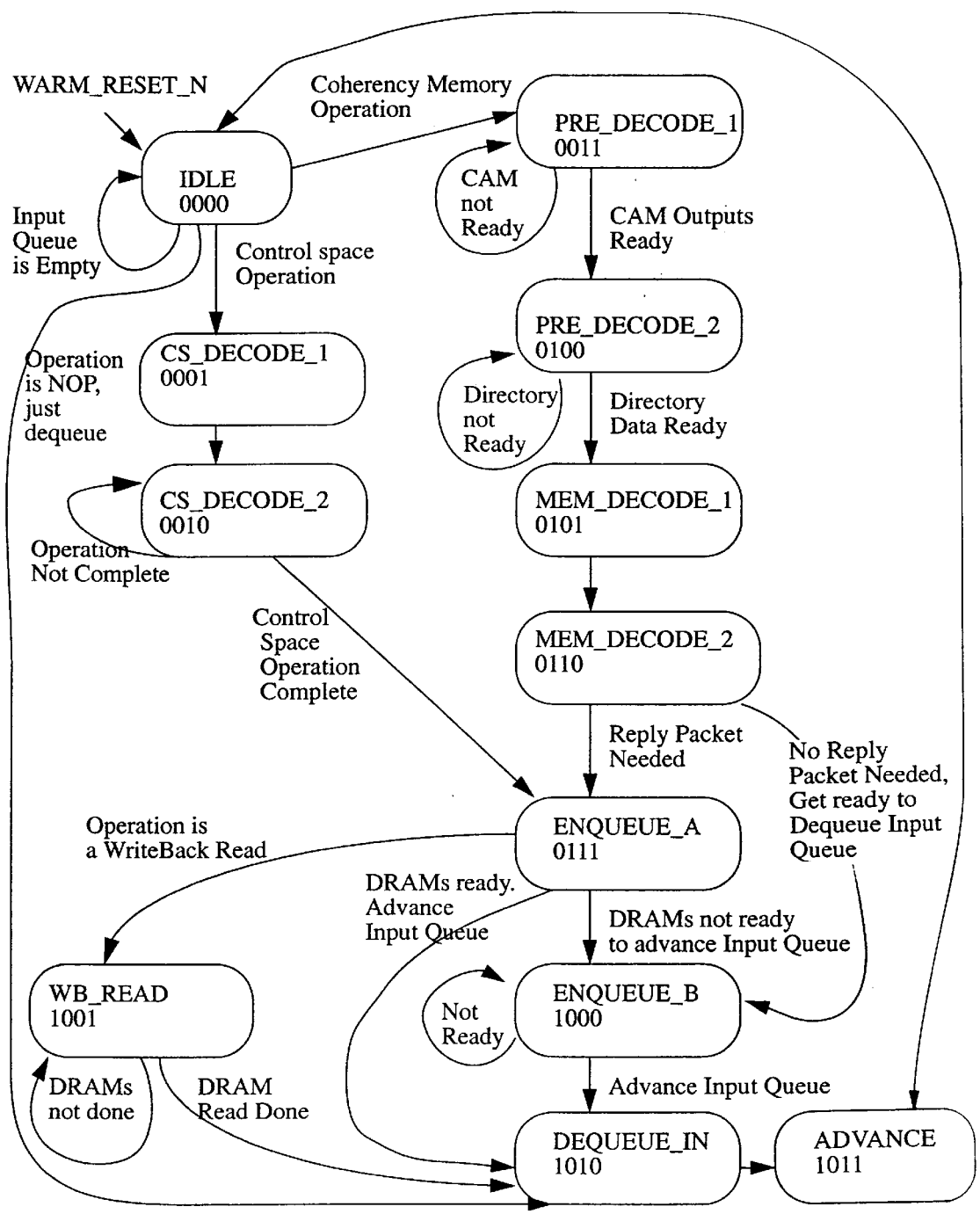
FIGS. 11–24 are state machine diagrams for state machines implementing functionality in the memory controller of FIG. 10.
Figure 12:
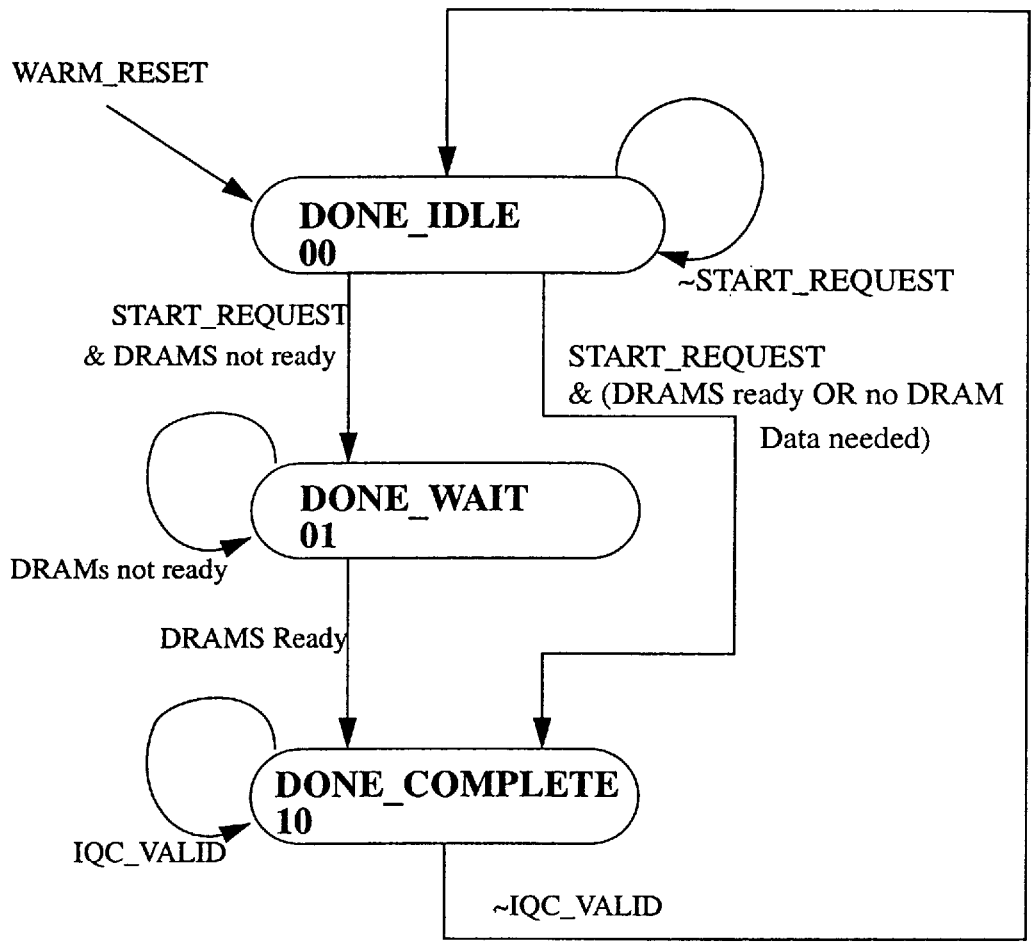
Figure 13:
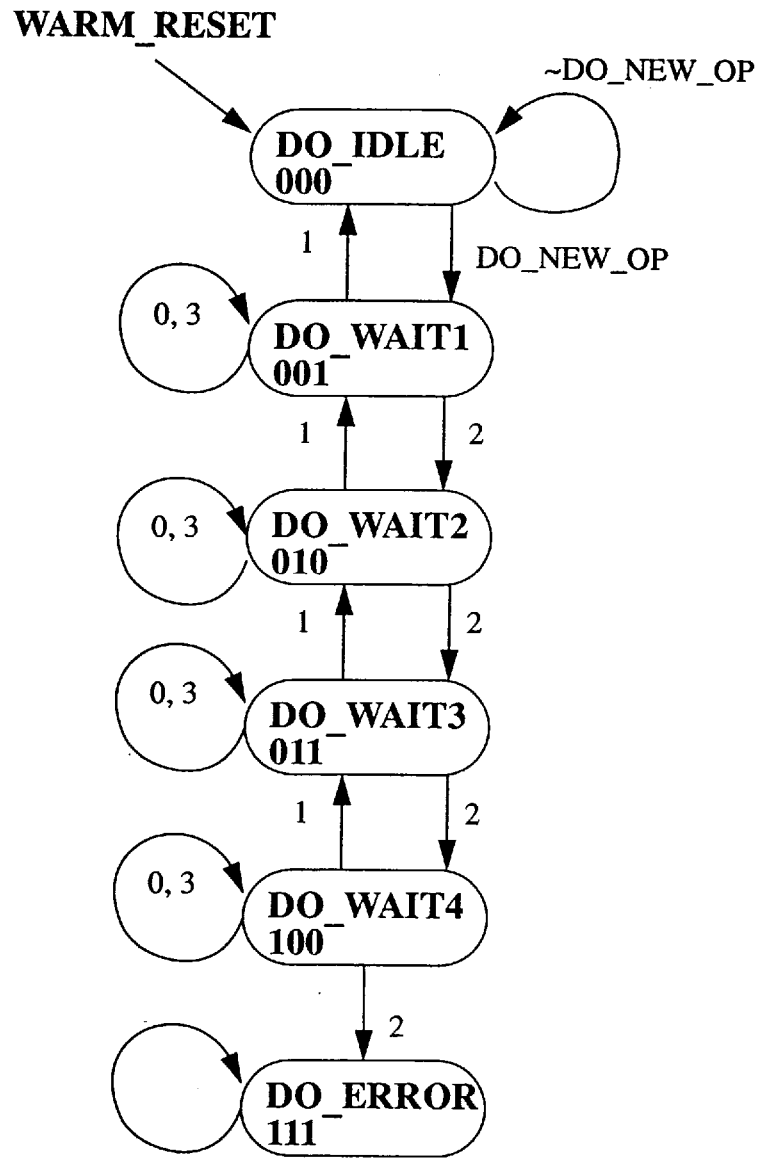
Figure 14:
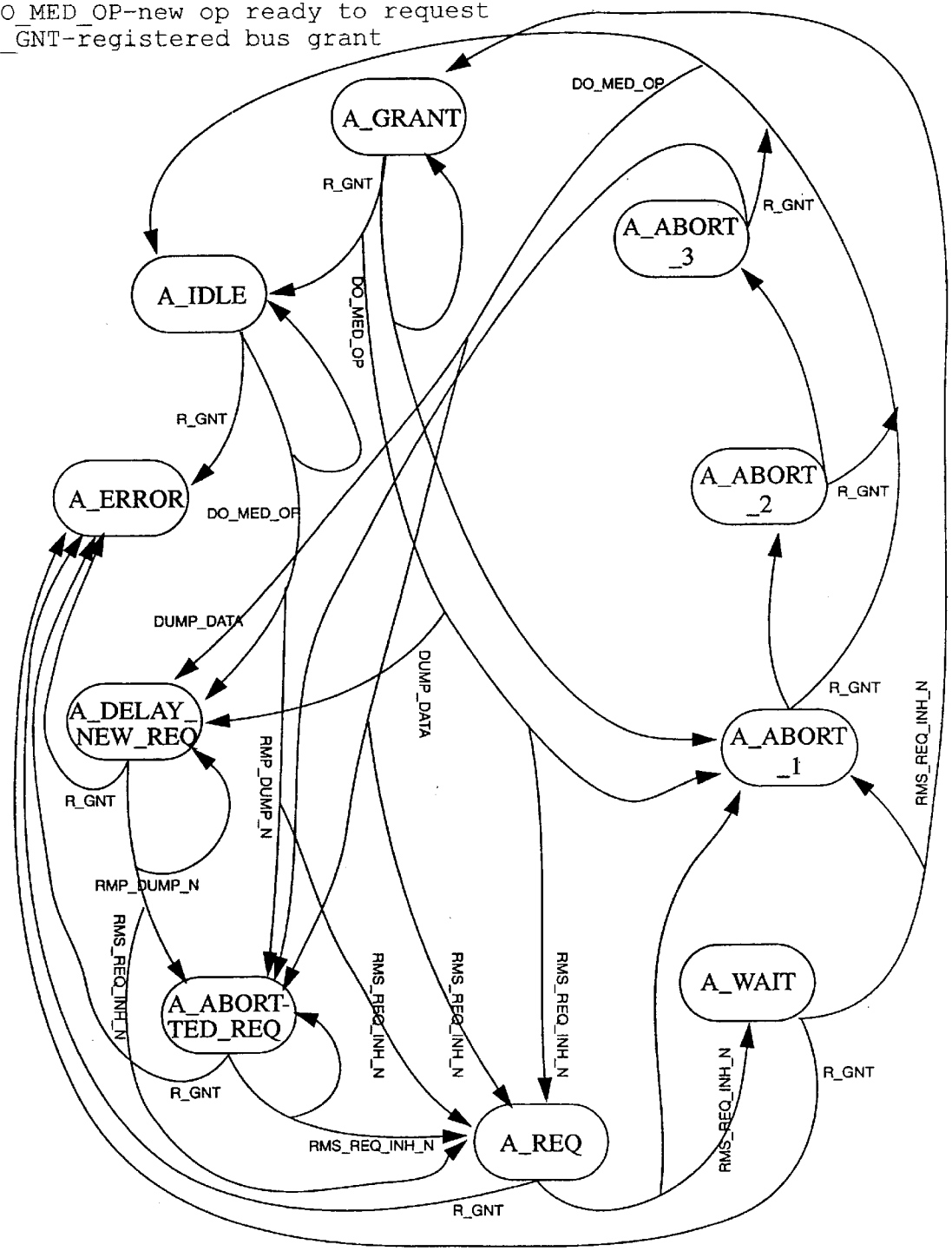
Figure 15:
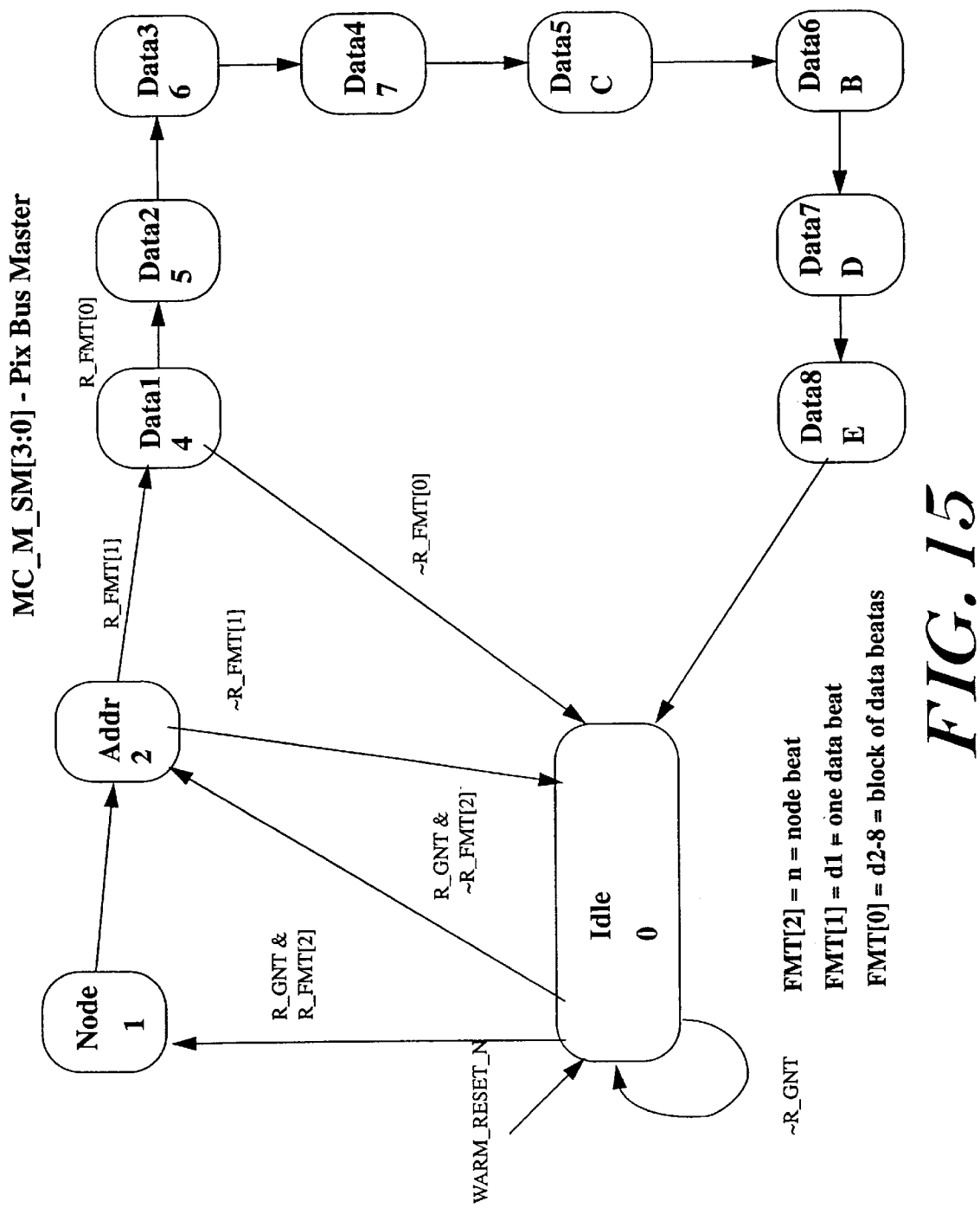
Figure 16:
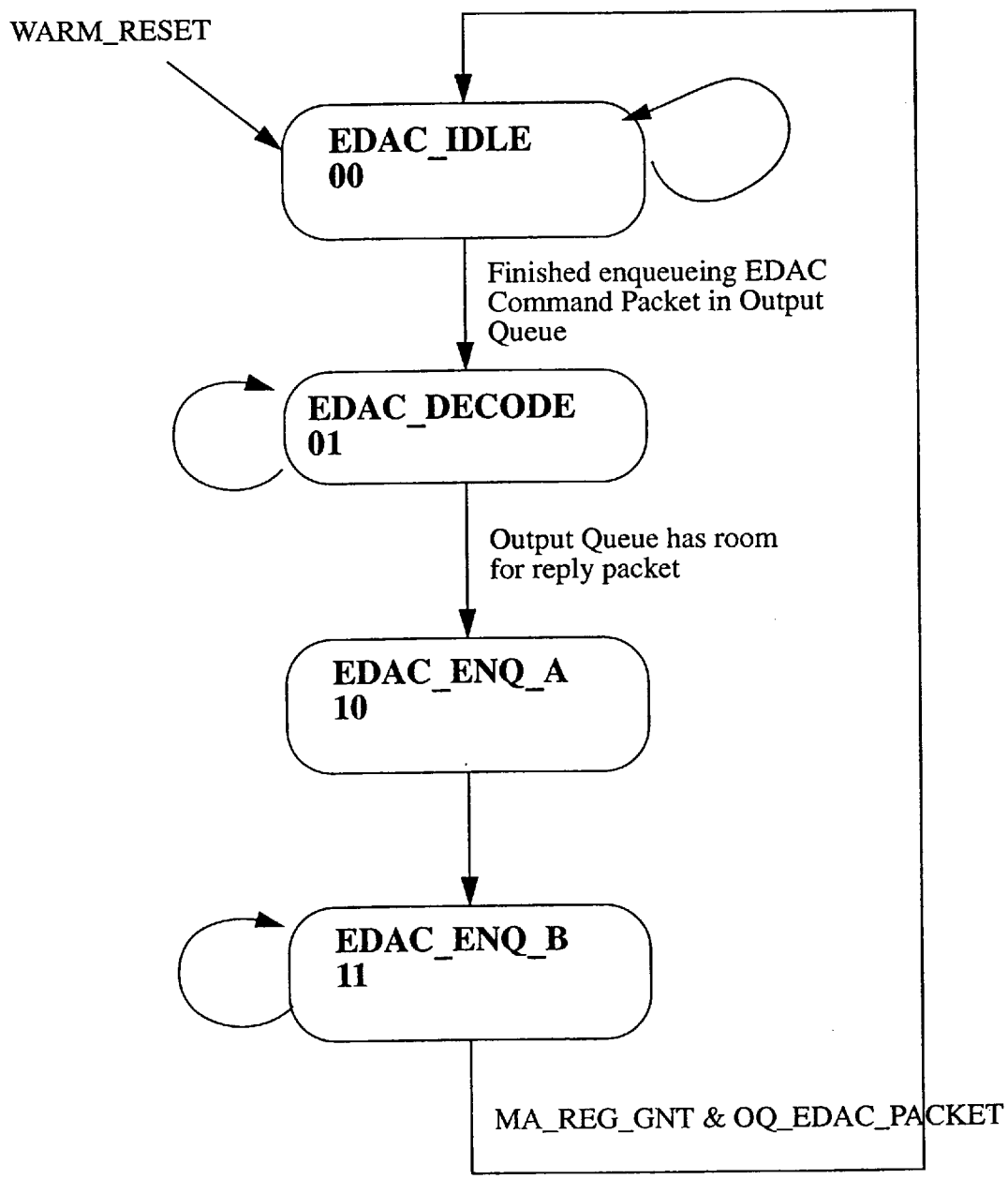
Figure 17:
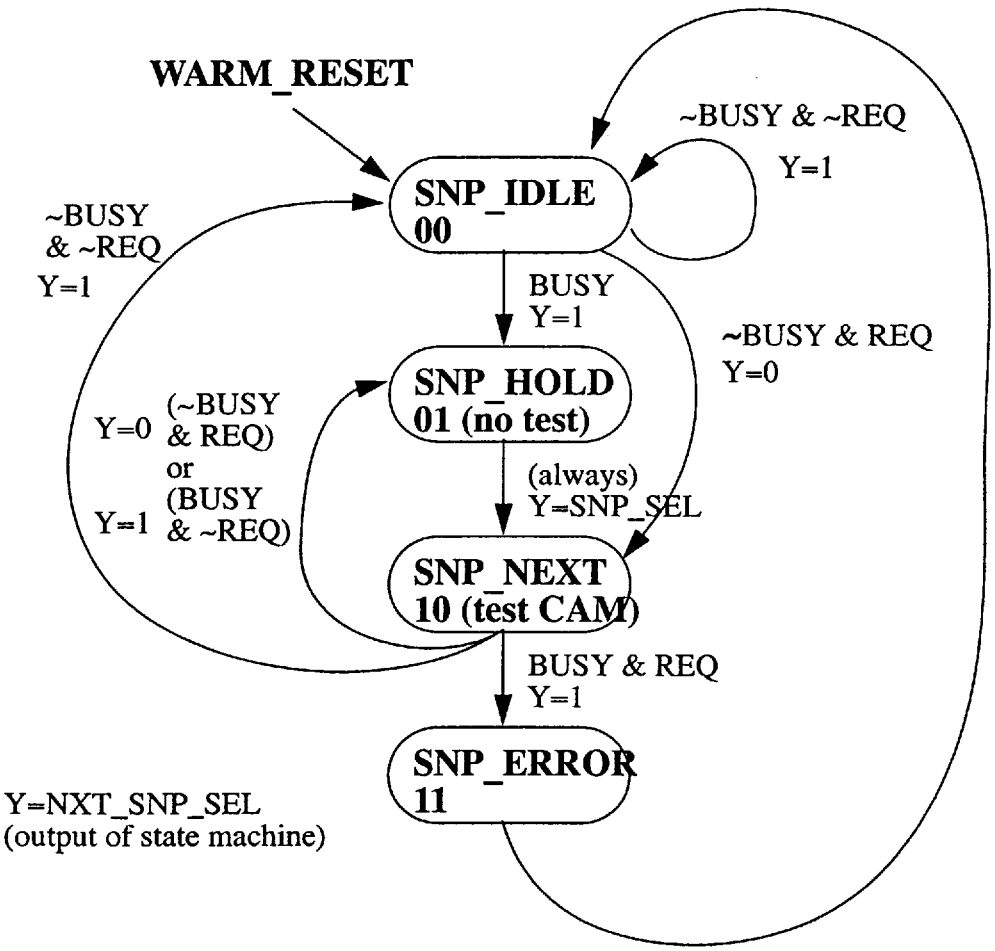
Figure 18:
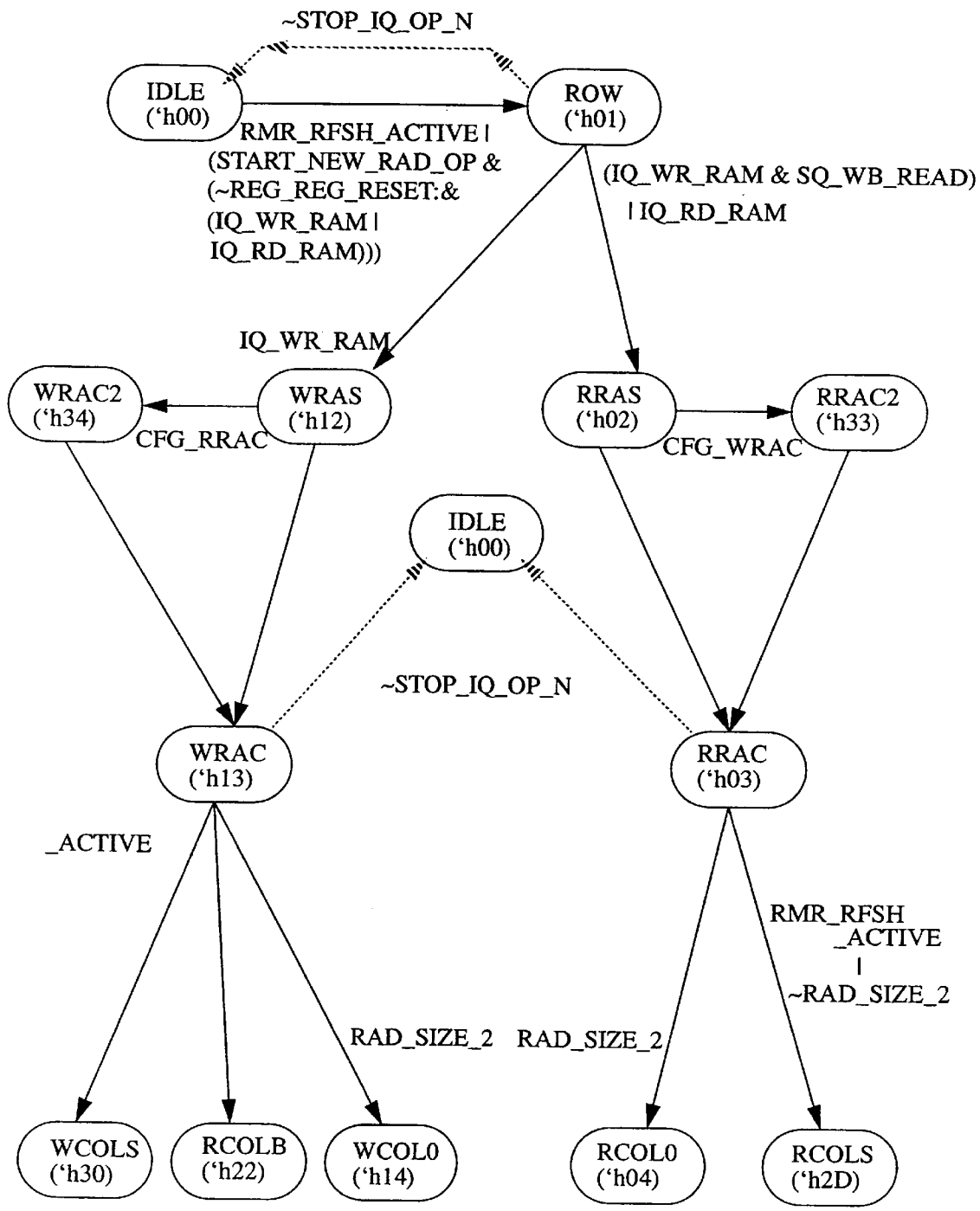
Figure 19:
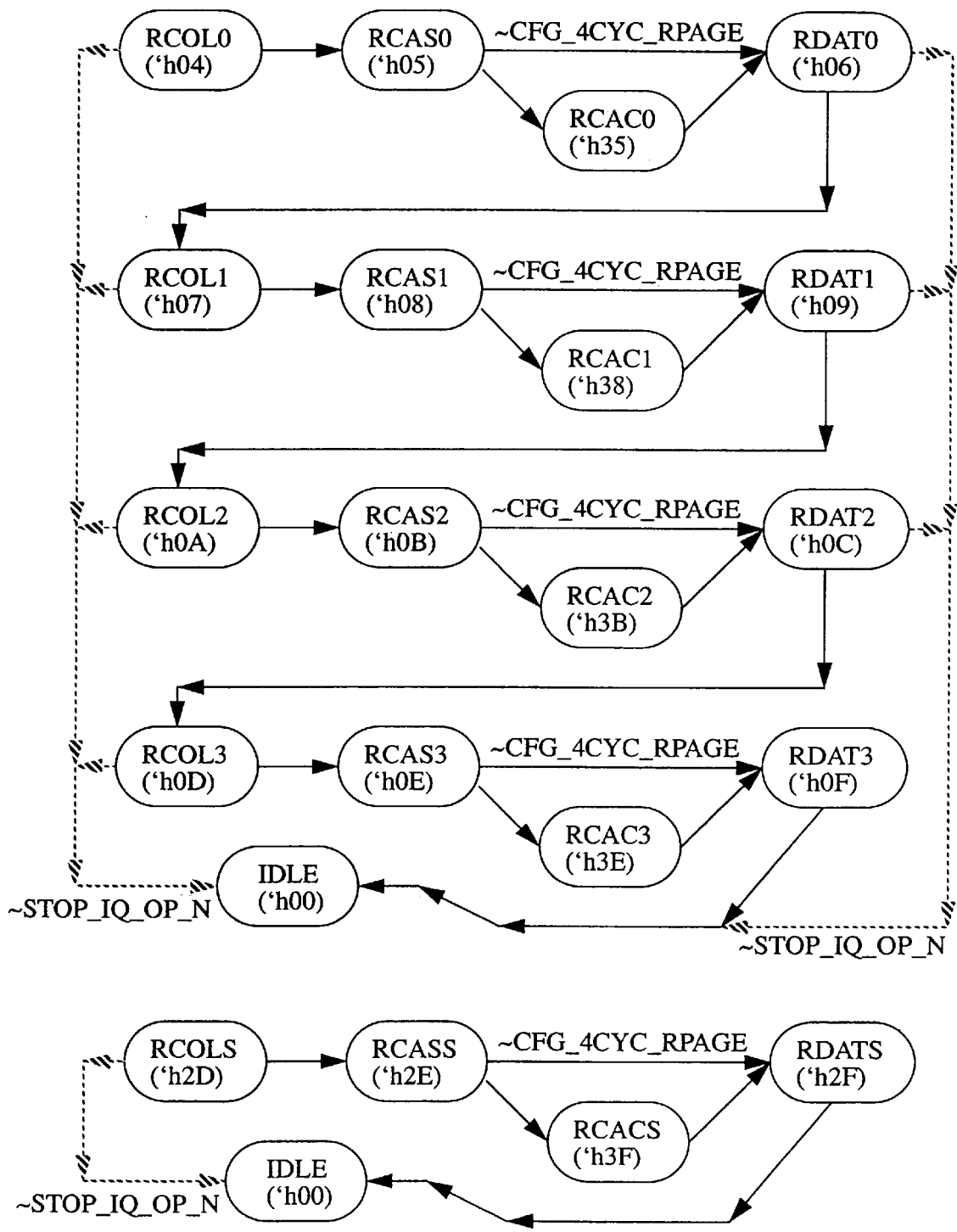
Figure 20:
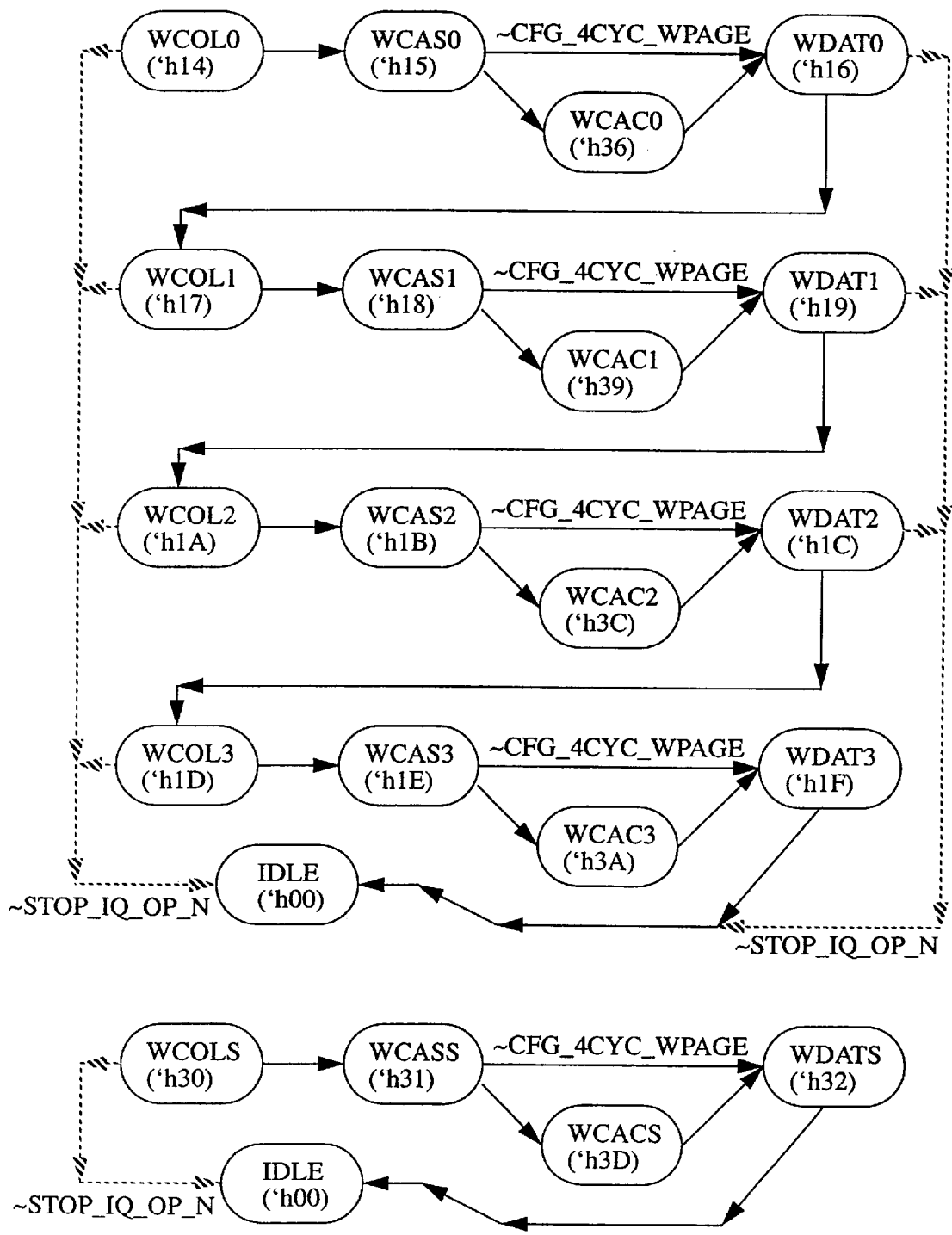
Figure 21:
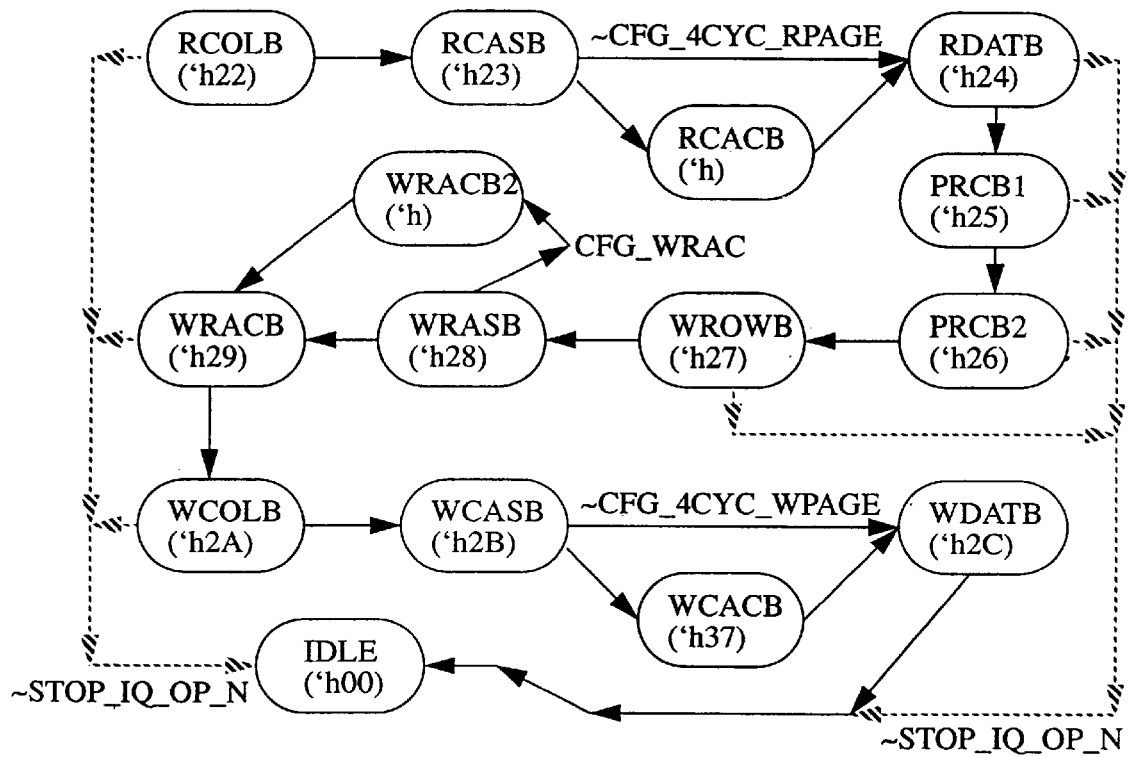
Figure 22:
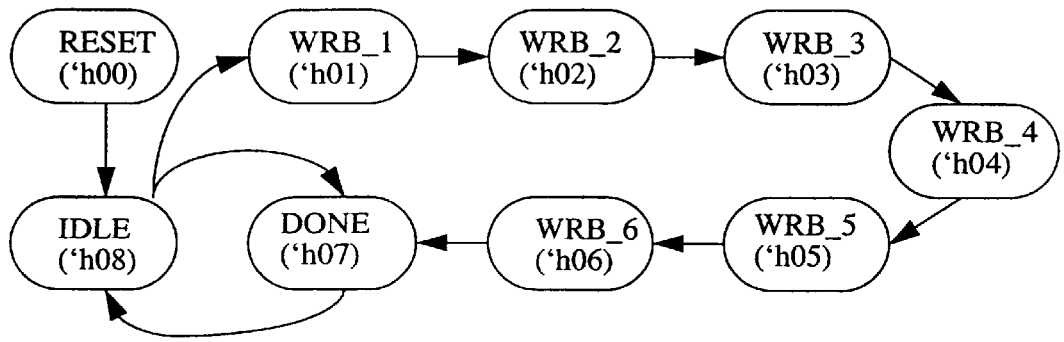
Figure 23:
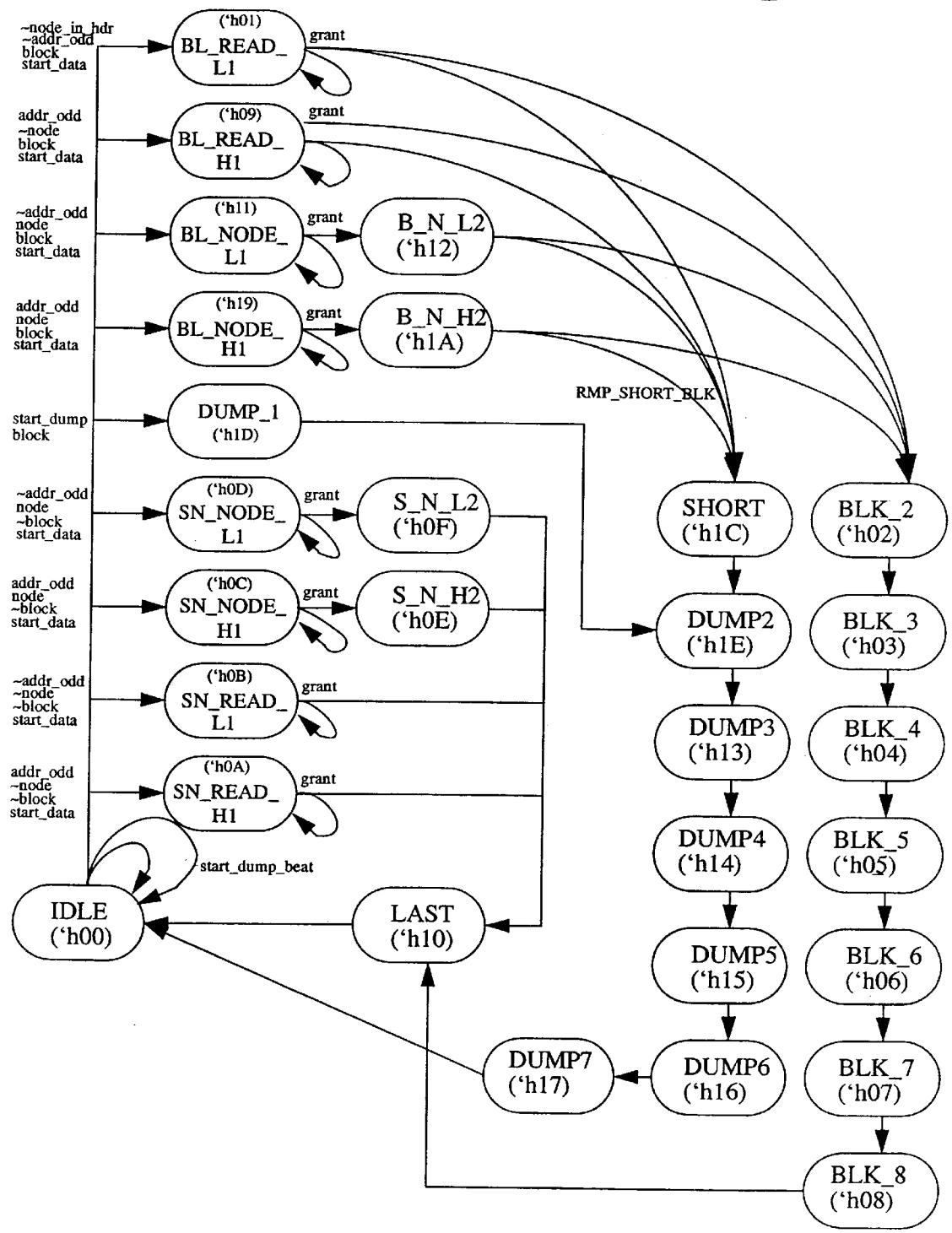
Figure 24:
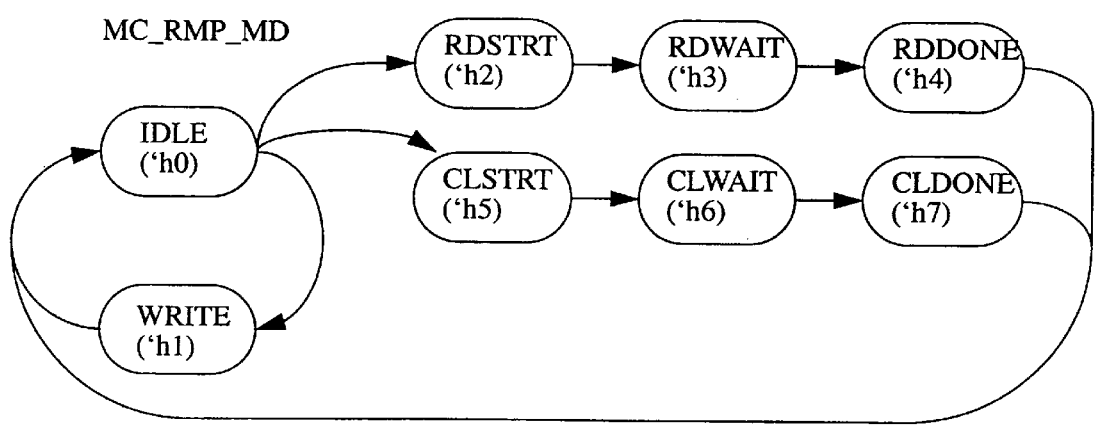

When IQC_VALID is asserted there is a valid packet at the top of the Input Queue (230). The assertion of IQC_VALID starts the SQ_CURRENT_STATE state machine (FIG. 11) in the MC sequencer module (254, FIG. 10). This is the main sequencer for the directory manager and queues. IQC_VALID also starts state machines in the DRAM controller (232). State machine diagrams which are self explanatory to those skilled in the art, are provided herewith as FIGS. 11–24.

Some basic information about the header is pre-decoded at the time the packet is enqueued in the Input Queue (230). That information is kept in the queue with the header. This allows the DRAM controller (232) to immediately start the appropriate read or write of Directory and Memory DRAMs.

The Header is further decoded in the MC Header and Directory decode module (240). The results of the decode for a physical memory request are not valid until SQ_MEM_DECODE_VALID is asserted. There is also a S_CS_DECODE_VALID for control space operations.

The main gate to header decode for physical memory requests is accessing the directory entry for the address. The directory entry is valid the cycle after RDS_DTS_VALID is asserted. The RDS_DTS_VALID signal indicates that in the next cycle the directory entry for the current address will be valid. The directory entry will be available on RDP_VBITS RDP_BUSY, RDP_LOCK and RDP_MOD lines. The header decode takes two cycles after the directory entry is read.

Reply Packet Encoding

By examining the directory entry, the MC Header and Directory decode module (240) decides what type of reply to send. It also decides how to update the directory. The actual encoding of the reply packet header is done in the MC Header encode module (242). The packet header is enqueued in the Output Queue (246).

If the reply packet needs to go external to the PIBus to be snooped, a two beat header will be enqueued in the Output Queue (242). The first beat will be a node beat, as described hereinafter. Like the Input Queue (230), the Output Queue has two parallel queues. The Output Queue's queues are five beats instead of four, the extra beat being needed to support EDAC mode operations. In this case one queue is used for the node beat and the other for the header beat.

If the packet is a control space read reply, a data beat will be enqueued in the Output Queue (242) the cycle after the header beat is enqueued. This will also use one entry in each of the parallel queues. Both the Input Queue and the Output Queue always enqueue something in both parallel queues. However if both beats are not needed, the second enqueue cycle will load garbage into the queue.

Once the reply header is enqueued and the DRAM controller (232) no longer needs the packet at the top of the Input Queue, the Input Queue is advanced to the next request packet. IQC_VALID is deasserted for one cycle while the queue is advancing.

When there is a valid header in the Output Queue and the DRAM controller is ready to drive any needed data beats, the MCBUS Arbitration and Bus Master module (256) requests the bus. For most control space replies, the entire packet is driven from the MC ASIC. The only exceptions are some EDAC diagnostic mode operations which have data beats driven from the EDACs. For physical address read replies, the node beat (if any) and the header beat are driven from the MC ASIC and the data beats are driven from the EDACs. For all other physical address replies there are no data beats and the entire packet is driven from the MC.

When the entire packet, including data beats has been driven, the Output Queue (246) is advanced. Like the Input Queue, the Output Queue valid signal, OQC_VALID is deasserted for one cycle while the queue is advancing. If the MC has another completed request packet already enqueued, the MC bus request signal will not be deasserted when the first bus grant is received.

Copyback CAM

Memory requests that require a copyback use the Copyback CAM (250). This CAM stores the header of the request packet so that when a copyback reply or writeback to the same address is received, the MC can generate a reply packet to the original requestor who precipitated the copyback. In these cases, the reply packet is built from the header stored in the CAM, not from the top of the Input Queue (230).

The DRAM controller (232) will write the copyback or writeback data to memory and also store the data beats in the EDAC read FIFOs if a read reply is needed. Copyback replies return the data in the order needed for a read reply packet, so the Read FIFO is filled at the same time that the data is written to the DRAMs. Writebacks will always return the data block aligned, so the data is first written into memory and then read back out to the Read FIFOs in the order needed.

Control Space Registers

The MC has control space registers that are all in the MC Local Registers module (226). They are 32-bits wide or less. The control space registers are written from an IQ_DATA output of the Input Queue (230), which corresponds to bits [31:0] on the MC_BUS.

When a control space register is read, the data is loaded into the "address" field (bits [31:0]) of the reply packet's data beat. The data is stored in the Output Queue (246) along with the reply packet header. The data is muxed into the address input of the output queue by an MC Output Mux (258).

Packet Ordering

The present embodiment of the MC sends all INV_CMD (invalidate) packets through the PIs to guarantee that INV_CMDs never arrive before earlier RD_S_RPLYs. Since the unordered condition can send any local read reply external, i.e. out through the PIs to the backplane, all INV_CMDs must also go external. Sending INV_CMDs external also keeps some stale IM cases from causing data corruptions.

The MC is responsible for maintaining coherent order between high priority writes and medium priority invalidates. The need for ordering between packets of different priorities is explained hereinafter with respect to Cache Coherency. Only the need for high and medium ordering is explained here.

The ordering problem with high priority packets is that a high priority write (WB, CB_RPLY CB_INV_RPLY) could bypass an incoming medium priority snoopable invalidate (INV_CMD, RD_INV_RPLY). This could result in the following scenario: Memory in this example is on Node 0. Address DATA is a data location that both JP0 and JP5 wish to modify. Address SEMAPHORE is a semaphore that allows only one requester at a time to alter address DATA. Address DATA and SEMAPHORE are serviced on different P1 buses.

| Packet | Requestor | Address |
| --- | --- | --- |
| 1. RD_S | JP0 | DATA |
| 2. RD_S_RPLY | JP0 | DATA |
| 3. RD_IM | JP5 | SEMAPHORE |
| 4. (RD_INV_RPLY | JP5 | SEMAPHORE) outgoing to node 1 |
| 5. CI_RD | JP5 | DATA |
| 6. RD_S_RPLY | JP5 | DATA |
| 7. CI_WR | JP5 | DATA |
| 8. (INV_CMD | JP5 | DATA) outgoing to nodes 0,1 |
| 9. RD_IM | JP0 | SEMAPHORE |
| 10. (CB_INV CMD | JP0 | SEMAPHORE) outgoing to node 1 |
| 11. CB_INV_RPLY | JP5 | SEMAPHORE |
| 12. RD_INV_RPLY | JP0 | SEMAPHORE |
| 13. CI_WR | JP0 | DATA |

In line 12, JP0 has been granted the semaphore without having received the invalidate for the data (line 8). As a result JPO reads stale data from its cache and writes it back to memory before ever seeing the invalidate which was issued in line 8.

The CB_INV_RPLY in line 11 can not be reordered to make it arrive on the PIXbus after the INV_CMD from line 8, because high priority packets must have unimpeded access to memory. Interfering with this can cause system livelock because the memory queues could always be full of read requests for a block that is currently modified. If the high priority copyback reply can not get to the directory, the read requests can never be satisfied. Therefore it is dangerous to apply any ordering rules to high priority packets. The alternative is to apply the ordering to the reads that try to access memory data altered by a high priority write.

Since the CB_INV_RPLY can not be reordered, instead the RD_INV_RPLY is ordered in line 12. The goal is to keep data written to memory by high priority writes from being sent to other requestors until after any older invalidates have been completed. This is accomplished by sending the RD_INV_RPLY in line 12 out through the PIs to the backplane. The medium queue ticketing at the PIs will ensure that the RD_INV_RPLY does not arrive at JPO until after the INV_CMD from line 8. JPO will not have a stale cached copy of the data and will have to read the correct data from memory.

The ordering could be accomplished by sending all local read replies thorough the PIs. However, this has performance penalties. Instead the ORB sends the MC a signal (ORB_ORDER_NEEDED) that is asserted whenever a PI queue holds a medium priority invalidate (INV_CMD or RD_INV_RPLY) which has been in the PI queue for more than a given number of cycles (the number is programmable from 31 to 0). While ORB_ORDER_NEEDED is asserted, the MC marks any memory block that receives a high priority write as potentially unordered. The MC will send any local read replies to that block external through the PI's to guarantee that they will be ordered behind the outstanding invalidate.

To reduce the number of local read replies sent external, the MC's packet ordering mechanism incorporates the following rules.

a) High priority writes from remote requesters mark blocks UNORDERED in the directory when ORB_ORDER_NEEDED is asserted at the time that the write was received by the MC. If ORB_ORDER_NEEDED deasserts before the MC begins to process the write, the UNORDERED bit will not be set.

b) A local read of an UNORDERED block will clear the UNORDERED state in the directory. The UNORDERED state of the block is now tracked in the MC's six entry Snoop CAM (252). The address and requestor ID of the local read are loaded into the Snoop CAM. The local read reply has a node beat attached to it and is sent to the PIs.

c) If the MC receives a high priority write from a remote requestor that hits a local read request in the Copyback CAM (250), the UNORDERED bit is not set, but the read reply is sent external with a node beat and its address and requester ID are loaded into the Snoop CAM.

d) Once loaded, the Snoop CAM (252) entry remains valid until the MC sees the same read reply reissued onto the PIXbus by the PIs. The MC snoops all PIXbus read replies that are to its memory range and which are coming from the PIs. Whenever a snooped read reply matches the address and requestor ID of a Snoop CAM entry, that CAM entry is cleared.

e) Any additional local read requests to that cache block while the Snoop CAM still holds that address will also be loaded into the Snoop CAM and sent to the PIs with a node beat.

f) The UNORDERED condition of a block exists until the directory UNORDERED bit and all Snoop CAM entries for that memory block address have been cleared. If the Snoop CAM contains multiple entries for the same address then each of those read replies must reappear on the PIXbus before the UNORDERED condition is cleared.

g) If ORB_ORDER_NEEDED is deasserted when a local read request hits the Snoop CAM, the read reply will not be considered unordered if it is a RD_S_RPLY. It will not be loaded into the Snoop CAM and it will not be sent to the PIs. If the read reply is a RD_INV_RPLY it will still be loaded into the Snoop CAM and sent to the PIs with a node beat. This is to prevent a RD_INV_RPLY from arriving at a local requestor before an older RD_S_RPLY which may have been delayed in the PI queues.

h) The Snoop CAM recognizes six local requestor IDs, which in the present illustrative embodiment are set to the 4 JPs and 2 GGs. The requestor IDs can be set with scan, which is described in detail in the referenced PCT application. Each Snoop CAM entry is dedicated to one of those IDs. It is assumed that there will never be more than one outstanding low priority request from each requester. A fatal error will issue if the MC tries to load a new read reply into the Snoop CAM and finds that that requestor already has an outstanding read reply.

i) Whenever the directory (224, FIG. 9) is accessed and ORB_ORDER_NEEDED is deasserted, the UNORDERED bit in that directory entry is cleared (if set).

j) The ORB has a programmable delay which controls how soon the ORB_ORDER_NEEDED signal is asserted after the PIs enqueue an invalidate. Unordered read replies are not possible until a number of cycles after the invalidate is enqueued. By reducing the number of cycles that ORB_ORDER_NEEDED is asserted, the performance impact of sending local read replies external is reduced. This cycle count delay is programmable from 31 to 0 cycles, and defaults to 31 cycles.

It should be further noted that the MC must be run in external invalidate mode if more than one node exists. Otherwise INV_CMDs could get out of order with read replies that have been sent external due to unordering.

Memory Power-up Initialization

During cold reset the MC ASIC resets most internal registers, including configuration registers. Exceptions to this are the Input Queue (230), Output Queue (258), Performance Monitor Counters (not shown), and Input Register and Output Registers (226). Those registers will be initialized through use.

The MC leaves cold reset with its fatal and non-fatal error reporting enabled, except for DRAM related errors. Masked errors include refresh errors, ECC errors, coherency errors and MUD_BUS parity errors. These errors can not be enabled until after the main memory and directory DRAMs have been initialized. To enable this error reporting, an MC_ERR_MASK register must be written. On cold reset the MC will tri-state its bus outputs. All outputs will be reset to a benign state.

Initialization

The MC_MEM_BIT_MAP must be scanned or written to a non-zero value for the MC to accept any memory operations. The MC_MEM_BIT_MAP should match the amount of memory DRAMs present, and should also match the PI ASIC's MEM_BIT_MAP.

Warm Reset

The MC resets internal state machines on warm reset. Configuration registers are not reset, with one exception: MC_ERR_MASK[15]. This bit masks MC fatal coherency errors. This class of error must be masked out while PROM is flushing system caches, which occurs during warm resets after fatal errors. Once PROM has reinitialized the directory after a fatal error, it should re-enable MC fatal coherency errors by writing MC_ERR_MASK [15]=0.

The MC Fatal error line, MC_FATAL_OUT_N, is reset and internal error detection is reset, however control space accessible error reporting registers are not reset. This allows the error information to be read after the MC has been reset. The error registers must be cleared with a control space write to an MC_FATAL_ERRORS register before more error information will be saved. Subsequent errors taken after the warm reset but before the error reporting registers have been cleared, will cause the MC to assert the appropriate error pin, but detailed information about the error will not be saved.

On warm reset the MC will tri-state its bus outputs. All outputs will be reset to a benign state, except for those needed to keep the DRAMs alive.

EDACs and DRAM

Cold reset is configured to guarantee that it is asserted for 200 milliseconds. Thus the DRAMs are guaranteed to have their initial powerup period of 500 microseconds before the DRAM controller takes any action.

An MC_LR_DRAM_CONFIG register has a cold reset value, 32'hlOB6_3780, which causes the DRAM controller to perform RAS-only refreshes on a 512 MByte memory configuration at the fastest possible frequency. This will insure that, once cold reset is de-asserted, the DRAMs receive their required 8 RAS pulses within 256 clock cycles. Alternately, the value of 32'hlOB6_3784 will make sure only half the banks are refreshed at any one time, but will take twice as long to make sure that all the DRAMs receive their required 8 RAS pulses.

Once the 8 RAS pulses are complete, the main memory and directory DRAMs can be initialized by setting a register MC_LR_DRAM_CONFIG[1:0]=2'b11. This will cause the DRAM controller to load zeros into all of main memory and all of the directory. The MC_LR_DRAM_CONFIG register needs to be polled by software to determine when stuff mode is complete. The DRAM controller (232) will set MC_LR_DRAM_CONFIG[1:0] back to zero when initialization is complete.

Once DRAM initialization is complete, MC_LR_DRAM_CONFIG needs to be set to a normal operating value. For 512 MByte memory in a 50 MHz system, the suggested value is 32'hlOB6_3720. This sets the refresh to a normal speed, which is slower than that used for initialization.

After warm reset is de-asserted, the EDACs can be initialized via writes to the appropriate MC control space register. The EDACs must be initialized after a cold powerup before attempting to write to main memory since the EDAC mode register powers up in an unknown state. The recommended procedure for initializing the EDACs is to write a value (0013 hex) to a "MC_EDAC_NORMAL_MODE" register for both EDACs. Bit 3 of the address of the "MC_EDAC_NORMAL_MODE" register specifies which EDAC mode register to modify. It is recommended that the EDACs have their diagnostic registers cleared after cold powerup by writing to an "MC_EDAC_CLEAR_MODE" register for both EDACs (after initializing the "MC_EDAC_NORMAL_MODE" register). Bit 3 of the address of the "MC_EDAC_CLEAR_MODE" register specifies which EDAC mode register to modify.

Sizing Memory

The resources section, described hereinafter with respect to the RI ASIC, will read the presence-detect bits of one SIMM from each bank (all SIMMs in a bank must be identical) to determine the population of main memory. The present illustrative embodiment of he CCNUMA architecture according to the invention supports 16M×36 SIMMs. Only the bits PD1 & PD2 are read, which are defined as GND,GND.

It may be advisable to verify that memory is properly configured by sizing with software. It is recommended that the MC be configured for the largest possible configuration while sizing so as to keep all DRAMs active so that they don't require re-initialization (8 RAS pulses).

MC Error Detection and Handling

The MC generates both fatal and non-fatal errors. Each type of error has a dedicated ASIC interrupt pin: MC_FATAL_OUT_N and MC_NON_FATAL_N, respectively.

The MC has an error mask, MC_ERR_MASK, that is read/writable from control space. The mask allows individual groups of errors to be disabled independently. When an error is disabled, no interrupt is generated, and the MC does not save error information. Mask bits for both fatal and non-fatal errors are contained in MC_ERR_MASK.

Non-fatal errors are asserted for failures that will not corrupt system operation but which need to be logged or corrected by the operating system. All information necessary for handling non-fatal errors is saved in control space accessible registers. Non-Fatal errors are clear by writing to a MC_NON_FATAL_ERRORS control space register. Clearing the error also allows error information to be captured for the next error that occurs. As long as an error is outstanding, i.e., not yet cleared, additional errors of that same type can not be recorded by the MC.

Fatal errors are asserted for failures that will result in system corruption. This may be either data corruption or loss of ASIC sanity.

The MC ASIC will not switch to a scan clock on fatal error and can not be scanned. Scanning, described in the referenced PCT application, would destroy the memory image stored in the DRAMs by interfering with memory DRAM refresh. The memory image must be maintained if a core dump is required for operating system debug.

The MC supports a mode (LR_FATAL_CLK_MODE=0 register) wherein it will stop clocks on a fatal error. This mode is intended for debug only, since it will prohibit memory core dumps after a fatal error. The rest of this section is written assuming LR_FATAL_CLK_MODE=1.

On fatal error, the MC will abort the current operation and will remain idle except for refreshing the DRAMs. The MC input and output queues are cleared and some internal state machines are reset to idle. The MC will not respond to any bus activity until it receives a warm reset. After the warm reset, the MC's control space registers can be read to get error information that was saved when the fatal error was detected. The PROM then re-initializes the MC by writing to each of the MC's error reporting registers to clear them.

Since the MC can not be scanned to collect information about a fatal error, it freezes copies of some of its current state into shadow registers when a fatal error occurs. Shadow registers are copies only and freezing them does not affect normal ASIC behavior. Many of these shadow registers are control space accessible. Others can be accessed only by scanning the MC. The information in the shadow registers remains valid through a warm reset and will not change until after the MC's error registers have been cleared by specific control space writes. If the MC takes a fatal error after it has been given warm reset, but before PROM has read and cleared the error registers, it may be necessary to cold reset the MC and scan test it.

When a fatal error originates at the MC, the MC immediately freezes shadow copies of internal state relating to the operation currently being executed. This allows state to be captured before it advances without using several levels of shadow registers. Shadow registers containing less volatile state are not frozen until the MC generated fatal error is sent back to the MC as a system fatal error. If a fatal error is detected by another ASIC, the MC freezes all its shadow registers at the same time, i.e. when the MC receives the system fatal error.

Upon receiving FATAL_IN_N indicating a fatal error, the MC will: Tri-state the following outputs: MCBUS[71:0]; MC_EXTEND_N; and MC_SRC_ERR_N. Deassert the following outputs: MC_BUSY_HI_N; MC_BUSY_LO_N; MC_MED_RE_N; MC_ONE_TO_$GO$; $MC$_DIAG[1]—MC Near Pin; MC_DIAG[0]—MC Far Pin. Invalidate the Input and Output Queues. Upon receiving FATAL_IN_N indicating a fatal error, the MC will: Ignore the following ASIC inputs: ORB_GNT_MC; and ORB_TS_MC. Upon receiving FATAL_IN_N indicating a fatal error, the MC will: Idle the following state machines: MC_SQ; MC_ARB_SM; and MA_NF_STATE.

When the system takes a fatal error, PROM based software (referred to hereinafter as "PROM") will initiate certain actions. PROM software will first scan as many ASICs as possible to determine the type of error. The ORB ASIC will shadow the MC_FATAL_OUT_N signal so that when multiple fatal error signals are asserted software can determine from scan information which was asserted first. Then warm reset is applied to the ASICs. Then any control space registers in the MC may be read. Warm reset will not affect the contents of the registers which hold pertinent error information. PROM must write to the MC_FATAL_ERRORS register to clear the MC's error registers. This write must occur after the warm reset. MC_FATAL_ERRORS can not be cleared until MC_FATAL_OUT_N is deasserted, which requires a warm reset.

Software may need to also do control space operations to the EDACs to re-initialize them if normal operation will be continued without re-initializing the whole system. Once the MC and EDACs have been re-initialized, the software may choose to flush the contents of the system caches back to main memory.

Prior to taking a memory dump, PROM will flush the system caches to get any updated data they hold into the memory. This can cause coherency errors since the MC may receive Writebacks to blocks with illegal directory states. To prevent this, PROM must mask out the MC Fatal Coherency error by setting MC_ERR_MASK[15]=1 before beginning the flush. The mask should be set back to 0 when the flush is complete. When the error is masked out, the Writeback data will be written to the memory DRAMS, but the directory state will be updated only if the Writeback was received to a valid directory state. The MC may also drive MC_SRC_ERR_N on the header beats of reply packets generated while the directory is corrupt. To prevent this, it is advisable to set MC_ASIC_CONFIG[24]=0.

PROM should re-initialize the directory to unused before the flush. This will guarantee that no more coherency errors will be taken once the flushes are complete.

Both the main memory DRAM controller and the directory DRAM controller are configured to continue refreshing after a fatal error. This should make it possible to retrieve the DRAM contents after a warm reset. After fatal error has been asserted the DRAM controllers will not process any new operations from the input queue until warm reset has been asserted. Operations in progress will terminate as soon as possible without violating the DRAM parameters. If a fatal error occurs while the DRAM controller is writing a cache block to main memory, it is possible that only part of the block will be written. The DRAM controller does not continue to write data beats after the assertion of FATAL_IN~N, but it can not undo data beats that are already written.

MC Elements Description

Having described the interrelationships of the various elements of the MC as they relate to the overall operation of the MC, the functions, elements or modules are described hereinafter with respect to their individual characteristics, configurations and/or functionality. Not all of the MC elements described hereinafter appear in the block diagram of FIG. 10, as some of the functional elements are sub-portions of the elements depicted in FIG. 10.

Input Reqister (IR)

The input registers are free running input register. Every system bus cycle it clocks in the current value of the MC Bus. The IR is 72 bits wide. The main memory data path control (RMP) element will take some bits of the address directly from the IR to control the EDACS. The third beat of the IR, IR-BEAT[3], is used to select the first EDAC to load when write data is present on the MCBUS.

The IR also checks for even parity on the MCBUS. Parity is checked every valid bus cycle. Bus parity is not guaranteed when no one is driving the bus. When a parity error is detected the IR will notify an Error module (260) of the MC by asserting a signal IR-PARITY-ERROR. As a result, the Error Module (260) will issue a fatal system error.

Header Inspection (HI)

The HI function entails the examination of the packet header in the MC's Input Register to decide if the packet should be enqueued. It also determines whether a read or a write is required of one or more of the following: the DTS directory, the Data Store DRAMs and the Local Registers.

The HI also asserts a signal MC-BUSY-HI-N when enqueueing the new packet will cause the Input Queue to go full. It is possible that one more packet will arrive after the busy signal is asserted. If this happens, HI will assert MC-RESEND and drop the packet. The requester will reissue the packet at its next opportunity. MC-RESEND will be asserted only for packets intended for this MC.

The MC will only resend low and high priority packets, since it never enqueues medium priority packets. A configuration option for the MC is to never raise either MC-BUSY-HI-N or MC-BUSY_LO_N, but to always issue MC_RESEND for packets that the MC can not enqueue. This may have a performance advantage over using both busy and resend if the system does not have good memory affinity.

Input Queue (IQ)

The Input Queue (230) contains two parallel queues, one for request packet headers, and one for data for control space writes. The header queue is 61 bits wide. The data queue is 33 bits wide. Both queues are 4 beats long. For memory write operations the data beats are stored in the EDACs in the DRAM data path.

The IQ also stores control signals decoded from the header by the Header Inspection function. The decoded information allows the DRAM controller (232) to begin operation as soon as a new header appears at the top of the Input Queue.

The Input Queue can hold a maximum of four headers. Of those headers, only two may be low priority requests. However up to four high priority requests are allowed. This is part of a forward progress scheme which will always be able to service incoming high priority packets. When the Input Queue is full, the MC asserts its high priority busy signal. The MC will not accept any more packets until the Input Queue has an open entry.

If the Input Queue is not full, but it does contain two low priority request packets, then the MC will assert its low priority busy signal. The low busy signal will not be dropped until one of the low priority packets not only leaves the input queue, but is fully processed and its reply packet has been granted the MCBus. This guarantees a maximum of two low priority packets in progress anywhere in the MC.

If the Input Queue is holding any IM request packets (Intent to Modify), it will check the IM address against any RD_INV-RPLY or INV-CMD packets in the Output Queue. If the addresses match, then the Input Queue will "squash" the IM request. This means that it turns the IM into a NOP, as described hereinbefore. This is done to prevent stale IMs from reaching the memory. An IM is stale when it is superseded by an invalidate command to the same cache line.

If an IM is determined to be stale before it is enqueued, the MC-HI module will not assert HI_ENQUEUE_N and the IM packet will be ignored by the MC.

The MC's Input Queue is composed of seven modules: the Input Queue FIFO (MC-IQ), the Input Queue Control (MC-IQC), the MC's generic queue control module (MC-QSM), MC-IQ-M2REG and MC-IQ-M3REG (FIFO registers for the header queue), and MC-IQD-M2REG and MC-IQD-M3REG (FIFO registers for the data queue).

The Input Queue includes FIFOs that are controlled via their respective pointers. Each register is preceded by a multiplexer. This allows a new entry to be enqueued at the top of the queue if the queue is empty.

Local Registers (LR)

The MC has local registers (226) that can be read via a non-memory control-space address. Local Registers may contain configuration information, diagnostic information or performance monitors.

Reading and writing local registers is performed with cache inhibited memory operations to control space. The headers of local register accesses are registered into the Input Queue and will be handled in order. The data for local register writes are stored in the corresponding data queue entry in the MCs Input queue.

Read reply packets for local register reads will be generated in much the same way as a normal memory read reply, except that the data will come from the LR module and be stored in the MC's Output Queue instead of in an EDAC. The read data is muxed into bits [31:0] of the reply packets data beat by the MC-Output Mux which is on the inputs of the Output Queue.

Sequencer (SO)

The Sequencer (254) is the controlling state machine for the Directory Manager. It also helps control the input and output queues and coordinates between the directory manager and the DRAM controller.

Header and Directory Decode Module (MC-HD)

The MC-HD (240) decodes the packet header at the top of the MC's Input Queue. The MC-HD examines the packet's operation field and the directory entry read for this packet and determines the type of reply packet needed. Only one reply packet type should be specified at a time, one per input packet. This information is sent to the Header Encode Module (242), which encodes the reply packet's header.

There are two cycles of decode for each packet in the Input Queue. This is so that the Output Queue has valid inputs for two cycles while it loads its two internal queues. So the MC-HD will decode for two cycles, producing the same output each cycle. The MC-HD also asserts control signals for the Copyback CAM and for the MC-HE module.

The MC-HD outputs are only meaningful when the Sequencer (254) is asserting one of the following signals: SQ_MEM_DECODE, SQ_LR_DECODE, SQ_DTS_DECODE. These signals enable the HD's three decode tables.

The HD module has three packet header decoding tables, one for each of three types of operations: Memory Operations; Diagnostic Directory Operations; and Local Register Operations. Only one table can be enabled by any one packet. The correct table is enabled by a control signal from the Sequencer. Once a table is enabled, it expects to decode a valid operation. If it does not, it will signal an error.

The Memory Operations Table raises HD_COHERENCY_ERROR when an error is detected. This will cause a fatal error interrupt to be asserted by the MC. The DTS and LR Operations tables return a NACK when an illegal low priority control space packet is received. A fatal error will be asserted if a high or medium priority packet is received to a control space address.

If the directory entry does not need to be changed, the directory will be written with the original data. Soft errors in the DTS directory store will be corrected when data is written back into the DTS.

Error Handling (ERR)

The Error handling module (260) generates fatal and non-fatal error signals, as described in detail hereinbefore, to notify the system of errors detected by the MC and EDACS. The errors are posted on pins of the MC ASIC. The MC does not support any packet based interrupts. Fatal errors are cleared by cold reset or scanning the interrupt registers. Non-fatal errors can also be cleared by a control space write to the MC_NON-FATAL-ERRORS register.

Only one interrupt of each type can be outstanding at once. The MC will lose information about subsequent interrupts as long as a previous interrupt of that type is outstanding. Diagnostic information on these errors will be saved in the Local Registers Module.

DRAM Address Decode

The DRAM Address Decode function converts the address portion of the PIX bus header into a row and column address for the DRAM. It also decodes a bank for main memory based on the configuration register.

A DRAM Address Path element selects and registers the decoded address for the DRAM address decode function. This element also implements an increment function for the main memory column address. The output of this element is the address that goes to the DRAMs. Control is based on the state of a main memory DRAM sequencer and a directory DRAM sequencer.

A Directory DRAM Control module controls all the MC's outputs to the directory DRAM based on the state of the Directory DRAM sequencer and the decoded address. In order to drive the row address as quickly as possible, the RDC receives it from the decode logic directly, and drives it to the DRAM if there is no current operation.

Directory ECC Generation

The Directory ECC Generation module (244) generates 7 ECC checkbits for 19 bits of data. It is instantiated twice in the Directory data path module; once for read data and once for write data.

Directory Data Path

The Directory Data Path (RDP) provides a path between the data bus to the directory DRAMs and the directory decode/encode logic. It uses two instantiations of the flow-through Directory ECC module to generate ECC. The RDP corrects single-bit errors in the read data, if enabled to do so. All data, is registered in and registered out of this module.

Directory Refresh Control

The Directory Refresh Controller contains the refresh timer/counter and an address counter for hardware sniffing. In order to refresh 4096 rows every 64 mS, it must generate a refresh cycle every 15 uS. At operating speeds of 20 ns, a refresh must occur every 781 clock cycles. The Refresh controller includes a programmable register to set the refresh frequency over a range of values between 15 and 781 cycles. It supplies a row address to determine which row is refreshed, and a column and bank address to determine which memory location is sniffed. On Power-up reset it automatically enters a mode where it continually refreshes until all banks have been refreshed.

Directory DRAM Sequencer

The Directory DRAM Sequencer controls all access to the directory DRAM bank. It receives a start signal for a particular type of operation, and then sequences through all the states of that operation. When it is finished with a particular operation it asserts the IDLE signal.

Main Memory Data Path Control

The Main Memory Data Path Control (RMP) controls the portion of the data path from the EDAC FIFOs to the BAXBAR. On read operations it must clock data out of the EDAC's read FIFOs into the BAXBAR. The data from EDAC-1 (high order) travels on MUD_1_BUS; the data from EDAC-0 (low order) travels on MUD-0-BUS. It also controls the multiplexing of data in the BAXBAR to deliver a data beat to the PIX bus every cycle. The read operation starts when RMP receives a bus grant and a read data ready signal. On write operations, BAXBAR delivers each data beat on both MUD_0_BUS and MUD_1_BUS. The RMP clocks the data into alternating EDAC write FIFOS. The first word must be held in the write latches of both EDACs in case the transfer is a partial-word write. At the end of the write operation, the RMP asserts the RMP-WDRDY signal. At the end of the read operation, RMP asserts the RMP-RDONE signal. The IR-BEAT[3] signal is used to determine which EDAC write FIFO is clocked first.

Main Memory Refresh Control

The Main Memory Refresh Controller is very much like the Directory refresh controller described hereinbefore. It contains the refresh timer/counter and an address counter for hardware sniffing. In order to refresh 4096 rows every 64 mS, it must generate a refresh cycle every 15 uS. At operating speeds of 20 ns, a refresh must occur every 781 clock cycles. The main memory refresh controller includes a programmable register to set the refresh frequency over a range of values between 15 and 781 cycles. When it does a refresh operation, all banks have the appropriate row refreshed. This way the refresh frequency does not have to change if more memory is added. The refresh controller supplies a row address to determine which row is refreshed, and a column and bank address to determine which memory location is sniffed.

Main Memory DRAM Sequencer (RMS)

The Main Memory DRAM Sequencer controls all access to the main memory DRAM banks. It receives a start signal for a particular type of operation, and then sequences through all the states of that operation. When it is finished with a particular operation it asserts the IDLE signal.

Copyback CAM Module

The Copyback CAM (250) keeps copies of transactions that cause copyback requests. It stores the header from the original read or write request that caused the MC to issue a copyback command (CB_CMD or CB_INV_CMD). When a copyback reply (CB_RPLY or CB_INV_RPLY) or WriteBack (WB) arrives at the top of the MC's input queue, the CAM compares it to all the commands stored in the CAM. If there is a match, then the packet satisfies a prior copyback command. The directory is updated as indicated by the stored command and a read reply packet (RD_S_RPLY or RD_INV_RPLY) is generated with the copyback or writeback data. Finally the hitting CAM entry is invalidated.

The Copyback CAM is necessary because the memory must forward copyback data to the node that is trying to read that block. The requesting node will not know that a copyback was needed to generate the read reply. Writebacks are also looked up in the CAM because a writeback and a copyback command for the same cache line can occur simultaneously. When the copyback command arrives at the cache, it will be ignored because the cache no longer has data for that block. Therefore the memory must recognize the writeback as satisfying the copyback command.

The Copyback CAM has two entries. Therefore the MC is limited to two outstanding copyback requests. When a request packet is received which needs to generate a copyback request, the request is given a RETRY reply packet if the CAM is full. No new copyback requests can be generated until a CB_RPLY,CB_INV_RPLY or WB arrives that matches the address of one of the CAM entries. Even then, the CAM is considered busy until the reply packet which is created from the newly arrived copyback or writeback data is granted onto the MCBUS. This ensures that the MC will not require more than two output queue entries to service all the outstanding copybacks. The Copyback CAM is allocated two output queue entries and must not use more or forward progress may be endangered.

The CAM checks for hits every cycle, however the Header Decoder Module (MC_HD) will look at the CAM's hit signal only when a copyback reply, copyback invalidate reply or a writeback is at the top of the input queue. CAM entries may never be equal, i.e. multiple hits are not allowed. The CAM CONTROL is responsible for preventing equal entries. Reset clears all CAM entries simultaneously.

If the MC receives a memory operation that requires a copyback, but the Copyback CAM is full, the MC will issue a Retry packet to the requester. The MC will read the directory before considering if the CAM is full to avoid retrying a request unless it absolutely has to copyback. None of the MC's busy signals are affected by the Copyback CAM being full.

The Copyback CAM is implemented with two modules: the CAM MUX and the CAM CONTROL. The CAM MUX contains the two CAM entries and outputs only the entry selected by the CAM's hit signal. CAM CONTROL manages the CAM's load pointers and manages reset and signals when the CAM is full.

Each CAM entry has registers which are loaded from the top of the Input Queue. Each also has a registered Valid bit. All these registers are loaded when the packet at the top of the Input Queue causes a copyback command to be issued. Only one CAM SLICE is loaded for each copyback. The Valid bit is set or cleared by loading it with the value of CC-VALID when CC-LOAD is active.

The CAM mux module compares the contents of its ADDR register against the packet at the top of the input queue every cycle. Each CAM entry puts out a CS_HIT to indicate that the addresses match and that the Valid bit is set. This hit signal is used to produce the Copyback CAM's output.

The CAM MUX takes the outputs of all the CAM entries and asserts CM_HIT if one of the CAM entries is hitting. It outputs the address, opcode, and requester id from the hitting entry. If there are no hits, the address, opcode and requester id outputs of the CAM MUX are undefined.

The CAM Control provides the reset and load control for the CAM SLICES. Multiple CAM hits are not allowed, i.e., CAM entries may never be equal. The Load pointer increments after a CAM entry is loaded, so it is always pointing to the next entry to load. Reset simultaneously clears all CAM entries by synchronously clearing all the Valid bits. A signal SQ_CLR_CAM clears one entry by loading a zero into CC_VALID for the selected entry.

Snoop CAM

The Snoop CAM is used to detect when read replies for UNORDERED blocks have made it through the PI queues and are visible on the local Pix bus. A block is UNORDERED if its directory UNORDERED bit is set. This is explained hereinbefore.

Due to the UNORDERED state of a memory block, the MC may have to send local read replies for that block external (via the backplane) to maintain system coherency. Sending the read reply external guarantees that it will arrive on the local PixBus after any older invalidate type packets that may already be in the PI queues.

Once the MC has sent such a read reply external, it snoops the local Pix bus looking for the read reply to reappear. Once the MC sees the read reply it knows that the invalidate that caused the read reply to go external must have also left the PI queues. That memory block is no longer unordered. This is tracked by entering into the Snoop CAM the address (bits 29:6) and the requester ID (bits 5:0) of any read reply that is sent external due to UNORDERED memory state. Issuing the read reply clears the UNORDERED directory bit and the UNORDERED state of that memory block is now tracked in the Snoop CAM instead of in the directory.

The Snoop CAM entry is cleared when the MC sees the read reply issued on the local Pix bus. Both the packet's address and requester ID must match the Snoop CAM entry before the entry is cleared.

The address of any local read reply generated by the MC is checked against the Snoop CAM as well as against the UNORDERED bit in the directory. The read reply must be sent external if either the UNORDERED bit is set or if the CAM shows that there is already an outstanding external read reply for that memory block.

Every local read reply sent external due to an UNORDERED condition is entered the Snoop CAM, even if its address matches one already in the CAM. Since each requester can have only one outstanding read request, the requester IDs of all the Snoop CAM entries will be different, so there will never be multiple hits where both the address and the requester ID match. However there may be multiple hits for just the address compare.

When the directory manager does a Snoop CAM lookup to determine if a block is UNORDERED, only the addresses will be compared. But when the read reply snooping logic does a Snoop CAM lookup, both the address and the requester ID will be compared.

The Snoop CAM is a performance optimization. The unordered state could be kept exclusively in the directory. However snooping read replies would be impractical since each read reply seen on the local PIX bus would require a directory access to see if that block is marked UNORDERED. Omitting the read reply snooping would increase the number of local read replies sent external since memory blocks would retain their UNORDERED state for much longer.

The Snoop CAM is a 6-entry 25-bit wide hybrid between a CAM (contents addressable memory) and a register file. Each CAM entry corresponds to one of six requester IDs. CAM entries hold only a 24-bit address and a valid bit. Loading is done by indexing into the CAM with the requester ID. Clearing requires an address comparison as well as indexing off of the requester ID.

The CAM loads and outputs address bits 29:6. A CAM address hit is based on the comparison of the address bits and the valid bit. Each CAM entry has a separate hit signal. It is possible for multiple CAM entries to hit on the same address. The Snoop CAM can be loaded from either the entry at the top of the Input Queue or from the Copyback CAM entry that matches the top Input Queue entry. The Snoop CAM is loaded during the second cycle that HI_SNP_SEL=0 after the SQ_LD_SNP_CAM signal is asserted. The Requestor ID of the packet in the Input Queue/Copyback CAM is used to index into the Snoop CAM to choose the entry to be loaded. A fatal error is flagged if the CAM tries to load an already valid entry. When the directory manager (MC-HD module) requires a Snoop CAM comparison, a hit is found if the address stored in any valid Snoop CAM entry matches the address at the top of the Input Queue. An address from the Copyback CAM is used instead of the Input Queue address if the Input Queue packet is a high-priority write that is hitting a read request in the Copyback CAM.

When the read reply snooping logic is looking for a hit in the Snoop CAM, both the address and the requester ID must match. The requester ID of the snooped read reply is used to index into the Snoop CAM. Then the address of the read reply is compared with the address stored in that CAM entry. If the addresses match and the entry's valid bit is set, a match has been found and the CAM entry's valid bit is automatically cleared.

The CAM has six entries so that it will be able to service one outstanding read request from each of six local requesters. Each entry is dedicated to a specific requester ID. Those IDs can be set by scanning the REQ_ID_<5-0> registers, which are set by cold reset to selected IDs.

It is assumed that there will never be more than one outstanding low priority request from each requester. If the MC tries to load a new read reply into the Snoop CAM and finds that that requester already has an outstanding read reply, the MC will assert a fatal error. The CAM has no data output. Its only outputs are its hit and valid signals. A warm reset clears all the valid bits.

The directory manager and the snooping logic arbitrate for use of the Snoop CAM. Each is granted two cycle windows to use the CAM. The snooping logic has priority if both request simultaneously. The arbitration is performed by the MC-HI module. A HI_SNP_SEL signal is asserted when the snooping logic is granted. It is the default to grant the snooping logic. HI_SNP_SEL is the select signal for a CAM mux which selects between input from the Input Queue/Copyback CAM and input from the HI snoop register. The HI snoop register holds the last read request snooped from the PIXBus. The snooping logic asserts HI_SNP_BUSY when it is starting a CAM access. The directory manager asserts SQ_SNP_REQ when it wants to use the CAM. SQ_SNP_REQ must always be asserted for exactly two cycles.

Header Encode Module (HE)

This module (242) encodes the header for any packet issued by the MC. It takes input from the Input Queue, the Header and Directory Decode, the Directory Input Register and the CopyBack CAM. Packet headers can be either one or two beats long. Two beat headers include a node field in the first beat. HE_TWO_BEAT will be asserted during the node beat (first beat) of a two beat header. When a Local Register is read, the Header Encode tells a Header Mux to drive one beat of header from this module, followed by one beat of data from the Local Registers. In this case the HE_TWO_BEAT signal is asserted during the header beat. The Header Encode Module has one smaller sub-module: the Header EXternal Compare (HEX). This compares the directory VBits to the MC's own node bit to determine if the reply packet will need to go to other nodes. The MC's node bit is decoded from the node number assigned to the MC ASIC on the NODE_ID[3:0] pins.

Output Mux (OM)

The OM (258) selects what to drive into the address field of the Output Queue. Selects between headers from the Header Encoder Module and registered data from the Local Register Module. The Output Mux is 32 bits wide.

Output Queue Modules

The Output Queue (246) holds the MC ASIC's portion of up to 5 outgoing packets. The MC will normally use only 4 of the 5 queue entries. The fifth entry is used only if the MC is processing an EDAC diagnostic mode packet and the output queue fills with three normally generated reply packets. Normally, the MC generates no more than one output packet for each input packet it receives, and the input queue can hold only four packets. However the EDAC diagnostic mode operations require two output packets to be generated. The fifth output queue entry guarantees room for that extra packet.

Each of the queue's entries are two beats wide. If only one beat is needed, the second is a copy of the first and is never driven onto the MCBUS. The Output Queue is composed of two smaller queues, Queue A and Queue B. Queue A holds the first beat and 6 bits of packet control information. Queue B holds the second beat.

The DRAM control uses some additional bits from the Output Queue. It gets the number of data beats to be driven by looking at OQ_SIZE[2]. This bit is asserted when a full block needs to be driven. OQ_FORMAT[2] is asserted when the packet has a node beat. When there is a node beat, the DRAM controls wait an extra cycle after bus grant before driving data. A two beat entry may be the two beat header for a remotely snoopable packet (node and address beats) or it may be a Control Space read reply from the MC (address beat and one data beat). The MC ASIC can not source more than a single beat of data. The data beats for memory reads will be supplied by the EDACs via the MUD_0_BUS and MUD_1_BUS.

The Output Queue's normal usage is limited to four packets because that is the maximum that the EDAC read FIFOs can hold. Each packet in the Output Queue is guaranteed space for eight beats of data in the EDAC read FIFOS, even if there is no data needed from the EDACs for this packet. The exception to this are the EDAC diagnostic mode operations. Each diagnostic mode operation puts two packets into the Output Queue, but they share the same space in the EDAC read FIFOs because the first packet instructs the EDAC to put diagnostic data into the read FIFO, and the second packet sends that data to the requester.

To guarantee forward progress the MC must always have enough output queue space to finish a writeback or copyback reply once it is accepted into the Input Queue. Two entries are reserved in the Output Queue for this purpose because the Copyback CAM has two entries. Only read replies generated by copyback replies(CB_RPLY or CB_INV_RPLY) or writebacks (WB) that hit the Copyback CAM may use these entries. These entries are reserved on a floating basis, i.e., they are not attached to any specific locations within the queue.

The Output Queue also reserves two entries for replies generated by the packets in the Input Queue. This is also to guarantee forward progress: the MC should also have enough output queue space to complete the operations accepted into its input queue. The Input Queue is four entries long, but only two of those entries may contain low priority packets.

The Output Queue is low-full if the Input Queue has two valid low entries. The MC will assert its low priority busy signal to indicate that it can accept only high priority packets.No busy signal is raised when the two entries corresponding to the CAM are full. Instead the MC will retry any memory request that needs to generate a copyback command. The retry will not occur until the directory has been read. This is identical to what the MC does when the CAM itself is full.

The Output Queue enqueues the data on its inputs when the Sequencer (MC_SQ) asserts SQ_ENQUEUE_OUT_A or SQ_ENQUEUE_OUT_B. Only one of the two queues is enqueued at a time. The Output Queue dequeues the beat at the top of the queue when the Master Bus Arbiter asserts MA_DEQUEUE_OUT. An entire entry (two beats) is dequeued at once. There is a cycle delay after MA_DEQUEUE_OUT before the dequeue occurs. The Output Queue is built with registers instead of RAM so that it can be part of the MC scan chain.

Output Register (OR)

The OR registers data from the Output Queue and drives it onto the MCBUS when the bus is granted to the MC. The Output Register is 72 bits wide (64 bits of packet beat and 8 bits of parity). It also generates 8-bit even parity for out going packet beats. The Output Queue does not provide a full 64-bit beat, so missing bits are supplied here as zeros.

State Diagrams

FIGS. 11–24 present state machine diagrams of the architecture according to the invention, some of which represent the major state machines of the MC ASIC. The following state machine diagrams are included and have a brief description herewith, but should be otherwise well understood by those skilled in the art.

SQ_CURRENT_STATE: This is the main sequencer for the header and directory decode and reply packet generation. It controls enqueueing of the Input Queue, the Output Queue and the Copyback CAM. It also controls dequeueing of the Input Queue and the Copyback CAM. It helps synchronize the DRAM controller with the header decode and generation logic.

SQ_DONE_STATE Machine: This state machine determines the earliest time that the MC can request the bus for the reply packet being encoded. When the Output Queue is empty, bus request can be asserted before the header is even ready to be enqueued in the Output Queue. There are two limiting factors. When the header will be ready, and when any data beats will be ready. SQ_DONE_STATE is started by the SQ_CURRENT_STATE machine when it determines that a reply packet is needed.

SQ_CURRENT_STATE asserts START_REQUEST when it knows the header can be produced in time. If the reply packet will contain read data, SQ_DONE_STATE waits for the DRAM controller to signal that it is ready. The SQ_DONE_STATE asserts DO_NEW_OP when we are ready to request the bus. DO_NEW_OP asserts for only one cycle. SQ_DO_OP_STATE Machine: This state machine counts the number of packets waiting for a bus grant and tells the MC_ARB_SM state machine when to request the bus. It asserts SQ_DO_MED_OP for one cycle when DO_NEW_OP is asserted by the SQ_DONE_STATE machine. If there is more than one packet waiting for a bus grant, then SQ_DO_MED_OP remains asserted until bus request has been asserted for the last packet.

MC_ARB_SM: This state machine asserts the MC's bus request whenever SQ_DO_MED_OP is asserted. MC_ARB_SM also monitors bus grant and reports an error if grant comes at an illegal time. When a request is granted, the state machine determines whether request should be keep asserted for another packet. It also delays requests if the EDAC Read FIFO is busy dumping unwanted data or is being used for a partial write-merge. When the Read FIFO is busy,it is unavailable to drive data beats for a reply packet.

MC_M_SM: This state machine drives reply packets on to the bus. It monitors bus grant and uses the packet's format code to drive the correct number of beats onto the bus. The states of this state machine are also used to generate MC_ONE_TO_GO and MC_EXTEND.

SQ_EDAC_STATE: This state machine runs only when an EDAC diagnostic mode operation is being performed. It stays in the IDLE state until the NOP packet to the EDACs has been enqueued in the Output Queue. Then it advances to the DECODE state where is waits until OQC_FULL indicates that the output queue has room to enqueue the reply packet to the requestor (either an RD_S_RPLY ACK or NACK). It then advances through the ENQ_A and ENQ_B states, asserting the SQ_ENQUEUE_OUT_A and SQ_ENQUEUE_OUT_B signals to enqueue the reply packet in the output queue.It returns to the IDLE state only when the NOP packet receives a bus grant. It then asserts the SQ_EDAC_DONE signal which deasserts the MC_BUSY_HI_N and MC_BUSY_LO_N signals. HI_SNP_STATE: Selects the input for the Snoop CAM input mux.

EDiiC ASIC

Figure 25:
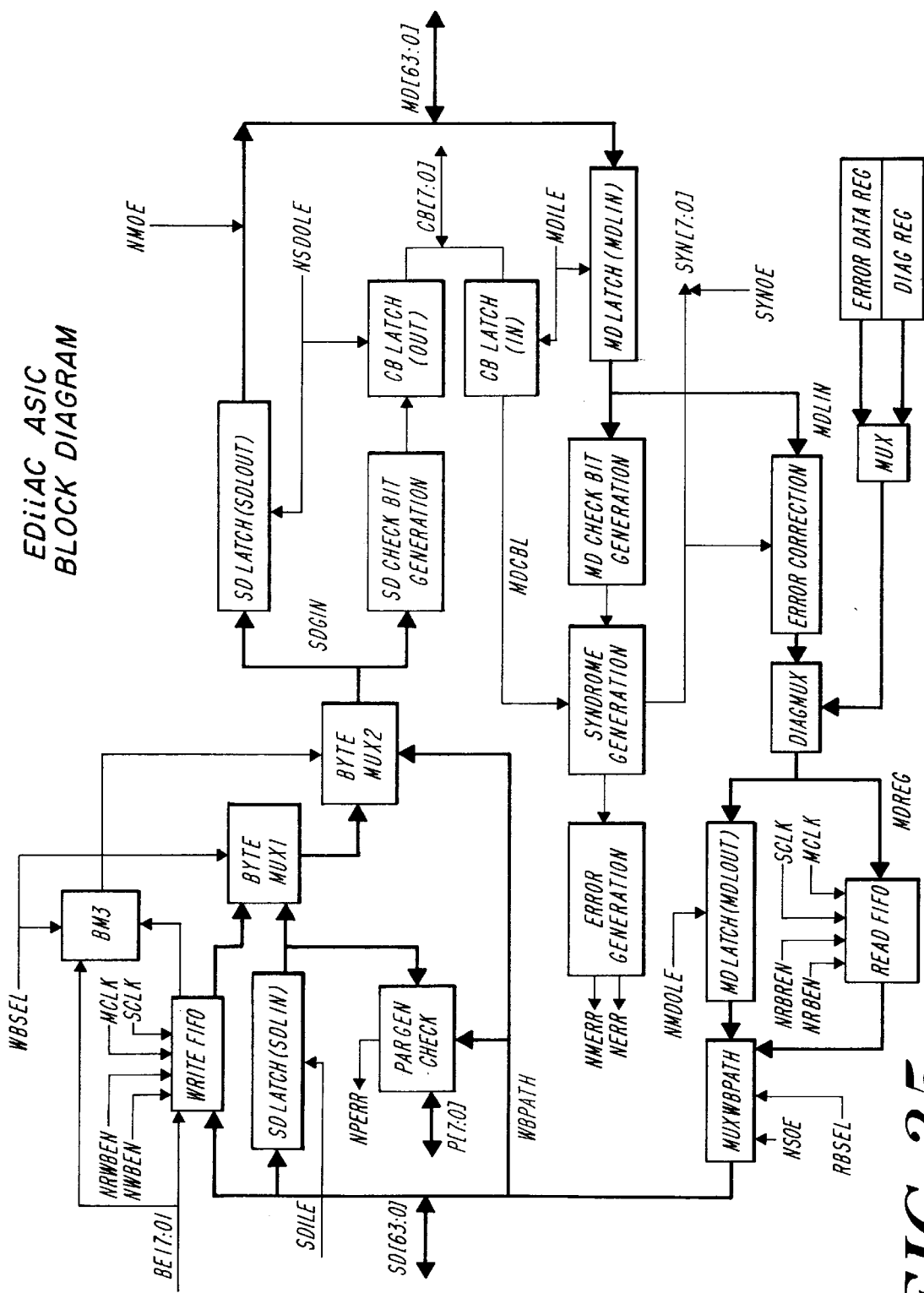
FIG. 25 is a block diagram of an Error Detection and Control device ("EDiiAC" or "EDAC") ASIC.

Data integrity for the memory resources on the motherboard (52) as discussed hereinbefore, and the daughterboard (58) third level cache (TLC) to be discussed hereinafter, is effected by a standard Error Detection and Control device known in the art, referred to herein as the "EDiiAC" or "EDAC" ASIC, a block diagram of which is illustrated in FIG. 25. The Error Detection and Correction ASIC is a 240-pin PQFP CMOS gate array using LSI's LCA300K, 0.6 micron process, such as LSI part number L1A9566. This part is a virtual functional equivalent for the IDT 49C466, a generally available memory error correction IC, described in detail in the IDT High Performance Logic data book, the teachings of which are incorporated herein by reference.

The EDiiAC, in both applications, checks and generates 8 bits of checkbit information across 64 bits of data. Both reads and writes are supported by 16 word deep FIFOs, as well as a single word latch to bypass the FIFO. On the non-ECC side, parity is checked and generated in either polarity.

All single-bit errors are detected and corrected. All two-bit and some multi-bit (greater than two-bit) errors are detected. The EDiiAC also implements a byte merging facility, where individual bytes of data are combined with a word of data read from memory.

Operations are controlled by a mode register. The EDiiAC can be set up to generate and check ECC or to generate check and correct. Diagnostic information is captured in the EDiiAC and can be read by manipulating the mode register. The EDiiAC is implemented as a functional part of the memory system as described hereinbefore with respect to the MC ASIC, and as a functional part of the third level cache as will be described hereinafter with respect to the third level cache controller (TLCC) ASIC.

CACHE COHERENCY

System Event Ordering

In any multi-bus, parallelized processor design like the present system (50), ordering of events is a potential problem. As an example, consider two processors sharing a database. Both processors have shared copies of the database data. Processor A acquires the lock for the database. processor A modifies a shared database, then releases the lock to that database. If processor B observes the release of the lock before seeing the notification that his hard copy of the data is stale, he will use the stale data, causing unwanted effects that are difficult to find. Note that the addresses of the data and lock can be completely different; there are no address match dependencies.

In the present illustrative embodiment of a CCNUMA architecture according to the invention, several mechanisms are implemented and distributed throughout the functionality of the system which ensure ordering and cache coherency. To begin with, the architecture is designed to maintain the philosophy that any two consecutive events that modify system state which when issued by a single entity (e.g. processor, I/O device) must be observed at every other entity in the system in the same order that they were issued. Candidate events are: low priority events: CI_RD, CI_WR_UNLK, WR_THRU; medium priority events: INV_CMD, RD_INV_RPLY, CB_INV_CMD; and high priority events: CB_RPLY, CB_INV_RPLY, WB.

Ordering with respect to the initiation of transfers from the source is effected by requiring that for all operation types except writebacks and copyback replies, transfer requesters be pending until they receive an acknowledge of that transfer. If they issue a CI_RD, they must receive the data return packet. If they issue a CI_WR, CI_WR_UNLK or WR_THRU they must receive an ACK packet. If they issue a RD_IM they must receive the data return block, and if they issue an IM they must receive the INV_CMD as their acknowledge. This mechanism guarantees that the initial packet has either reached the destination (CI_operations) or has reached the memory controller (MC) and the invalidate/acknowledge packet has reached the backplane bus and has been accepted by all backplane bus interface arrays.

Ordering on a motherboard (52) is guaranteed not only with the pending until acknowledge scheme, but also by the artifact of only having one bus, which serializes the operations. The only other consideration on the source board is that it is necessary to guarantee that operations do not reverse within the input FIFOs of the destination arrays or ASICs.

Guaranteeing of ordering at the backplane busses is dealt with for invalidate/ack packets only. Initial transfers do not cause invalidates indirectly, as in a snoop-type architecture. In the present invention, all initial requests are routed to the appropriate memory module, which looks up the state of the cache line held in the memory controller's (MC) (82) cache state directory. The memory controller will generate an invalidate/ack packet and route it to the backplane bus (56). Any affected motherboard (52) which cannot accept the packet (i.e if their medium input queue is full) will indicate by asserting RESEND. No motherboard will accept the packet replied to with a RESEND. This guarantees that the packet is accepted by all motherboards at the same time (this includes the motherboard of the original requester).

Motherboard Incoming Packets

The mechanisms described guarantee that an invalidate/ack associated with an initial request will have reached the backplane bus interfaces of all motherboards (52). There is a case where the invalidate/ack on the initiator's motherboard will be returned to the initiator, but the invalidate/ack on a remote motherboard may remain for a period of time in the bus interface input queue. This allows a scenario where the initiator can unpend the processor and issue another request which modifies system state. That request must not be allowed to get into the remote motherboard before the earlier invalidate/ack.

A Cache Inhibited Operation (CI_op) followed by CI_op will not cause a problem because of the acknowledge requirement. A CI_op followed by invalidate/ack will not cause a problem because of the acknowledge requirement. A CI_op followed by writeback/copyback will not cause a problem because of the acknowledge requirement. A writeback/copyback followed by writeback/copyback will not cause a problem because the two operations can only be physical memory references, and there cannot be stale shared data anywhere in the system. A writeback/copyback followed by CI_op will not cause a problem because the first operation can only be physical memory reference, and there cannot be stale shared data anywhere in the system. A writeback/copyback followed by invalidate/ack will not cause a problem because the first operation can only be physical memory reference, and there cannot be stale shared data anywhere in the system.

An invalidate/ack followed by invalidate/ack is handled by arbitration on the destination motherboard(s). Incoming medium priority packets are ticketed (time-stamped) when enqueued by the PI (64), and are granted based on age. Note that all medium priority packets are ordered, not just the invalidate/ack ones. The PI may enqueue non-invalidate packets ahead of older invalidate packets while the invalidate packet is waiting to see if it will receive a PIBus (54) resend.

An invalidate/ack followed by CI_op is handled by arbitration on the destination board(s). The ORB (98) won't grant any CI_RD,CI_WR, CI_WR,CI_WR_UNLK, WR-THRU operations that arrive at the PI arrays from the backplane until all invalidate/ack packets that had been received within the last 31 cycles have been granted. The reason for allowing CI_ops to be granted before the older invalidates is that there is a minimum latency for a requester to receive the ack from the backplane, unpend a processor, issue a CI_op, and have that operation arrive at a remote motherboard.

Another requirement is that the invalidate/ack and CI_op must not be allowed to reverse order in the input queues of the target ASIC. This has been handled in the ASIC designs for the CI (124) and GG (78). The RI ASIC (74) is not a problem since it does not initiate requests, and the MC ASIC (82) is not a problem since MC internal registers are not used as semaphores for coherent communications by software.

An invalidate/ack followed by writeback/copyback is handled by arbitration on the destination board(s) in conjunction with the memory controller. The MC (82) guarantees ordering by routing local memory reference to the backplane (54), which then arrive through the medium incoming queue (in the PI). This is only necessary for memory cache lines which have been modified while there is one or more outstanding invalidate/ac ops which has resided in a PI backplane bus input queues for more than 31 cycles.

The ORB (98) monitors the PI's (64) medium priority requests, and sends the results to the MC (82). This pin is called ORB_ORDER_NEEDED. The MC has a bit (UNORDERED) in the directory that indicates the need to route local replies to the backplane. Note that remote replies do not change the routing requirements of local replies. Once a reply has been routed to the backplane (54) and been "snooped" by the MC (82), further routing to the backplane based on the original condition is unnecessary.

The design for the present invention implements the following rules to ensure event ordering. Many of these rules target coherent ordering on the busses between packets of different priorities.

1. All packets to the same cache line address always use the same PI bus. This maintains order between packets of the same priority for any cache block.
2. High Priority Packets can ALWAYS get to memory. Livelock can result if this rule is broken. High priority packets are always accepted by the MC (82), they never get a RETRY. Forward progress of a high priority packet should never depend on the forward progress of another packet.
3. Medium Priority Packets received from the PIBus (56) are granted onto the PixBus (66) in the order that they are enqueued by the PIs (64). Medium packets are ticketed as they are enqueued in PI→PIX queues. Ticketing a medium packet prevents it from being granted the PixBus (66) ahead of any older medium packets. Mediums are ticketed to ensure that memory responses arrive at other nodes in the order that they were generated by the memory. Medium priority packets are enqueued by the PIs (64) in the order that they arrive on the PIBus (56), with one exception. Packets that are targeted at multiple nodes are held by the PI (64) for two cycles before enqueueing them. The two cycles are required for the PI (64) to determine if all the other targeted PIs were able to take the packet. A packet may not be enqueued by any PI (64) unless all the targeted PIs can enqueue it in the same cycle. Because of this two cycle delay, a newer medium packet arriving on a different PIBus could get an earlier ticket that the first packet. Although a RD_S_RPLY can not be targeted at multiple nodes, it can get a node beat, which would cause the PI (64) to also delay it for two cycles. This ordering scheme prevents these low priority packets from bypassing older medium priority invalidates, and is needed to made software semaphores work. Invalidates which arrive at a PI (64) less than 31 cycles before a CI_RD, CI_WR or CI_WR_UNLK are not believed to cause ordering problems. The semaphore ordering problem requires that the invalidate is the local memory's acknowledgment of a remote requestor's modification of a data location. The low priority request would be a request from the same requester to release the semaphore for the data location. The ordering problem occurs if the semaphore release reaches the local memory before the older data invalidate is snooped by local caches. The invalidate packet is enqueued by the PIs on both the local and remote nodes in the same cycle. It is believed that it requires more than 31 cycles from then for the invalidate to reach and be processed by the remote requestor and for the requester to then issue the semaphore release. The number 31 is programmable to smaller values.
4. A packet with more than one target node will arrive at the PI (64) queues of each node simultaneously. This helps ensure that snoops are seen on all boards in the same order. This means that RD_INV_RPLYs and INV_CMDs that are targeted at local requestors but that need to be snooped on remote nodes are sent external to the PIBus. The local requesters are not allowed to snoop the packets until they arrive back on local PixBus.

5. All CB_INV_CMDs and CB_CMDs are sent external. This ensures that a copyback command targeted at a local requestor (one on the memory's own node) will never arrive at its target before an older RD_INV_RPLY or INV_CMD. Since the snoopable RD_INV_RPLY and INV_CMD packets may have to be sent to local requesters via the backplane, this rule ensures that the copyback command will not bypass the invalidate by being sent to the requestor via the local PixBus. Instead the copyback command ends up serialized with the invalidate in the PI (64) medium queues.

6. All INV_CMDs are sent external. Since local RD_S_RPLYs and RD_INV_RPLYs may be sent external when a cache line is marked unordered, INV_CMDs must always go external. While the read replies are tracked in the director's Snoop CAM, the INV_CMDs are not. Be sending all INV_CMDs external we can guarantee that a local invalidate will never arrive at its target ahead of the read data that it is supposed to invalidate. Sending INV_CMDs external also prevents stale INV_CMDs from causing data corruptions.

7. UNDO_MODs are issued for 88410 return phase miscompares and idles. The CI will issue an UNDO_MOD if it receives a reply to a RD_IM or IM request and the 88410 either does not come back to take the reply or comes back asking for a different address. The UNDO_MOD will take the directory state for that block from modified back to shared, and the CI will drop its RD_IM or IM.

8. Medium priority packets are serviced before Low priority packets in GG ASIC (78). When the GG (78) receives a low priority packet, it services older snoopable RD_INV_RPLY and INV_CMD packets before the new low packet. When a low priority packet arrives, the GG flags any medium queue entries which contain either RD_INV_RPLY packets that are targeted at other requesters or any INV_CMD packets. All the flagged entries must be serviced before the low packet. Any new low priority packets are RETRYed since the GG does not enqueue low priority packets. Any new medium priority packets are placed in unflagged queue entries because they do not need to precede the older low priority packet. RD_INV_RPLYs that are targeted at this GG are data returns, not snoops, and do not need to be serviced before the newer low packets.

9. Medium Invalidates are serviced before Private Resource Requests in CI ASIC (124). The CI ASIC will retry any private resource requests that it receives from the 88410s while there are snoopable invalidates (RD_INV_RPLY, INV_CMD, DB_INV_CMD) in the medium input queue.

10. Read Replies are ordered with INV_CMDs when data has been modified by a High Priority Write from a remote node. Local RD_S_RPLYs and RD_INV_RPLYs are sent external through the PI (64) queues to be ordered behind older INV_CMDs when there is a chance that the read data could release a software semaphore for a data location affected by the INV_CMD. This is actually an ordering problem between high and medium packets, however no ordering restrictions may be placed on the high packets as they must have unimpeded access to the memory. Interfering with this will lead to system livelock. Therefore:

11. Special Attention is paid to Ordering between High and Medium Packets. Maintaining order between high priority writes and medium priority invalidates requires some details. The ordering problem with high priority packets is that a high priority write (WB, CB_RPLY, CB_INV_RPLY) could bypass an incoming medium priority snoopable invalidate (INV_CMD, RD_INV_RPLY). As described hereinbefore with respect to the MC ASIC, while a signal ORB_ORDER_NEEDED is asserted, the MC marks any memory block that receives a high priority write as potentially unordered. The MC (82) will send any local read replies to that block external through the PI's to guarantee that they will be ordered behind the outstanding invalidate.

Packet Node Beats

In order to effect the directed broadcast mechanism according to the invention, i.e. to ensure that only nodes that have a copy of a cache line being accessed are affected, an extra beat is used at the beginning of a packet header. When the directory sends a snoopable operation to the PIBus it attaches the extra beat called a node beat to the beginning of the packet. The node beat indicates to the PIs which nodes need to receive the packet. The node beat is the first beat of any packet which has the Remote Snoop Bit, bit 45, set. The Remote Snoop Bit is set in both the node and header beats. Any packet on the PIXBus with a Remote Snoop Bit set is known to be headed for the backplane and will not be snooped. When the PI (64) drives the packet back into the PixBus, the PI (64) strips off the node beat and clears the Remote Snoop Bit in the header beat.

Non-snoopable packets are targeted at only one requestor, the one indicated by the requestor ID. So these packets do not need a node beat to keep local requesters from enqueueing them. For these packets, the PI (64) looks at the requestor ID to determine if the packet is targeted at a local or remote node. If the ID is remote, the packet is sent to the PiBus. If the ID is local the PI (64) does nothing with the packet and it is delivered on the local PixBus.

Only the memory can generate packets with node beats. The following snoopable packets are always generated by the memory with a node beat: INV_CMD, DB_INV_CMD, CB_CMD. The RD_INV_RPLY snoopable packets are generated with a node beat if they are going to a remote node or if they are being sent to the PiBus to maintain order with older invalidates. When the packet is going remote, it gets a node beat regardless of whether it is targeted at one or more nodes.

The RD_S_RPLY non-snoopable packets are generated with a node beat only if they are being sent to the PiBus to maintain order with older invalidates. These are local replies, so the PIs would not send them to the PiBus if they did not have a node beat.

The AC, NACK, RETRY, NOP packets are non-snoopable packets that never get a node beat.

Directory Cache Coherency

The coherency protocol of the present invention is based on a full-map directory structure maintained in the memory modules. Any time a cache line changes state the directory must be updated. For each cache line the directory knows which nodes (motherboards) have copies of the line and in what state the line is held. For the cache line to transition to a new state, the directory must receive a request from and issue a response to the cache that desires the data. If the new state makes existing cached copies of the line stale, the directory will send an invalidate to all the nodes that have copies of the line. Such invalidates are targeted at nodes, not individual caches, because the directory stores node, not requestor, information. Being able to target coherency updates like invalidates at specific nodes is the directory's main advantage as it reduces unneeded snooping.

Each node which contains local memory also has a directory. The directory contains one entry for each cache line in the physical memory space of that directory's associated memory. The directory entries contain coherency information for their respective cache lines. The directory entry fields as defined hereinbefore with respect to the MC ASIC, include:

VALID BITS: an 8-bit field. Each bit pertains to a specific node on the PIBus. A bit set in this field indicates that there is a valid copy of the cache line at the corresponding node.

MODIFIED BIT: a 1-bit field. This bit, when set, indicates that there is a modified copy of the cache line somewhere in the system and the line is stale in memory. When the Mod bit is set, one and only one Valid bit should be set. Data coherency allows only one modified copy of a cache line at any one time.

LOCK BIT: a 1-bit field. This bit indicates that there is a lock set on this cache line. When this bit is set, all accesses to the corresponding cache are retried (except for the unlock operation).

UNORDERED BIT: a 1-bit field. This bit indicates that this cache line may be subject to packet ordering constraints. When this bit is set, some read replies to local requesters may have to be sent via the PIBus, i.e. "external", to preserve coherency packet ordering.

BUSY—COPYBACK CAM HIT. This is not a directory field although it could be implemented as one. The directory has a 2 entry CAM which stores the address, opcode and requestor ID of requests for which the directory must request a copyback. All memory requests are looked up in the Copyback CAM in parallel with accessing the directory entry. A hit for the Copyback CAM indicates that there is an outstanding copyback pending on that cache line. When this bit is set, all accesses to the corresponding cache line are retried (except for writebacks and copyback replies).

All memory addresses on the PIBus (56) are routed to the appropriate memory module. Each address is put in a queue for service by the memory. Each address is looked up in the directory and the memory will generate a response based on the directory contents and the type of access requested. The memory will send data and acknowledgment responses only to the node that requested the cache line. Snoopable responses are directed only to nodes that have a valid copy of the accessed cache line.

Directory States

The memory directory can hold a cache line in one of five states, as described hereinbefore and elaborated upon hereinafter. Those states are:

UNUSED. This state means that the cache line is not resident in any caches in the system. The only valid copy of the line is in memory. All valid bits and the modify bit are zero in this state.

SHARED. This state means that there may be caches with copies of the cache line that are the same as the copy held by the memory. One or more valid bits in the directory are set and the modified is zero.

MODIFIED. This state means that one and only one cache in the system has a copy of the cache line. This cache's copy is assumed to be different than the copy held by the memory. One valid bit is set along with the modified bit in this state.

LOCKED. This state means that this cache line has been locked by a system requestor. The cache line is unavailable to other requestors until it is unlocked. This state is a cache inhibited state so no shared copies exist. The lock bit is set in this state and all vbits are zero.

BUSY. This state means that this cache line has an outstanding copyback command. The directory entry bits are unchanged when a copyback command is issued, so the modified bit and the vbit of the node which currently holds the data will still be set to one. The busy state is set by loading the address, opcode and requestor ID of the request in to the Copyback CAM.

These five states are qualified with the UNORDERED bit which indicates whether the cache line is subject to packet ordering constraints. This affects whether local replies need to travel via the PIBus, but does not affect the type of reply packet or the coherent directory state.

For further discussion it is necessary to distinguish between cache states and directory states. A cache keeps state information with each cache line it holds. Those states follow:

Invalid. This state means that the cache does not have a valid copy of the line.

Shared. This state means that the cache has a valid copy of the cache line and that this copy is the same as the copy held by the memory. Other caches in the system may also have shared copies of this line.

Exclusive. This state means that the cache has a valid copy of the cache line and that this copy is the same as the copy held by the memory. No other cache in the system has a valid copy of this line.

Modified. This state means that the cache has a valid copy of the cache line and that this copy is not the same as the copy held by the memory. This is the only valid copy of the cache line in the system.

The coherency model based on 88110 processors does not support the EXCLUSIVE cache state. Therefore the CI ASIC (124), described hereinafter, must make the EXCLUSIVE state of the 88410 and 88110 caches invisible to the PIBus and the directory. The directory will mark lines modified that may be marked exclusive in a cache. The directory will expect a copyback on accesses to modified lines and the CI (124) must generate a copyback from 84410 in this case.

Directory and Cache State Transition

The tables in FIGS. 26A, 26B and FIG. 27 summarizes the changes in directory and cache state for each possible memory transaction of the present invention. Cache state refers to the state of the 88410 and I/O caches. The tables also show the type of packet issued by the directory/memory in response to each request. The directory maintains coherency in the system's caches by issuing copyback commands and invalidate commands as needed.

There are separate tables for cached requests, FIGS. 26A and 26B, and cache inhibited requests, FIG. 27. A cached request is one that causes data to be read or written in a cache. A cache inhibited request does not read or write data in a cache and it is assumed that a cache will invalidate a valid cache line if it issues a cache inhibited request to that line. Cache inhibited requests will generate coherent responses from the memory directory, i.e., they are snooped.

The four lines in each table entry list the following information based on the request and the INITIAL state of the cache line in the directory:

1. The memory response. This is the operation that the memory will generate based on the request and the INITIAL state of the line.
2. The NEXT state of the directory. This indicates the state transition in the directory caused by the request This is the final state of the directory after all activity initiated by the operation is complete.
3. The NEXT state of the cache which initiated the operation. This is the final state of the cache after all activity initiated by the operation is complete.
4. The NEXT state of all other caches in the system. This is the final state of the caches after all activity initiated by the operation is complete.

For transactions that cause a copyback command (CB_CMD or CB_INV_CMD) the state transition tables show the directory and cache state after the copyback command has been issued and received and cache state has been updated, but before the copyback reply has been generated.

If the directory detects one of the states marked as "Not Possible", the MC ASIC (82) will issue a fatal coherency error. The "No Change" entry in the table means that a cache line can be shared in some caches and invalid in others and the operation will not change that state.

The following legend defines abbreviations in the tables in FIGS. 26A, 26B and 27 (and elsewhere in this Specification).

RD S=Read Shared.
RD_S_RPLY=Read Shared Reply.
RD_IM=Read with intent to modify.
RD_INV_RPLY=Read invalidate command.
RD_S_RPLY=Read shared reply.
CI_RD=Cache inhibited read shared.
CB_CMD=Copyback (shared) command.
CI_WR=Cache inhibited write.
ACK=acknowledgment.
WB=Writeback.
UNDO_MOD=Undo Modified State.
UNDO_LK=Undo Lock State.
INV_CMD=Invalidate command.
CB_INV_CMD=Copyback invalidate command.
CI_RD_LK=Cache inhibited read request to lock.
CI_WR_UNLK=Cache inhibited write unlock.

Most coherency issues are easily handled by the directory issuing coherency commands like invalidates and copyback commands and by maintaining order between packets. However there are some special cases that require more attention.

One such area is stale packets. These occur in four main ways: unsolicited writebacks of data which cause stale copyback commands; multiple bus routes allowing memory responses to arrive ahead of older snoop commands which cause stale copyback replies; multiple requestors simultaneously attempting to modify the same cache line which cause stale IMs; and stale IMs combined with multiple bus routes which can result in stale INV_CMDs.

A cache which holds a modified copy of a cache line may choose to write it back to memory at any time to make room for new cache lines. This writeback will appear on the bus as a WB from the 88410 and as a CB_INV_RPLY from the GG Cache. If the directory sends the cache a copyback command while the cache is voluntarily doing a writeback, the writeback will pass the copyback command in transit. When the writeback arrives at the memory the directory uses it to satisfy its outstanding copyback request. When the copyback command arrives at the cache, it is snooped but does not cause a copyback since the cache has already given up its modified copy of that cache line. Once the writeback is generated the copyback command is considered stale, since it is no longer needed.

Stale copyback commands may appear at caches at any time. Normally they only cause an extra snoop. However if the target cache line has remained shared in any caches and the copyback command is a CB_INV_CMD, those caches will have to invalidate the line. A stale copyback command can even cause a stale copyback reply from a local requestor. All copyback commands are sent via the PIBus, even when targeted at the memory's own node. This is an ordering rule which prevents copyback command from arriving ahead of older invalidate commands which may have been sent to multiple nodes, and therefore were sent via the PiBus. Once a cache has done a writeback of a line, the directory is free to give it to other requesters. If the line is requested by a local requester, the memories' reply would be sent via the PixBus, allowing it to arrive at its target before the older stale copyback command which may still be in the PI queues. The new requester may even be given permission to modify the line.

Once the stale copyback command does arrive, the cache has no way of knowing that the command is stale and will have to snoop it. If the cache has only a shared copy, then an unnecessary invalidate may be done and the cache will have to request the line from memory again. If the cache has a modified copy, it will have to do the requested copyback. This is a stale copyback reply which the directory is not expecting to see. The directory handles stale copyback replies (sometimes called unexpected copyback replies) as though they were writebacks, with the exception that a CB_INV_RPLY does not leave any shared copies in any caches.

Stale copyback commands and stale copyback replies do not cause any coherency problems. The data is NOT stale and can be safely written to memory. There is a slight performance penalty because of wasted bus and snoop cycles and because they cause processors to writeback cache lines before they are done with them.

For stale IM squashing, if multiple caches have shared copies of the same cache line, more than one of them may request modified access to the line by issuing an IM packet. The directory honors whichever request it receives first. The first IM receives an INV_CMD response which will be snooped by all the caches which have shared copies of the line. However the other IM requests were issued before the INV_CMD arrived. The cache that got the modified status will take the INV_CMD as an acknowledgment because it contains its requestor ID. The other caches will snoop the INV_CMD, invalidate their cached copies, drop their outstanding IM request and issue a RD_IM request in its place. The outstanding IM requests are dropped because they are stale, since those cache's no longer have shared copies of the line.

Stale IMs can also be caused by the memory responding to a RD_IM with a RD_INV_RPLY. If other caches have IMs outstanding when the RD_INV_RPLY arrives for snooping, their IMs become stale and the cache invalidates and issues a RD_IM instead.

If the directory can tell an IM is stale it will not service it and will not issue a reply packet. Stale IMs are not a problem as long as all nodes can tell they are stale. Coherency errors will develop if stale IMs are serviced by the directory. Therefore stale IMs are squashed whenever they are recognized as stale. Squashing means that the IM is removed from the request stream (sometimes the IM is actually replaced with a NOP). The following subsections describe how stale IMs are detected and squashed at various places in the system.

In the CI queues, when the CI (124) snoops an INV_CMD that does not have its requester ID but does match the block address of an IM request in its Outstanding Request Register (ORR) (300), it will clear the ORR and will no longer expect a reply to that request. The CI puts the INV_CMD on the 88410 bus for snooping. The 88410 invalidates its shared entry and a RD_IM is issued in place of the IM. Clearing the ORR in this case is called squashing. The CI will also squash the IM if it snoops a RD_INV_RPLY that matches the IM's address. The CI (124) may issue a NOP when it squashes an IM that it is about to put onto the PixBus (88).

Stale IMs are also squashed in the PI (64) queues. If a RD_INV_RPLY or INV_CMD in the medium queue passes an IM to the same cache line in the low queue, the PI changes the IM packet to a NOP by altering the opcode stored in that queue entry. Invalidates in the PIX→PI medium queue squash IMs in the PI→PIX low queue. Invalidates in the PI→PIX medium queue squash IMs in the PIX→PI low queue. If the PI receives a RD_INV_RPLY or INV_CMD from the PIBus just before it drives an IM onto the PI bus, it issues a PIBus Resend to recall the IM. This will keep the IM at the head of the PIBus output queue longer so that the PI will have time to squash, if required. The PI does no address comparisons before issuing the Resend, so the need to squash is not guaranteed. If the PI did not Resend the IM, it might not have time to change the IM opcode to a NOP if a squash is needed.

Stale IMs are also squashed in the MC queues. RD_INV_RPLY or INV_CMD packets in the output queue squash IMs to the same cache line in the input queue. The IM opcode of a squashed IM is replaced with a NOP opcode. When the NOP reaches the head of the MC input queue, the packet is dequeued and discarded.

Stale IMs from remote requesters (those not on the same node as the targeted memory) never survive queue squashing. There is a straight path from the MC→PI→CI for the invalidate packet and the IMs follow the reverse of the same path. It is impossible for the invalidate and the IM not to pass each other, which will result in the IM being squashed. However stale IMs from local requesters (those on the same node as the targeted memory) will often survive queue squashing. This is because some invalidate packets are sent through the PI queues rather than directly to their local targets via the PixBus. A local IM request will always travel directly to the MC via the PixBus and can bypass an older invalidate packet in a PI queue without getting squashed. This means that the IM will arrive at the directory and the directory will attempt to process it. The CI can handle this case by issuing an UNDO_MOD (Undo Modify) when it received the INV_CMD.

In the present invention, the system would work without directory squashing, but it is still more efficient to squash IMs (Intent to Modify) as soon as possible.

ORB ASIC

The ORB ASIC is a functional element of the system according to the invention, which basically provides two functions: controlling arbitration for the motherboard bus structure (i.e. the PIXbus and its sub-busses); and controlling the BAXBAR switch bus transceiver. In the present illustrative embodiment, the ORB and BAXBAR are implemented in the same ASIC.

The ORB provides the arbitration services for all clients on the individual motherboards or node subsystem. The ORB also provides the control necessary to allow the BAXBAR switch, described hereinafter, to propagate transfers. The ORB is instrumental in guaranteeing forward progress and avoiding livelock/deadlock scenarios. This is accomplished by use of three levels of priority of requests, use of three levels of "busy" indications from potential targets, support of "deli-counter" ordering across all four PI arrays, use of windowed arbitration with a fairness algorithm within windows, and by means of configuration-time programmability of arbitration and grant timing. The ORB also provides ordering support for ensuring that CI_WR, CI_RD, CI_WR_UNLK, WR_THRU operations from a processor do not bypass invalidates caused by that same processor.

The windowed arbitration implemented by the ORB implies that all outstanding requests are captured simultaneously, and serviced to completion (if possible) prior to re-sampling later requests. There is an exception to the windowing of requests local to a motherboard. That exception is that although CI, GG, RI and PI requests are windowed, the MC request is not. The reason for this is to keep the MC output queue emptying. If the MC request was windowed, only one memory bus tenure would be allowed within a request window. The effect of this is to bottleneck memory references and to under-utilize DRAM bus bandwidth.

This occurrence of bottlenecking the outputs of memory is a result of the split transaction nature of the PIXBus. In a system that doesn't have split transaction system busses, all references by requesters to memory imply that the output of memory is immediately serviced—hence one memory transaction is retired for each requester's transaction.

In the present implementation according to the invention, there is a single bit state machine which tracks when a window is in progress. This bit also serves as a mux select to re-circulate the remaining windowed requesters into the requester register. This window bit is set upon detecting that there is an outstanding request needing service. It is reset if either all outstanding requests have been granted the system bus, or if none of the requests remaining in a current requester window register can be serviced because of the assertion of busy signals.

The ORB is effectively divided into a plurality of functional blocks, illustrated in FIG. 28, described hereinafter.

BB_RQ_REQUEST MODULE

This module collects all of the bus requests, and arranges them in "windows" to avoid starvation.

A new window is sampled when there are no outstanding requests in the previous cycle, or where there were requests in a grant cycle, but all were blocked from being granted because of busys or tickets that cannot be granted. No outstanding requests is obvious. What is less obvious is when all requesters are blocked by busys. In a traditional system with RETRY instead of queue full busys, that loosely correlates with all remaining requesters having gotten the bus, seen RETRY, and re-issued bus requests (honored in the next window).

There are also instances when a PI medium request cannot be honored because the ticket presented for that operation is next in sequence. This occurs when a PI has more than one outstanding medium request. Since only one medium request is serviced per window, that PI may hold a blocking ticket number until the next window is defined. This condition is reported from the BB_TI_TICKET module as TI_FINISHED_TICKETS.

Figure 29:
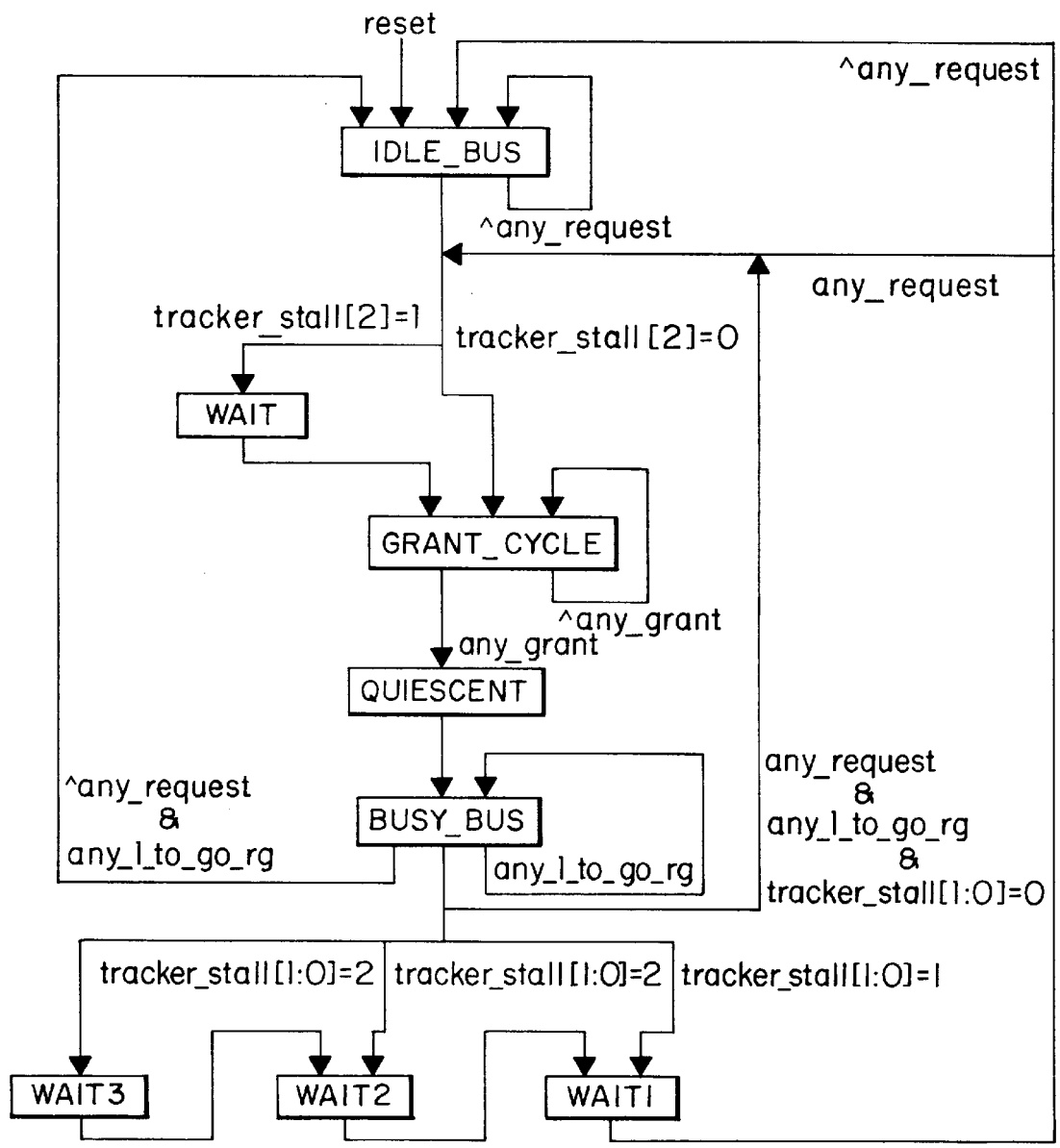
FIG. 29 is a state machine diagram for a TR_TRACKER state machine implemented in the ORB ASIC of FIG. 28.

The mechanism to determine when all requesters are blocked from being granted is detecting that there are no potential candidates for granting (unqualified grants) when a TRACKER state machine, illustrated in FIG. 29, is about to enter the GRANT state. This implies that there is at least one outstanding request and that no-one can be granted.

The feature of starting a new window when there are blocked requesters can be defeated. Normally it is undesirable to wait until all requesters have been granted before opening a new window for performance reasons, but it has been included as a debug tool (EMPTY_WINDOW scan bit). There is an additional debug feature that inhibits grants up to three cycles after defining the start of a new window (W_DELAY[1:0]).

This module contains registers that are set when there are requests being asserted from the other ASICs at the time that a new window is defined (i.e., "windowed requests" for all requesters). Each register remains asserted until a grant is issued for the respective request, at which time it is cleared.

Figure 28:
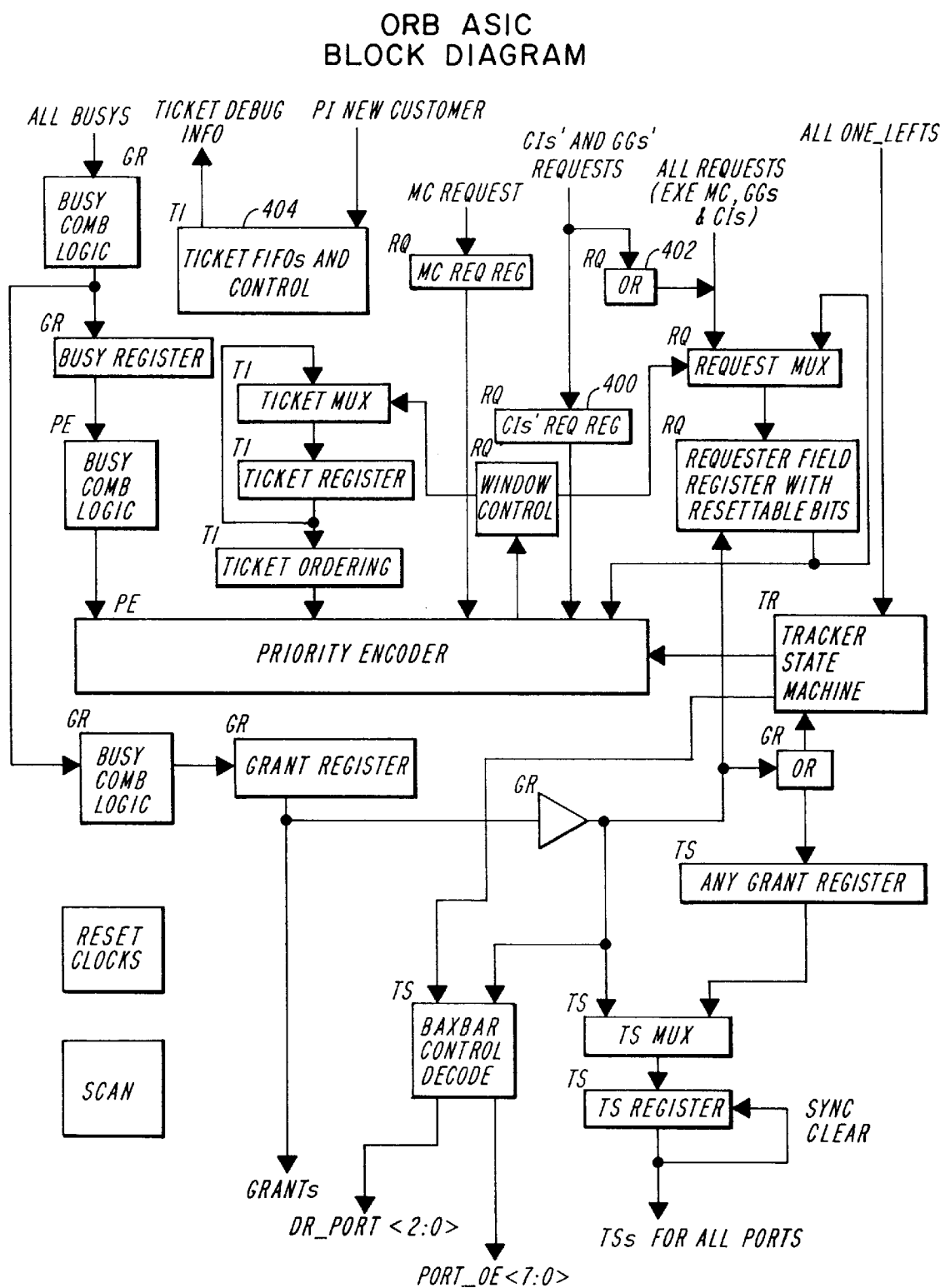
FIG. 28 is a block diagram of an ORB ASIC.

There is a single window for each CI and GG ASIC (400, FIG. 28). The CI and GG ASICs or arrays each present three requests: high, medium and low. They are allowed to change their requests or withdraw their requests, but are not allowed to assert more than one request line at a time. The request lines are or-ed together 402 to determine the setting of the respective request window. The request window is cleared if the ASIC withdraws it's request. The windowed request is then generated by combining the window bit with the registered high, medium and low registered request lines. If the UNWINDOW_HI option is asserted, the high request line registers for these ASICs are or-ed into the request window every cycle.

The MC and RI ASICs each have one window, since they only have one request, medium. Normally the MC is not included in the windowing scheme, but it has a degrade mode, i.e., MEM_INCLUDE, that allows the MC to be subject to the windowing. When MEM_INCLUDE is not asserted, the request window is updated continuously with the MC request line.

The PI ASICs have three window registers, one each for low, medium, and high requests. The high request windows allow continuous updating from the high request lines from the PI if the HIGH_INCLUDE option is cleared.

The BB_RQ_REQUEST module checks to make sure the CI and GG ASICs do not simultaneously issue multiple priority requests. The module also checks that the other ASICs do not withdraw their requests without being granted.
BB_TI_TICKET Module The BB_TI_TICKET module keeps track of the ordering of medium priority requests from PI requesters, and maintains ordering of cache inhibited low requests with respect to medium invalidate type requests. The BB_TI_TICKET module instantiates eight other modules to effect its operation, four being BB_LOW_FIFO, and four being BB_MED_FIFO, for use as ticket fifos.

Snoopable operations (like Invalidate Command, Copyback Invalidate Command, Copyback Command, Read Invalidate Reply) must arrive in the time sequence with which they were issued. All snoopable operations are MEDIUM priority, and issued by MC ASICs, however, not all medium priority operations are snoopable. Because there are four backpanel busses, and memory queues, it is possible that snoopable operations could reverse order because of different backpanel latencies.

This has been avoided by the following three mechanisms. First, a single source cannot issue a request that will result in a snoop condition until any similar outstanding operation has been replied to with an acknowledge. Second, the backpanel bus interface ASICs (PIs) do not accept a snoopable operation unless all PIs on all motherboards are able to accept the operation into their input queue. Third, each incoming snoopable (medium priority) request is ticketed with a time stamp, and the ORB only services their requests in the proper order. The TI_TICKET module deals with the assignment of tickets and the ordering of their grants.

There are 16 tickets, sufficient to handle the four medium queue entries in each of the four PI arrays or ASICs. The tickets are maintained in the ORB as a set of four fifos 404, one for each PI. A signal from each PI, PIx_NEW_CUSTOMER_N, announces the arrival of a medium priority operation at the backpanel. The fifo is then loaded with an incremented value of the last ticket to be assigned. If multiple PIs assert PIx_NEW_CUSTOMER_N simultaneously, they will each be assigned the same ticket. Tickets are four bits in length and wrap. The fifos are designed to start empty on WARM_RST_N. The input is the new ticket value to be assigned, the push is the PIx_NEW_CUSTOMER_N pin coming from the PI, and the pop is a buffered version of the grant indication sent to the PI to service the earliest medium request. The output is the oldest ticket captured in the fifo. Note that overflow and underflow detection is provided.

Since requests are windowed, there is a condition which occurs in which one PI could have obtained two or more tickets, the additional tickets having a lower value than other PIs'tickets within the same request window. In that event, since only one ticket can be retired within the window, when a PI which holds a ticket with the oldest value does not have a valid windowed request outstanding, no more medium PI grants will be issued until the next window is established.

The BB_TI_TICKET logic is responsible for determining the oldest outstanding windowed PI request and informing the BB_PE_PRIORITY_ENCODER module. This is accomplished by keeping track of the ticket number for the last medium PI request to be granted.

Compares are made between outstanding requesters' ticket numbers and the last ticket to be granted. A match indicates that those outstanding requesters must be serviced prior to other outstanding windowed requests. Compares also are made against an incremented value of the last ticket to be granted. If there is no match for the last ticket to be granted, but there is a match between a windowed request ticket and the incremented value, then that requester must be serviced prior to other outstanding windowed requests.

Out-of-sequence ticket detection logic is provided. This is identified when there are one or more PI medium request lines asserted, and none of their tickets match either the last ticket granted or the incremented value of the last ticket granted.
BB_PE_PRIORITY_ENCODER The BB_PE_PRIORITY_ENCODER module selects one grant candidate from each of three categories, high, medium, and low. It takes as input device busy information from the BB_GR_GRANT module, ordering information from the BB_TI_TICKET module, and windowed requests from the BB_RQ_REQUEST module.

The BB_PE_PRIORITY_ENCODER module takes as inputs; the set of windowed requesters from the BB_R_REQUEST module, various combinations of registered BUSY conditions from the BB_GR_GRANT module, medium PI request priority TI_PIx_OLDEST information from the BB_TI_TICKET module and TR_TRACKER_GRANT_NEXT from the BB_TR_TRACKER module. All of this information is condensed, and the requests prioritized within one cycle. The result is the generation of up to three grant candidates, one for high priority grants, one for medium priority, and one for low priority. These are referred to as the "unqualified" grants, the signals that the BB_PE_PRIORITY_ENCODER module outputs. This unqualified grant is then shipped to the BB_GR_GRANT module.

Competition within a window for high priority unqualified grant (PE_U_GNT_xxx_HI) is implemented with a wire-or arbitration net, which results in ultimate selection of a single requester to receive the grant. Each requester is assigned a fixed three bit encoding and this encoding is xored with the shuffle code to generate an ID. Each requesting device drives it's IDs onto an arbitration net, i.e., or'ing net and near the end of the cycle reads it off of the net. What is read is compared with what it drove and, if the ID read matches the ID driven, then that requester will become the unqualified grant candidate.

For the high priority arbitration net, the initial assignment is xored with the shuffle code such that bit 2 of the assignment is xored with bit 2, bit 1 is xored with bit 1, and bit 0 is xored with bit 0.

Competition within a window for medium priority unqualified grant (PE_U_GNT_xxx_MED) also is implemented with a wire-or arbitration net. Since there are ten medium requesters, a three bit arbitration net is not sufficient. The medium requesters will be put into two groupings. The MC and RI requests will be treated as one request group, and the eight other requesters will be treated as another request group.

The MC has priority over the RI within the MC/RI request group and the MC/RI request group normally will have priority over the other group, the CI/GG/PI request group. In the case of concurrent requests from the two groups that are potential candidates for unqualified grant, the tie will be broken by examining a ping-pong toggle. The toggle flips every time there is contention between the two groups.

Each requester in the CI/GG/PI request group is assigned a fixed three bit encoding. This encoding is xored with the shuffle code to generate an ID. Each CI or GG ASIC with a windowed request, not blocked by busys, drives it's IDs onto an arbitration net (or'ing net) and near the end of the cycle reads it off of the net. What is read is compared with what it drove and, if the ID read matches the ID driven, then that requester will become the unqualified grant candidate.

The PIs use the TI_PIx_OLDEST to determine if they drive the medium arbitration net. Multiple PIs can have their TI_PIx_OLDEST asserted. Each PI with TI_PIx_OLDEST asserted, that is not blocked by busys, drives it's IDs onto an arbitration net (or'ing net) and near the end of the cycle reads it off of the net. What is read is compared with what it drove and, if the ID read matches the ID driven, then that requester will become the unqualified grant candidate.

For the medium priority arbitration net, the initial assignment is xored with the shuffle code such that bit 2 of the assignment is xored with bit 0, bit 1 is xored with bit 2, and bit 0 is xored with bit 1. This provides a different arbitration priority pattern from high and low requests within one window.

Competition within a window for low priority unqualified grant (PE_U_GNT_xxx_LO) is implemented with a wire-or arbitration net. Each requester is assigned a fixed three bit encoding, and this encoding is xored with the shuffle code to generate an ID. Each requesting device drives it's IDs onto an arbitration net (or'ing net) and near the end of the cycle reads it off of the net. What is read is compared with what it drove and, if the ID read matches the ID driven, then that requester will become the unqualified grant candidate.

For the low priority arbitration net, the initial assignment is xored with the shuffle code such that bit 2 of the assignment is xored with bit 0, bit 1 is xored with bit 1, and bit 0 is xored with bit 2. This provides a difference in low request prioritization from either high or medium request priorities within one window.

BB_GR_GRANT

The BB_GR_GRANT module takes the three candidates from the BB_PE_PRIORITY_ENCODER module, does a last-minute check of appropriate device busy signals, and issues a grant to one of them as specified by the BB_PE_PRIORITY_ENCODER module.

BB_TR_TRACKER MODULE

The BB_TR_TRACKER module takes the grant information from the BB_GR_GRANT and takes a "ONE_TO_GO" signal from the granted device. It determines when the bus transfer has completed, and instructs BB_GR_GRANT module when the next grant can be issued.

The BB_TR_TRACKER module contains a state machine, illustrated in FIG. 29, that tracks the progress of a bus master through the transaction. RESET places the state machine in the IDLE state. The state machine is kicked off by a registered valid request, and moves from the IDLE cycle to the GRANT cycle. If the grant is inhibited by the assertion of a BUSY, the state machine will remain in the GRANT state.

When the bus master is granted, the state machine moves from the GRANT state to the QUIESCENT state. This state is visited for one cycle only. The state machine is then placed in the BUS_BUSY state. If the appropriate ONE_TO_GO has not been asserted, the state machine will remain in the BUS_BUSY state. When it is asserted, the state machine will move to either the GRANT state or the IDLE state depending on the existence of additional serviceable requests.

The TR_TRACKER module contains the ONE_TO_GO registers for all requesters. ONE_TO_GO signals are registered first, then are muxed to select only the PROPER_ONE_TO_GO for the state machine. Pre-registered ONE_TO_GO signals are also available from this module in the form of EARLY_ONE_TO_GO, used by the BB_CONTROL module to initiate the assertion of PORT_OE. The mux selects are determined by the selection of the bus requester to grant. The mux selects originate in the GR_GRANT module.

The state machine generates an ok-to-grant signal which the GR_GRANT module uses. This signal is TR_TRACKER_GRANT_NEXT. This signal is asserted either when the state machine is (i) in IDLE and someone requests, (ii) in GRANT when the grant has been inhibited, or (iii) in BUS_BUSY when the transfer is ending and there are more outstanding, and there are no debug features inhibiting the grant. The state machine include a stall feature that allows partial or full serialization of the arbitration portion of transfers. To accomplish this, there is a three bit scan loadable configuration register. The contents of this register cause the state machine to wait a number of cycles before allowing the next grant. In addition, there are hooks to inhibit further grants. This is referred to as "QUIESCE". It is available pre-registered by the ORB.

TS_TRANS_START Module

The BB_TS_TRANS_START module takes the grant information from BB_GR_GRANT and issues a Transaction Start (TS) first on the bus of the granted device, then on all the requesters on other motherboard busses.

The TS_TRANS_START module generates the TS signals and distributes them to the bus clients. TS asserted indicates to a client that the accompanying header transfer on the data portion of the bus is the start of a transfer. The first cycle after a GRANT is a quiescent cycle, the cycle in which the TS will be driven on that bus. This allows other clients that reside on that particular bus to recognize the start of the transfer. The second cycle after GRANT is the cycle before the start of the transfer is broadcast to other motherboard local busses through the register stage of the BAXBAR. TS will be driven on all the other busses (but not on the requester's bus) during this cycle.

The TS_TRANS_START module also generates the mux selects necessary to identify the PROPER_ONE_TO_GO signal for the TR_TRACKER state machine for use in identifying the end of a transfer.

BC_BAXBAR_CTL Module

The BB_BC_BAXBAR_CTL module takes the grant information from BB_GR_GRANT and instructs the BAXBAR arrays as to which port the master device is on and which ports to drive for each cycle in the transfer.

The BC_BAXBAR_CTL module generates the BAXBAR control for transfers. These control lines comprise a three bit encoded requester drive port (DR_PORT[2:0] and eight unarily encoded BAXBAR port output enables (PORT_OE[7:0], and a single control line XFER_ENB_N. The XFER_ENB_N signal indicates the pending end of a transfer and is used by the BAXBAR to determine when to check the source bus for good parity.

The requester drive port, DR_PORT[2:0], is driven to the BAXBAR during the quiescent cycle following a grant, and every consecutive cycle for the duration of the requesters bus transfer. The PORT_OE[7:0] is driven to the BAXBAR during the quiescent cycle following a grant, and will de-assert one cycle before the end of the transfer on the requester's bus. This allows the BB to first register the PORT_OE, and DR_PORT In addition. For non-memory requester transfers, the EDAC ports (bits 3,2) will have their output enables extended for one cycle if the transfer is a partial write.

Other modules used by the ORB include::

The BB_Fl_FATAL_IN module which collects fatal error indicators from all motherboard asics and the microprocessor, and informs half of the motherboard ASICs that a fatal error has occurred.

The BB_FX_FATAL_IN_EXT module uses the result of BB_Fl_FATAL_IN to inform the other half of the motherboard ASICs that a fatal error has occurred.

The outputs of the BB_CONTROL_SIGNALS module are used to control which pins are inputs and which pins are outputs. These assignments are static when the ASIC is being used as an ORB.

The BB_ERROR module collects internally detected error conditions from the other modules, and asserts the FATAL_OUT_N signal, which then goes to the BB_Fl_FATAL_IN module.

BAXBAR Register Switch

Figure 30:
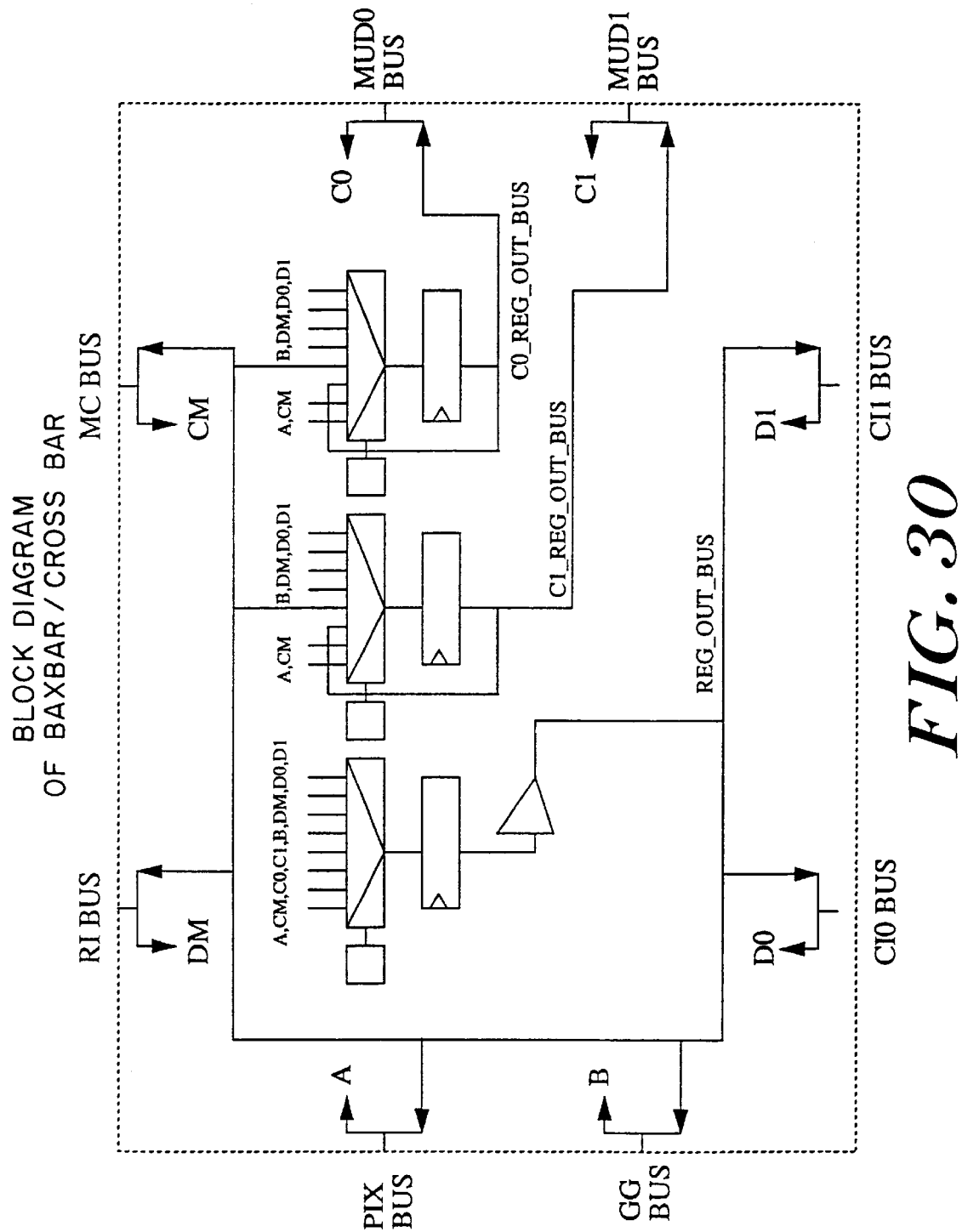
FIG. 30 is a block diagram of a BaxBar crossbar switch.

The Baxbar is a registered cross-bar switch which serves as the interconnect path for the Sierra board-level busses. The Baxbar is implemented with four ASIC slices in conjunction with the ORB ASIC described hereinbefore. Each ASIC slice is a 240 pin LSI 300D CMOS array. It will be capable of operation at clock frequencies up to 50 MHz. A functional block diagram of the BaxBar switch is illustrated in FIG. 30.

The Baxbar registered crossbar switch supports six 19 bit ports and two 18 bit ports. The switch control is comprised of a 3 bit source port select (DR_PORT) and an eight bit output enable control (PORT_OE). The tables of FIGS. 31A, 31B and 31C illustrate crossbar source selection, PORT_OE assignments, and port to bus mapping of the BaxBar crossbar switch, respectively.

The six 19 bit ports are referred to as A, B, CM, DM, D0, D1. The two 18 bit ports are referred to as C0, C1.

There are two main modes of operation referred to as non-generic mode and generic mode. These modes control the way ports C0 and C1 behave. In non-generic mode, ports C0 and C1 are given extra control to connect to EDACs. In generic mode, this control is disabled giving 7 ports that behave identically. The eighth port may be used in this mode, though it will experience an extra delay in some cases.

Parity is checked on the lower 18 bits of the internal bus that feeds output ports A, B, CM, DM, D0, D1. Any of the eight possible sources can potentially be muxed onto this bus. The 18 bits is made up of 2 parity bits associated with two 8 bit busses. On a parity error (exclusive OR of 9 bits=1), the error is latched, qualified with a parity enable and sent to the module BB_ERROR.

Four 16×18 RAMS are provided in the Baxbar to log information about the state of the Baxbar during the last 32 cycles.

The two 18 bit ports are connected to EDACs and port CM is connected to the Memory Controller. As outputs, the source data (except last beat) that feeds out of the C0, C1 ports is held for two cycles to provide the EDACs with additional hold time. during the last beat, the data is held for one and a half cycles.

Note that one of the EDACs outputs the even data beats, the other the odd beats. This is controlled by sample ADDR_3_IN during the cycle where the source is presenting the first data beat. If this signal is low, C0 outputs the even data beats and C1 the odd beats.

GG ASIC

Figure 32:
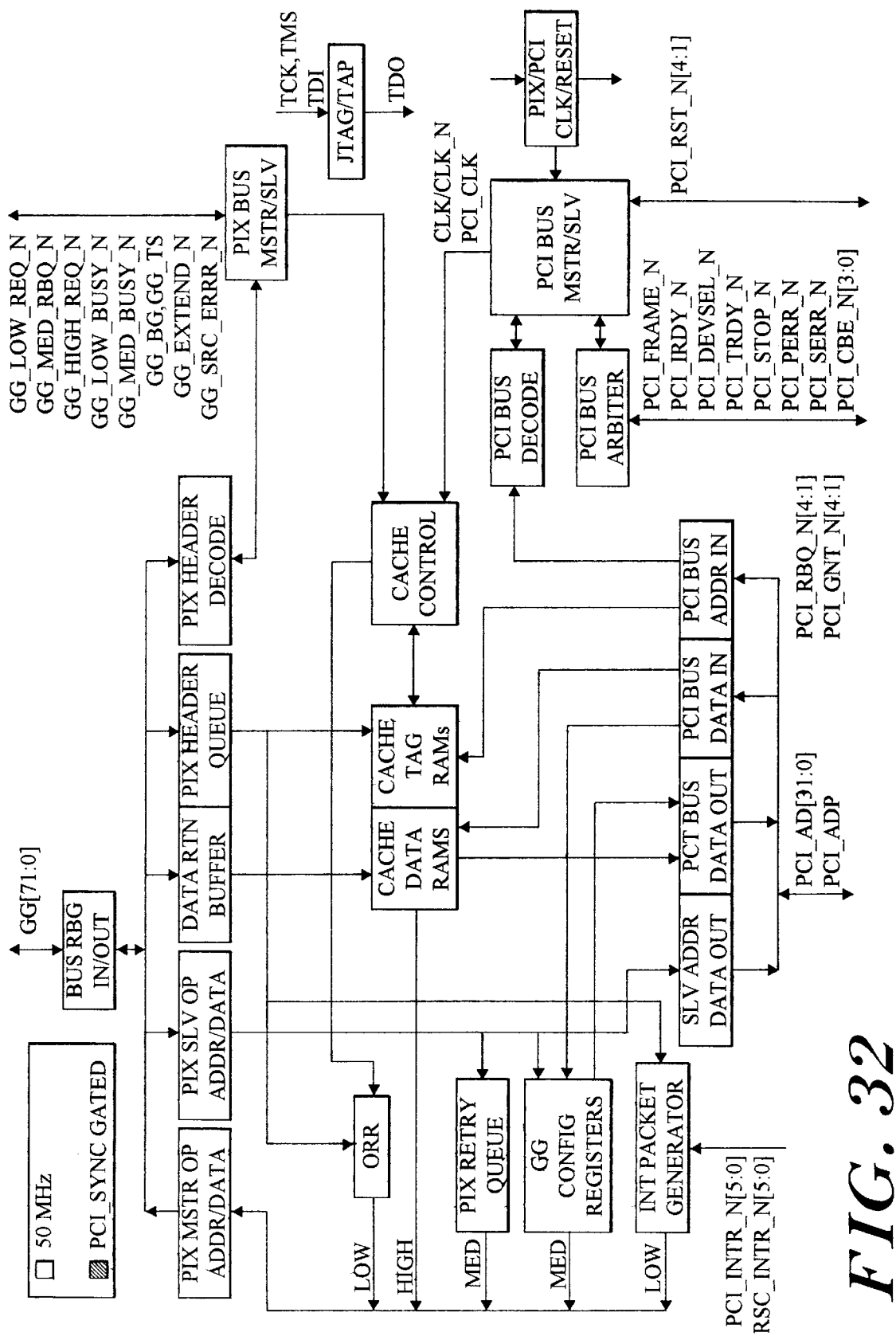
FIG. 32 is a block diagram of a GG ASIC.

The GG ASIC (78) provides an interface between the 50 MHz PIX (76) bus and a 25 MHz PCI bus (79*a,b*). Each of the two PCI busses is connected to an integrated Small Computer System Interfaces (SCSI) interface and to a single PCI expansion board. One of the two PCI busses also is connected to an integrated 10 Mb Local Area Network (LAN) interface 286. The GG ASIC also sources the 25 MHz clocks for the PCI bus. A block diagram of the GG ASIC is set forth in FIG. 32.

The GG ASIC (78) acts as a PCI Bus master on behalf of JP initiated transfers on the PCI Bus. All transfers between a JP and an external PCI Bus device are cache inhibited. It also acts as a PCI Bus slave on behalf of an external PCI Bus master initiating transfers to system memory. A small cache is provided in the ASIC (78) and is used for DMA transfers between the external PCI Bus master and system memory (86). The GG ASIC cache supports exclusive modified cache line ownership as well as shared ownership. A cache line is eight beats long.

Address transactions coming from the 64-bit multiplexed PIX (76) bus into the GG ASIC (78) are registered in the Slave OP, Snoop or ADDR/Header buffers depending on the command decode. The ADDR/Header addresses are compared against the outgoing request register to identify packet replies to I/O cache line fills.

The Slave Op addresses are used to access PCI configuration, PCI I/O and internal GG ASIC configuration registers. The Slave Op addresses are decoded by an address decode unit that generates the four PCI Bus ID and multiple internal GG register selects. Only one data beat is associated with a cache inhibited Slave operation, and the GG ASIC makes the restriction that only the least significant DWORD [bits 63:32] contains valid data.

The Snoop Addresses are used to invalidate or copyback a cache line and are looked up in the I/O cache tag ram. If the cache line has been modified, the GG ASIC will copyback the cache line back to memory with a CB_INV_RPLY. If a cache line is marked shared in the cache, its status will be changed to invalid. Because the tags are a shared resource, i.e. support PCI and PIX bus slave accesses, a busy mechanism is implemented to handle tag access collisions.

Addresses from the PCI Bus enter the GG ASIC (78) on the 32-bit PCI Bus multiplexed address and data lines and each address is compared against the PCI Bus memory range registers. For a PCI Bus master to system memory transfers (DMA), the address is passed to the cache. A cache hit is followed by a PCI Bus transfer without any PIX bus activity. A cache miss forces the GG ASIC (78) to initiate the appropriate PIX bus activity to load the cache with the requested data while the PCI device is retried. This may include initiating a writeback, with a CB_INV_RPLY, prior to filling the cache line. The capability to retry on cache misses is programmable. This allows flexibility when dealing with PCI bridges which may not come back with the same request when retried.

Data from the 64-bit PIX bus enters the GG ASIC (78) through the Data Return buffer that interfaces with the GG ASIC internal cache. Data is then moved from the cache to the PCI Bus as requested by the PCI interface. There are also two queues used by the GG ASIC to store incoming medium packets, i.e., snoops and data replies, and outgoing retries. Incoming medium packets are stored in a four deep queue to be processed by the cache. This includes snoops, resulting in an invalidate or copyback, and data return packets for cache line fills. A medium busy signal is asserted to the PIX bus arbiter when this queue has three or more entries in it, to prevent an overflow condition.

The retry queue is three entries deep and holds retry packets for low priority operations that can not be completed by the GG ASIC, as the GG ASIC performs one low priority operation at a time. When this queue is full, i.e. all three entries valid, the GG ASIC will assert a low busy signal to the PIX bus arbiter, to prevent more low priority packets from arriving.

RI ASIC

Each motherboard (52) contains all the local resources that are required of a system (50). The resource logic on the motherboard (52) includes a Microcontroller (102), state-recording EEPROMs (Electrically Erasable Programmable Read Only Memory, not shown), NOVRAM (Non-Volatile RAM), and SCAN interface logic (104). The resource logic is duplicated on each motherboard (52), but a working system (50) only ever uses the resources section of the board in either slot0 or slot1 of the backplane system (54) as system wide Global Resources. An RI (Resources Interface) ASIC (74) provides the interface between the PIXbus (72) and the devices within the Resources section on the motherboard (52).

Figure 33:
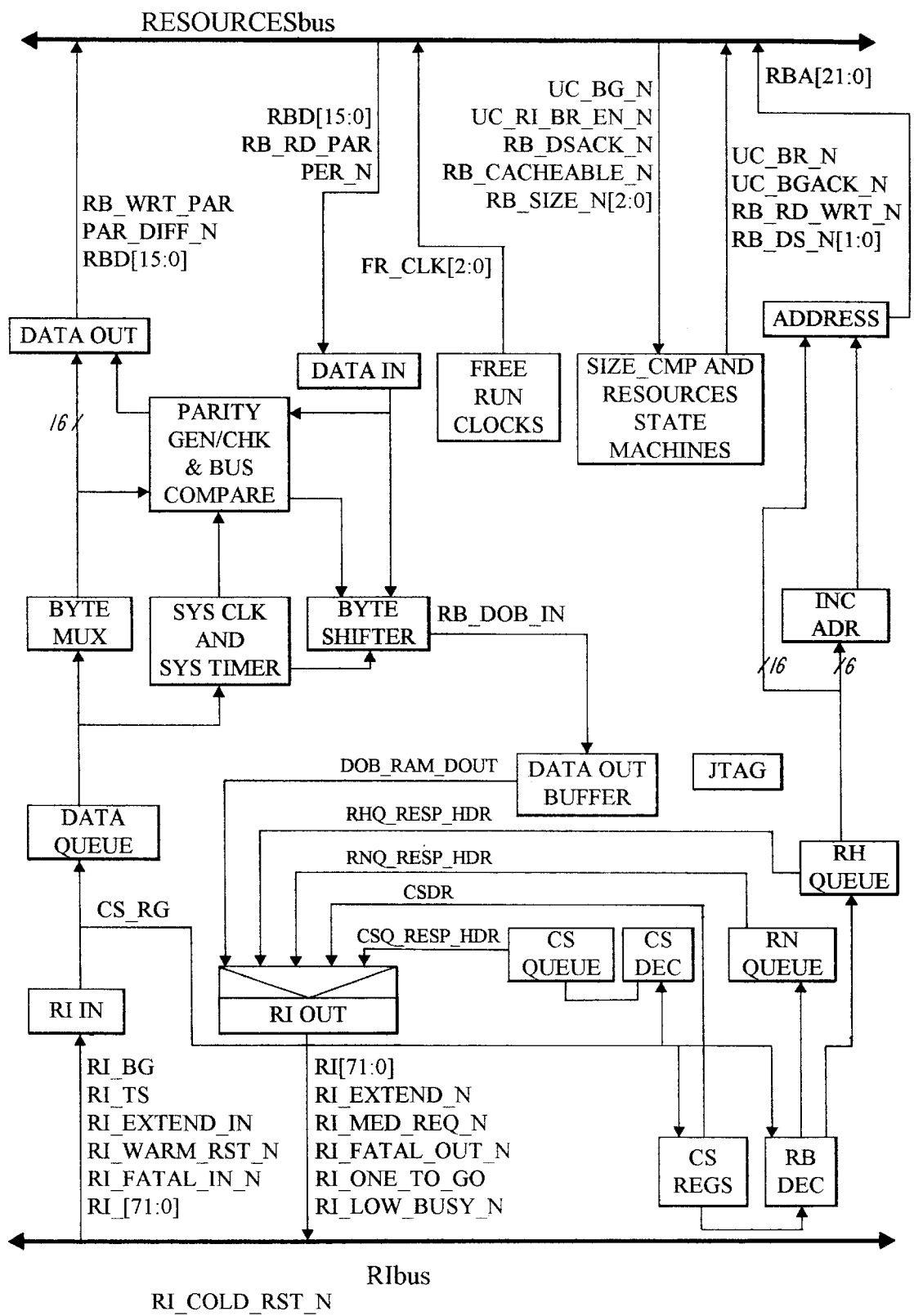
FIG. 33 is a block diagram of an RI ASIC.

The RI ASIC or array provides an interface between the PIXbus and the Resources Bus. The resources bus provides the JPs access, through the RI portion of the PIX bus (RI bus), to local resources required by the system, including the test bus controller and the diagnostic bus interface. The RI ASIC acts as a Resources Bus master on behalf of JP initiated transfers on the Resources Bus. The RI ASIC is not a slave on the Resources Bus and as such will not initiate a read or write request on the PIXbus. Rather it services three types of operations; CI_RD_, CL_WR and RD_S. A RD_S request will be honored only if the requested resource device is marked as encacheable. The EEPROM on the Resources Bus is encacheable, allowing faster booting of the system. The RI responds to the upper 4 Megabytes of memory, assuming its global bit is set, and requests to it's control space. A functional block diagram of the RI ASIC is shown in FIG. 33.

Figure 34:
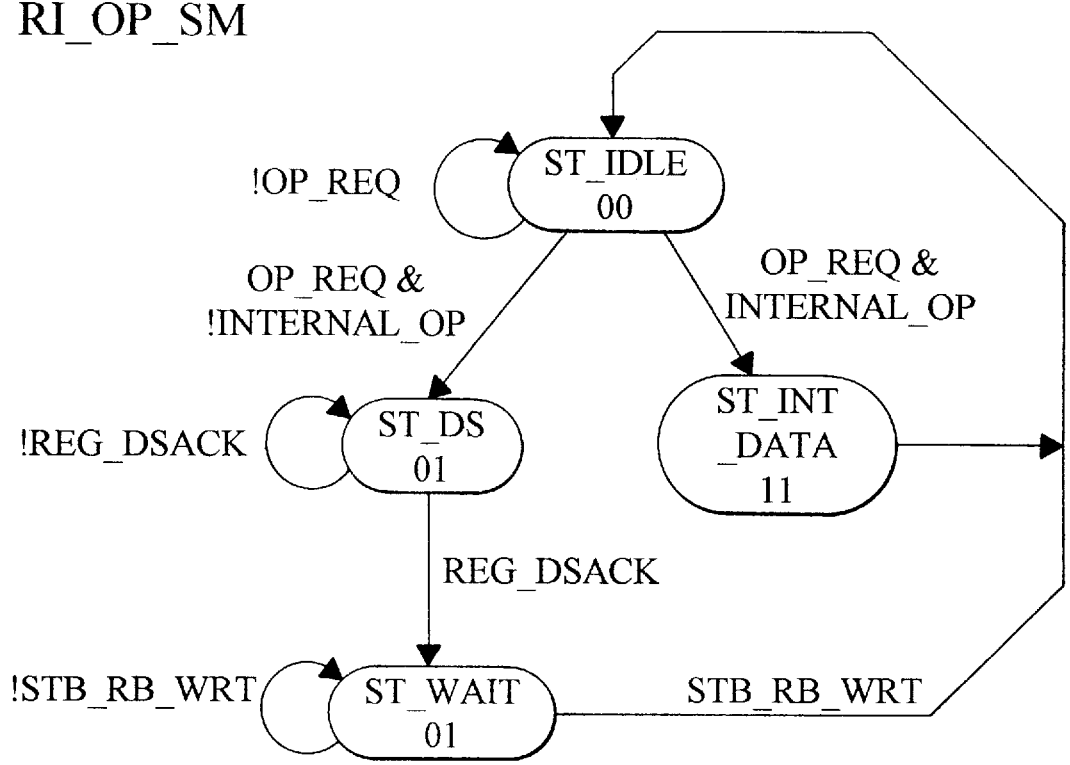
FIGS. 34–36 are state machines for resources operation request, resource bus request and resources looping, respectively, implemented in the RI ASIC of FIG. 33.
Figure 35:
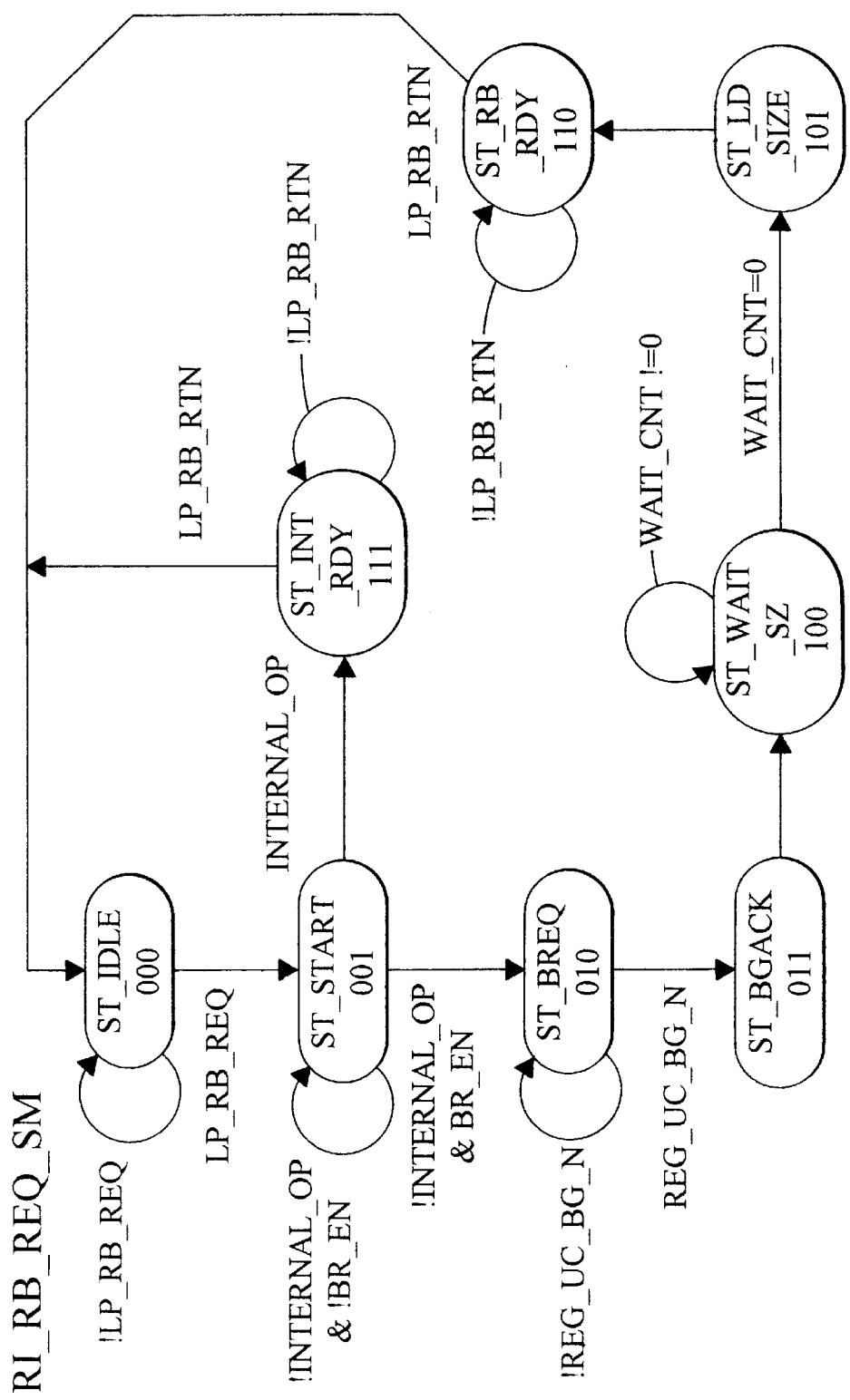
Figure 36:
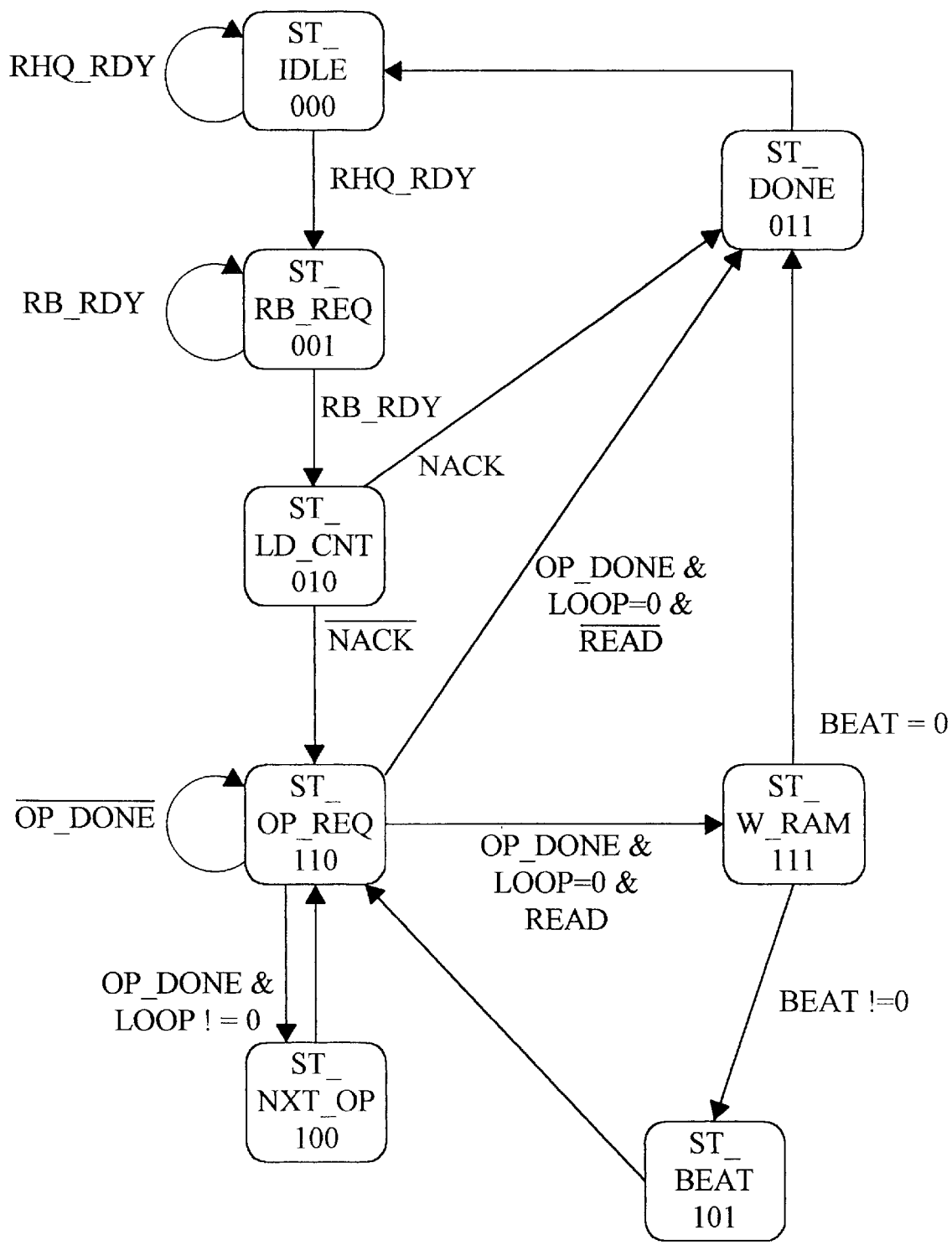

The RIbus state machines, illustrated in FIGS. 34, 35 and 36, control the interface to the RIbus. The RIbus master will assert a bus request to the motherboard arbiter and, when, granted, drive the appropriate RIbus control, header and data to access the resources section.

The Microcontroller (102) in the resources section is used to perform low-level early power-up diagnostics of the system (50) prior to de-asserting RESET to the processors. It is also the controller/engine used for all scan operations, as described in the referenced application. Generally, scan is used to configure the ASICs during power up, communicate with the power supplies and blowers, communicate with the various ID PROMs within the system, and to dump failure information after a hardware fatal error. If a processor needs to do a scan operation, it makes a request to the microcontroller (102) which can then perform the required operation.

The Resources sections also provides a DUART (Dual Asynchronous Universal Receiver and Transmitter, not shown) for implementing 3 UART ports for the system (50). A fourth UART port is also used as part of a loopback circuit to allow a processor to monitor what is being driven on the main system console (not shown).

The resources section also provides the logic to do JTAG based scan of all the ASICs in the system (50), power supplies, blowers, SEEPROM and SYSID PROM, in accordance with the IEEE 1149.1 standard. The logic is in place to allow the system to be scanned either during Manufacturing Test using an external tester (e.g.ASSET) or during normal operation/power-up using the microcontroller on any motherboard in the system. This logic allows simple boundary scan testing to be used as part of the power-up system testing to detect and isolate possible faulty components.

Additionally, MACH electrically erasable, programmable devices on the resource bus can be programmed using JTAG from an external connector. Also, the microcontroller can be used with an external connector to program the EEPROMs on the resource bus. This allows manufacturing to assemble the boards with blank MACHs and EEPROMs and then "burn" them as part of the test procedure, rather than stocking "burned" versions of the parts to be installed during assembly. This "in circuit programmability" feature also makes updates for ECO activity as simple as plugging in the programming connector and re-programming the parts, rather than removing the old part and installing a new part in its place.

DAUGHTERBOARD ASICs

In addition to the various ASICs and functional elements on the motherboard, the daughterboard includes ASICs as well, to provide and control an interface between the Motorola 88410 cache controller bus (126, 128, 130, FIG. 3) and the Daughterboard bus (88) (Cibus), and to control the third level cache resident on the daughterboard.

CI ASIC

Figure 37:
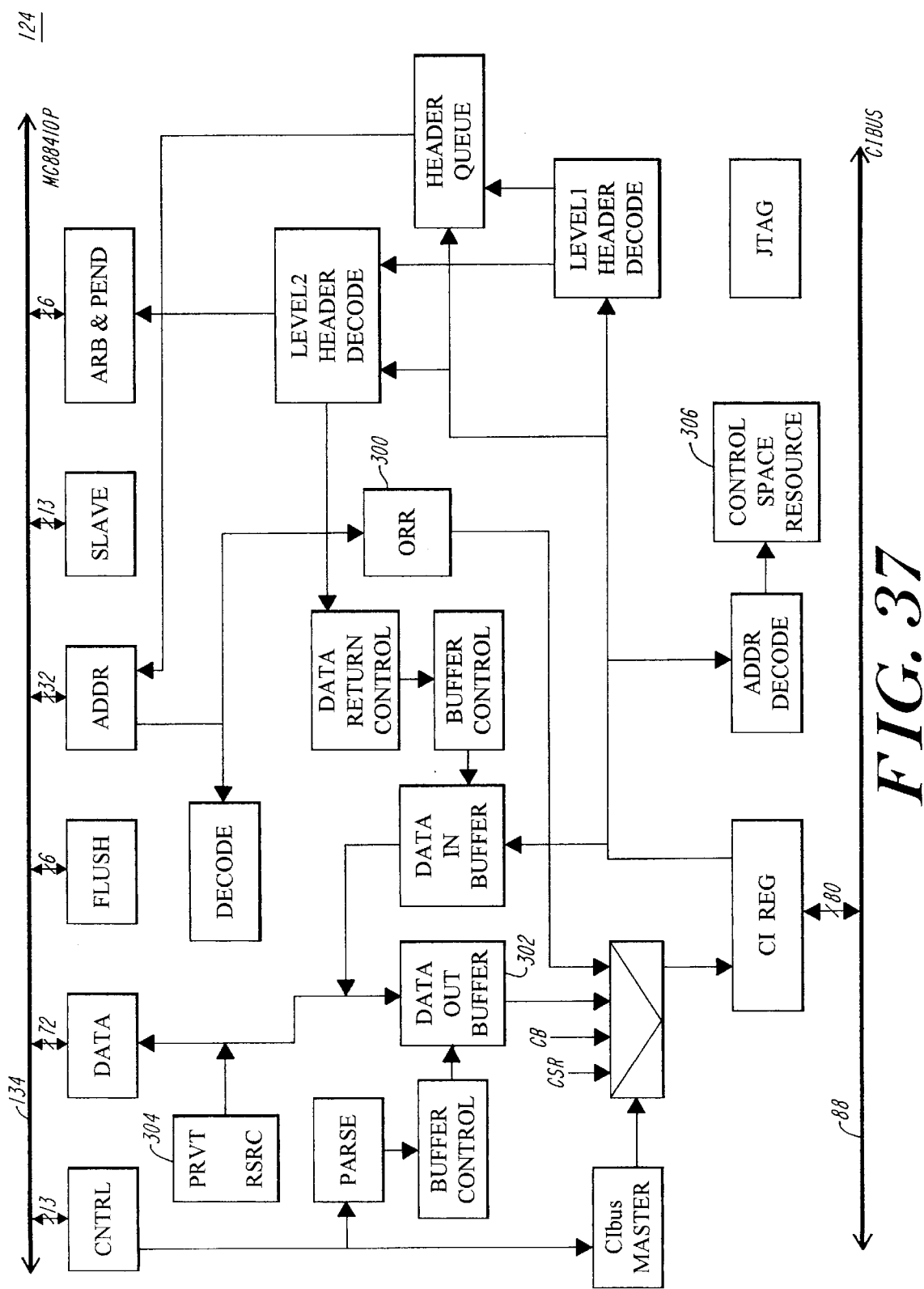
FIG. 37 is a block diagram of a CI ASIC.

The CI ASIC (124) provides an interface between the Motorola 88410 cache controller bus (126, 128, 130 FIG. 3) and the Daughterboard bus (88) (Cibus). The CI ASIC (124) provides support for two MC88410s cache controllers (112) The CI ASIC (124) controls the MC88410 address (128) and data (126) bus arbitration and provides system status for the MC88410 cache controllers (112). A block diagram of the CI ASIC is provided in FIG. 37.

The MC88410 address bus (126) and the lower 32 bits of the data bus (128) are multiplexed together, before interfacing to the CI ASIC (124). This is done in order to decrease the number of pins needed, so that the CI ASIC could fit into a 304 mquad package. Four 16-bit transceivers (136) are used to multiplex the address and data bus, creating a 32-bit address/data bus (134). Two transceivers for the address path (136b) and two transceivers for the data path (136a). Two output enables, and two direction signals are provided by the CI to control these transceivers (not shown).

The CI ASIC (124) accepts all addresses driven on the MC88410 address bus (128) by the MC88410s (112). These transactions are referred to as initial transactions. The CI ASIC (124) decodes the address to determine if a Cibus tenure is required. Transactions addressed to CI ASIC (124) internal registers are referred to as private resources and are serviced immediately. Transactions that are shared reads may be serviced by the TLC memory (116) if the address tag is valid. The TLC_HIT (Third Level Cache Hit) signal will indicate if the address is located in the TLC (116), and the transaction is serviced immediately. As soon as the MC88410 (112) is granted tenure, the CI ASIC (124) requests the Cibus. If the transaction is serviced by private resources or the TLC, then the Cibus transaction is aborted and a NOP command is issued onto the Cibus.

The CI ASIC (124) uses the MC88410 transaction attributes to parse the opcode used for the CI ASIC (124) transaction. The address, node id, and opcode are formed into a header. Parity is generated, and the header is sourced onto the Cibus (88), once a bus grant is received. Addresses that require Cibus tenure are stored in an outstanding request register (ORR) (300) FIG. 37. The CI ASIC (124) provides three ORRs per MC88410: ORR, CIRD_ORR (CI Read Outstanding Request Register), and a CIWR_ORR (CI Write Outstanding Request Register) but each MC88410 can have only one outstanding request.

If the transaction is a write, then the data is loaded into the data output buffer (DOB) (302). If the Clbus is granted immediately then the data is streamed directly to the CI ASIC bus (88). If the grant is delayed or the transaction needs to be resent then the data is sourced from the DOB (302). The CI ASIC (124) will check parity on all data it receives from the secondary cache SRAMs (114). At the end of the MC88410 transaction, with the address safely loaded into the ORR (300), the MC88410 bus tenure is terminated with a transaction retry. The MC88410 (112) is then pended until the CI ASIC (124) receives notification that the operation can be completed, i.e., read data is returned from memory or an acknowledgement that an invalidate has taken place. Pending the MC88410 (112) means that it is not granted the MC88410 bus (126, 128). This protocol leaves the MC88410 (112) and MC88410 bus (126, 128) in a state where it is able to snoop Cibus traffic.

The CI ASIC (124) accepts all addresses (headers) from the CIbus (88). The opcode and address in the Cibus packet are compared to the address and opcode in each ORR (300). The CI ASIC (124) determines what action, if any, is necessary on the MC88410 bus (126, 128) from the result of the ORR comparisons. MC88410 bus actions include: data return (reads), data bus completion (writes), and broadcast snoops.

Transactions that involve data being returned or writes being acknowledged are referred to as data return transactions. The MC88410 which was pended is granted the bus. If data is being returned then the data is sourced to secondary SRAMs (114), otherwise the transaction is simply acknowledged with the assertion of S_TA_N (Transaction Acknowledge). All data returns are snooped by the other MC88410 (112), and the transaction is not allowed to finish until snooping is finished.

All locked operations begin with an initial cache-inhibited read. When the response arrives the data is transferred to the MC88410 SRAMs (114). Upon completion of the transaction the bus is locked until the MC88410 returns with an cache-inhibited write. The transaction is immediately acknowledged, in order to allow snooping. However the MC88410 is pended until the acknowledge response arrives. This response is dropped and the next grant for that MC88410 will be for an initial transaction.

If an error occurred or a NACK was received by the CI ASIC (124) then the transaction is terminated by the assertion of S_TEA_N (Transaction Error Acknowledge).

The CI ASIC (124) will generate the flush control lines (130) to the MC88410s (112). These will be determined from decode addresses received from the MC88410s (112). The CI ASIC (124) will also generate interrupt and NMI (Non-Maskable Interrupt) signals to the 88110 processors (110), determined from decoded addresses from the Clbus (88). Other local resources provided by the CI ASIC (124) chip include interrupt enable and status registers and programmable interval timers (PIT).

The CI ASIC (124) has a set of private resource registers (304) that are accessible by the local processors (110). These include the interrupt registers, JPIST and JPIEN, the timer registers PIT and PIT_SC, the flush and invalidate registers, FLUSH_PAGE, FLUSH_ALL, and INVALIDATE_ALL, the MC88410 diagnostic registers, SET_DIAG and CLR_DIAG, and a configuration register which is a duplicate of the one located on the TLCC, TLC_CI_SC.

The CI ASIC (124) has a set of control space registers (306) used to monitor system actively, control configurability, control interrupts, and control error masking and forcing. The CI ASIC (124) has a set of diagnostic registers visible to the scan controller (not shown). Important state is shadow registered. The CI ASIC (124) has boundary (JTAG) scan and an internal scan interface visible to the scan controller (not shown).

TLCC ASIC

Figure 38:
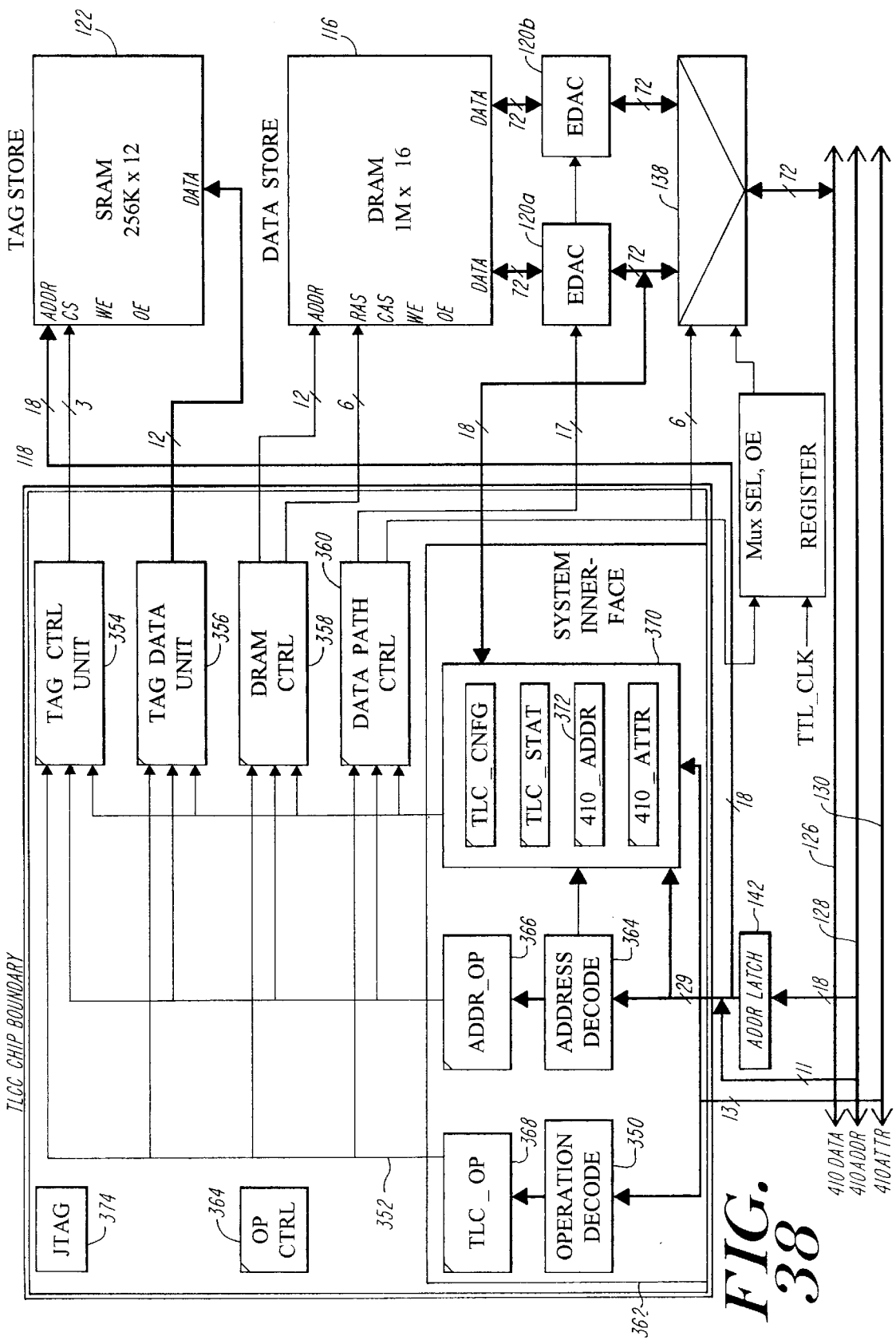
FIG. 38 is a block diagram of a TLCC ASIC.

FIG. 38 illustrates a block diagram of the third level cache controller subsystem. The third level cache subsystem includes a third level cache controller (TLCC 118), a third level cache and associated system busses. The TLC (Third Level Cache) is a 16 Mb direct mapped, write-through cache on the Daughter Board (58), and thus services two processor complexes (110, 112). Read hits can be handled by the TLC without any further interaction from the system. Read misses go out to memory on the motherboard (52) and are loaded into the cache (116) when the data is returned.

Read-with-intent-to-modify hits are invalidated, and burst writes (copybacks and writebacks) are loaded into the cache (116). Note that only shared data will be loaded. By default the TLC ASIC (118) encaches all (near and far) addresses, but can be programmed to service only far memory.

The third level cache includes a data store memory (116) that is organized as ten 1 Mb×16 chips, with two EDiiACs (120) providing ECC protection, as described hereinbefore. The cache line size is 64 bytes, and the tag store (122) is 256 Kb deep. Three 256 Kb×4 SRAMs are used to implement the tag store (122), with eight bits going for the tag, one bit for disable, one for valid, and one for parity. The following breakdowns the address presented to the TLC from the 88410: bits 31–24: the tag; bits 23–6: the index; and bits 5–3: word within a line.

The TLCC (118) coordinates the tag and data accesses necessary for the operation of the TLC. It checks the 88410 address (on the 88410 bus (128) and transfer attributes to decide what to do in response to the current 88410 bus cycle. Separate tag and dram control units allow tag lookup and data access to begin simultaneously. An operation decoder (350) generates a TLC opcode (352) that in turn tells the tag controller (354) whether to update/invalidate the tag and the dram path controller (358) and data path controller (360) whether to complete the data store access.

At the top level, the TLCC can be divided into four logical units: the system interface (362), the tag unit (354 and 356), the data unit (358 and 360), and the operation controller (364). The system interface (362) basically takes in the 88410 address (128) and control signals (130) and decodes and registers them. It also contains the interface for reading and writing TLC control space registers. The address decoder (364) determines if the system address presented by the 88410 is one of the following: a valid memory address; a near or far memory address; an encachable memory address; a tag store address; an EDAC register address; a TLCC/CI configuration register address; or a TLCC control space address. The decoded address is registered in ADDR_OP (366). The current address in ADDR_OP is saved for the DRAM Controller (358) to use if a new 88410 operation starts before the current DRAM operation has finished.

The following is the bit definition of the address opcode: R_ADDR_OP[6]: EDAC_ACCESS; R_ADDR_OP[5]: NEAR_ACCESS; R_ADDR_OP[4]: FAR_ACCESS; R_ADDR_OP[3]: MEM_ACCESS; R_ADDR_OP[2]: ENCACHABLE; R_ADDR_OP[1]: TAG_ACCESS; and R_ADDR_OP[0]: CTRL_ACCESS.

The operation decoder (350) is composed of two decoder sections, the attribute decoder and the TLC decoder. The attribute decoder generates a code based on the current 88410 cycle's transfer attribute signals. These codes are as follows: 1100 CI_READ; 0100 CI_WRITE; 0110 WRITE_THRU; 1011 READ_SHARED; 1010 READ_IM; 0010 WRITEBACK; 0011 SNOOP COPYBACK; 0001 INVALIDATE; and 0000 NOP.

The TLC decoder, which is within the operation decoder, takes the attribute code plus configuration and cycle type information and produces a TLC opcode. This opcode is registered in TLC_OP register (368) and copies are kept in the event that a new 88410 operation starts while the current DRAM operation is still in progress (same as in the address decoder). The bit definition of the TLC opcode is as follows: R_TLC_OP[3]: READ; R_TLC_OP[2]: WRITE; R_TLC_OP[1]: BURST; R_TLC_OP[0]: INVALIDATE. So for example, an opcode of 1000 indicates to the TLC that it has to do a single beat read; an opcode of 0110 indicates a burst write.

The system interface (362) also includes the system address registers (370), error handling logic, and error shadow registers. All of the TLC control space registers are contained in the system interface (362) and all are muxed into one output register, which is in turn driven onto the S_D during control space reads. The contents of the System Address Register (372) must be saved if and when a new 88410 operation starts before the DRAM Controller (358) has completed the last 88410 operation.

The TLCC ASIC (118) unlike other ASICs of the instant invention, only generates non fatal errors. A non fatal error, NON_FATAL_N, can be asserted due to tag parity errors that occur during tag lookups. The EDiiAC ASICs (120) detect system data parity errors, single bit errors, and multi-bit errors. Qualified errors are masked and registered in the status register and a NON_FATAL_N is asserted when any non-nested bit is set. The error status bits can be cleared by a control space write or by a cold reset. The shadow address registers are loaded when a particular type of error occurs.

There are four shadow registers: one for tag parity, one for system data parity, one for single bit error, and one for multi bit error. These are loaded with the current address when the corresponding type of error is detected. Because these registers are part of the TLC control space, they can be read directly by the processor.

The tag unit contains a control unit (TCU) (354) and a data unit (TDU) (356). The TCU (354) is responsible for initiating tag store read and write operations, for controlling the external address latch, and for loading the 88410 address and attribute registers. A tag lookup is normally done on a 88410 Bus Grant or Snoop Request. However, if the TLCC (118) can not handle the operation due to a busy DRAM controller, the lookup is changed to an invalidate. The tag store SRAMs (122) are written with 88410 data during processor (110) writes to the TLC's tag store control space. Error invalidates are done on EDAC detected parity and multi-bit errors, and also if Transfer Error Acknowledge (TEA) is seen on the 88410 bus.

The TDU (356) supplies data to the tag SRAMs (122) during tag update and invalidate operations. The TDU (356) also receives data from the tag SRAMs during tag lookup operations, and generates the HIT signal by performing tag compares. The TDU (356) checks parity on incoming tag data and generates parity on outgoing tag data. It registers the HIT and TAG_PE signals and keeps copies when a new 88410 operation starts before the DRAM controller (358) can finish the previous one.

The data unit is comprised of the DRAM controller (DRC) (358), and the data path controller (DPC) (360). The DRC (358) controls DRAM read, write, and refresh operations, provides DRAM addresses, and performs CAS before RAS refreshes. It also reads data out of the EDiiAC (120) write FIFO for DRAM writes. When reading the DRAM, the DRC (358) kicks off the DPC (360).

The DPC (360) controls the TLC mux (138) and TLC EDACs (120). It also handles TLC control space accesses and the assertion of Transfer Acknowledge (TA) and TEA. For writes to the data store, the DPC (368) pulls data off the 88410 data bus (126) when it sees a TA, latches it in to the TLC mux (138), and places it into the EDAC FIFO. For reads from the data store, it controls the EDAC's flow through latches and switches between EDAC SD outputs via the mux select.

The operation controller (364) is a collection of one and two bit state machines. Some of these machines coordinate the actions of the tag unit (354, 356) and the DPC (360), which always keep up with the 88410 system bus, and the DRC (358), which can fall behind the 88410 bus during writes to the TLC data store. Included within the operations controller (364) is an operation counter, an error machine, an ignore machine, a refresh machine, a wait machine, a TA window machine, an operation queue pointer machine, a last refresh machine and a bus grant refresh machine.

The operation counter counts 88410 bus operations that start with a Bus Grant (BG), where the count is incremented on a BG and decremented when the DRC (358) asserts a done signal. The TLC cannot accept any new operations when the operation count is 3. The error machine tells the TCU (354) to do an error invalidate if an error is detected during a 88410 operation. The ignore machine tells the DPC (360) to ignore the TA associated with an operation that the TLC can not handle because of a busy DRC (358).

The refresh machine sends a refresh signal to the DRC (358) when the refresh counter hits the refresh interval. It clears the refresh signal when the DRC (358) sends a refresh done signal. For every 88410 bus operation, the wait machine asserts a wait signal to the TCU (354) and DRC (358) until that cycle's TS shows up. The wait signal is needed when a the 88410 bus is parked during a copyback, because the TCU (354) and DRC (358) start on a BG and need to wait until a TS comes along.

The TA window machine asserts a signal to the DRC (358) during the time a TA could become valid. This is done because the first TA, which starts the DPC (360) on a write, occurs during different cycles for different types of operations. The operation queue pointer machine sets a bit to indicate that information necessary for a DRC operation has been saved in a "queue" register because a new operation is started on the 88410 bus. The HIT_signal, TLC opcodes, and the system address all need to be saved.

The last refresh machine sets a bit when a refresh operation starts and clears this bit when the next DRC operation finishes. This bit is checked by the DRC (358) when it starts to determine if it has been delayed with respect to the 88410 bus due to a refresh. The bus grant in refresh machine watches for two BGs to occur during the time it takes for the DRC (358) to do a refresh. If this happens, the operation represented by the first BG is ignored. No operation valid to the TLC is short enough to start and finish during a refresh and the DRC (358) has to deal with a valid 88410 operation that starts while it is doing a refresh.

The TLCC (118) also includes a JTAG interface (374). The JTAG interface (374) interfaces the TLCC (118) with the IEEE 1149.1 scan chain that includes the TLCC. The JATG interface (374) is used when the TLCC is being scanned during cold reset to verify the integrity and operability of the system prior to the loading of code. Such scanning also is done to retrieve state information, after a fatal error is asserted in the system.

Although the invention has been shown and described herein with respect to an illustrative embodiment thereof, it should be appreciated that various changes, omissions and additions in the form and detail thereof can be made without departing from the spirit and scope of the invention.

What is claimed is:

1. A scalable multiprocessor computer system, comprising:
    a backplane, including at least one backplane communication bus;
    a plurality of motherboards, detachably connected to said backplane; each motherboard interfacing to said at least one backplane communication bus, each of said plurality of motherboards including:
        at least one backplane communication bus interface mechanism interfacing at least one of said plurality of motherboards to said at least one backplane communication bus;
        a motherboard communication bus comprising a first segment that is selectably interfaceable to said at least one backplane communication bus and at least one second segment, said motherboard communication bus including a crossbar register switch selectably interconnecting said at least one second segment of said motherboard communication bus to said first segment;
        a motherboard communication bus request arbitration mechanism arbitrating requests from said plurality of motherboards for access to said first segment and said at least one second segment of said motherboard communication bus by selected ones of said plurality of motherboards;
        a memory system including main memory distributed among said plurality of motherboards, directory memory for maintaining main memory coherency with caches on other motherboards, and a memory controller module for accessing said main memory and directory memory and interfacing to said motherboard communication bus; and
        at least one daughterboard, detachably connected to said motherboard and interfacing to said motherboard communication bus, said at least one daughterboard further including:
            a motherboard communication bus interface module, for interfacing said at least one daughterboard to said motherboard communication bus and a local bus on said daughterboard; and
            at least one cache memory system including cache memory and a cache controller module maintaining said cache memory for a processor of said scalable multiprocessor computer system.

2. The scalable multiprocessor computer system of claim 1 wherein said main memory is contiguously addressable across said plurality of motherboards.

3. The scalable multiprocessor computer system of claim 1 wherein said backplane includes four backplane communication busses, and each of said plurality of motherboards includes four backplane communication bus interface modules.

4. The scalable multiprocessor computer system of claim 1 wherein one of said plurality of motherboards is selected to provide a system clock signal for all motherboards.

5. The scalable multiprocessor computer system of claim 4 wherein a second one of said plurality of motherboards is selected to provide a backup system clock signal for all motherboards.

6. The scalable multiprocessor computer system of claim 1 wherein each of said plurality of motherboards includes a peripheral interface module, said peripheral interface module interfacing to said motherboard communication bus, and to at least one peripheral device.

7. The scalable multiprocessor computer system of claim 6 wherein said at least one peripheral device is one of a local area network (LAN) device, a small computer system interface (SCSI) device or an expansion card device.

8. The scalable multiprocessor computer system of claim 1 wherein said at least one daughterboard includes two processor modules.

9. The scalable multiprocessor computer system of claim 8 wherein said at least one cache memory system on said on said at least one daughterboard provides a cache for said two processor modules.

10. A scalable distributed memory multiprocessor computer system including a backplane comprising a plurality of identical independent backplane buses, said backplane providing communication paths for a plurality of motherboards, each of said motherboards including at least one processor with a local cache memory, a motherboard communications bus, a motherboard communications bus to backplane interface module, and a memory system, wherein:

said motherboard communications bus to backplane interface module includes three input queues of high, medium, and low priority, and packets sent on said backplane to a motherboard are placed in one of said input queues depending on the priority of each packet;

all packets to the same cache line use the same one of said plurality of identical independent backplane buses;

high priority packets are always accepted into said memory system on a motherboard without needing to retry;

medium priority packets received from said plurality of identical independent backplane buses are granted onto a motherboard communication bus in the order in which said medium priority packages are received from said plurality of identical independent backplane buses;

packets for cache-inhibited reads, cache-inhibited writes, and cache-inhibited write unlocks are ordered with previous invalidate command and read invalidate reply packets previously inserted in said medium priority input queue;

packets to be received by more than one motherboard will arrive to each motherboard simultaneously;

all copyback invalidate commands and copyback commands are sent out on said backplane to a receiving motherboard;

all invalidate copybacks are sent out on said backplane to a receiving motherboard; and a motherboard will retry any local resource requests while said medium input queue of said motherboard communications bus to backplane interface module contains any read invalidate reply, invalidate command, or copyback invalidate command packets.

11. The scalable distributed memory multiprocessor computer system of claim 10, wherein:

packets of low priority include cache-inhibited reads, cache inhibited writes, cache-inhibited write unlock and write-through;

packets of medium priority include invalidate commands, read invalidate replies, and copyback invalidate commands; and packets of high priority include copyback replies, copyback invalidate replies, and writebacks.

12. A scalable multiprocessor computer system, comprising:

a backplane, including at least one backplane communication bus;

a plurality of motherboards, detachably connected to said backplane; each motherboard interfacing to said at least one backplane communication bus, each of said plurality of motherboards including:

at least one backplane communication bus interface mechanism interfacing at least one of said plurality of motherboards to said at least one backplane communication bus;

a motherboard communication bus comprising a first segment that is selectably interfaceable to said at least one backplane communication bus and a plurality of second segments, said motherboard communication bus including means for selectably interconnecting one of said plurality of second segments of said motherboard communication bus to said first segment;

an arbitration means for arbitrating requests from said plurality of motherboards for access to said first segment and said one of said plurality of second segments of said motherboard communication bus by selected ones of said plurality of motherboards;

a memory system including main memory distributed among said plurality of motherboards, directory means for maintaining main memory coherency with caches on other motherboards, and a memory controller means for accessing said main memory and directory memory and interfacing to said motherboard communication bus; and at least one daughterboard, detachably connected to said motherboard and interfacing to said motherboard communication bus, said at least one daughterboard further including:

a motherboard communication bus interface means for interfacing said at least one daughterboard to said motherboard communication bus and a local bus on said daughterboard; and at least one cache memory system including cache memory and a cache controller means for maintaining said cache memory for a processor of said scalable multiprocessor computer system.

13. A crossbar register switch for use in a scaleable multiprocessor computer system including at least one backplane communication bus, and a plurality of motherboards interfaced to said at least one backplane communication bus, each of said plurality of motherboards including a motherboard communication bus comprising a first segment that is selectably interfaceable to said at least one backplane communication bus and a plurality of second segments; said crossbar register switch comprising:

an interface to said first segment of said motherboard communication bus;

a plurality of bidirectional ports, said bidirectional ports interfacing to said plurality of second segments of said motherboard communication bus;

a motherboard communication bus request arbitration mechanism arbitrating requests from said plurality of motherboards for access to said first segment and to one of said plurality of second segments of said motherboard communication bus by selected ones of said plurality of motherboards;

wherein said crossbar register switch selectably interconnects said first segment of said motherboard communication bus to one of said second segments of said motherboard communication bus through a bidirectional port based arbitration by said motherboard communication bus request arbitration mechanism.

14. The crossbar register switch of claim 13 wherein said scaleable multiprocessor computer system includes a memory system including main memory distributed among said plurality of motherboards, directory memory for maintaining main memory coherency with caches on other motherboards, and a memory controller module for accessing said main memory and directory memory and interfacing to said motherboard communication bus.

15. The crossbar register switch of claim 13 wherein said crossbar register switch is implemented in a plurality of identical integrated circuit modules.

16. In a scalable distributed memory multiprocessor computer system including a backplane comprising a plurality of identical independent backplane buses, said backplane providing communication paths for a plurality of motherboards, each of said motherboards including at least one processor with a local cache memory, a motherboard communications bus, a motherboard communications bus to backplane interface module, and a memory system; a method for communicating between said motherboard communication bus and said backplane busses comprising:

- providing three input queues of high, medium, and low priority;
- designating which input queue to place a packet sent on said backplane to a motherboard;
- guaranteeing that high priority packets will be received at the destination;
- allowing packets to be received by more than one motherboard to arrive to each motherboard simultaneously;
- ordering packets in said medium priority queue so that any medium priority packets which involve snoops or invalidations are ordered with previous invalidate command and read invalidate reply packets previously inserted in said medium priority queue across all backplane busses; and
- sending any local memory requests out onto one of said backplane busses and into said while said medium priority queue of said motherboard communications bus to backplane interface module contains any read invalidate reply, invalidate command, or copyback invalidate command packets.

17. The method of claim 16, further including the steps of:

designating packets of low priority to include requests;

designating packets of medium priority to include replies and snoops; and designating packets of high priority to include copyback replies and writebacks.

18. The method of claim 16, further including the steps of:

designating packets of low priority to include cache-inhibited reads, cache inhibited writes, cache-inhibited write unlock and write-through;

designating packets of medium priority to include invalidate commands, read invalidate replies, and copyback invalidate commands; and designating packets of high priority to include copyback replies, copyback invalidate replies, and writebacks.

* * * * *